(12) United States Patent
Nagaoka

(10) Patent No.: US 11,197,011 B2
(45) Date of Patent: Dec. 7, 2021

(54) DECODING METHOD

(71) Applicant: Socionext Inc., Kanagawa (JP)

(72) Inventor: Hirofumi Nagaoka, Kanagawa (JP)

(73) Assignee: Socionext Inc., Yokohama (JP)

( * ) Notice: Subject to any disclaimer, the term of this patent is extended or adjusted under 35 U.S.C. 154(b) by 0 days.

(21) Appl. No.: 17/032,446

(22) Filed: Sep. 25, 2020

(65) Prior Publication Data

US 2021/0014514 A1 Jan. 14, 2021

Related U.S. Application Data

(63) Continuation of application No. PCT/JP2018/013856, filed on Mar. 30, 2018.

(51) Int. Cl.
*H04N 19/137* (2014.01)
*H04N 19/159* (2014.01)
*H04N 19/176* (2014.01)
*H04N 19/44* (2014.01)
*H04N 19/105* (2014.01)
*H04N 19/51* (2014.01)

(52) U.S. Cl.
CPC ........ *H04N 19/44* (2014.11); *H04N 19/105* (2014.11); *H04N 19/137* (2014.11); *H04N 19/159* (2014.11); *H04N 19/176* (2014.11); *H04N 19/51* (2014.11)

(58) Field of Classification Search
CPC ..................................................... H04N 19/44
See application file for complete search history.

(56) References Cited

U.S. PATENT DOCUMENTS 9,351,014 B2 * 5/2016 Suzuki ................ H04N 19/593
10,834,419 B2 * 11/2020 Joshi .................... H04N 19/70
(Continued)

FOREIGN PATENT DOCUMENTS

WO 2010/095560 8/2010
WO 2011/099468 8/2011

OTHER PUBLICATIONS

International Search Report dated May 29, 2018 with respect to No. PCT/JP2018/013856.
(Continued)

*Primary Examiner* — Irfan Habib
(74) *Attorney, Agent, or Firm* — IPUSA, PLLC

(57) ABSTRACT

A decoding method includes obtaining a rectangular region to be decoded in a picture, setting a first template region in accordance with a position of the rectangular region, setting a second template region corresponding to the first template region in a reference picture, setting third template regions each of which is obtained by moving the second template region using a corresponding vector in the reference picture, calculating image correlation values each of which is obtained between a corresponding one of the third template regions and the first template region, determining a motion vector of the rectangular region, wherein the setting a first template region includes setting a region adjacent to a predetermined block including the rectangular region as the first template region when a size of the rectangular region is a predetermined threshold size or smaller, or when a picture including the rectangular region corresponds to a non-reference picture.

7 Claims, 33 Drawing Sheets

(56) References Cited

U.S. PATENT DOCUMENTS

| | | | |
|---|---|---|---|
| 2012/0044996 A1* | 2/2012 | Sato | H04N 19/11 375/240.16 |
| 2012/0294371 A1* | 11/2012 | Kitahara | H04N 19/521 375/240.16 |
| 2014/0362902 A1* | 12/2014 | Seregin | H04N 19/52 375/240.02 |
| 2015/0016531 A1* | 1/2015 | Hannuksela | H04N 19/33 375/240.16 |
| 2015/0264351 A1* | 9/2015 | Miyoshi | H04N 19/107 375/240.13 |
| 2016/0286232 A1 | 9/2016 | Li et al. | |
| 2016/0330468 A1* | 11/2016 | Minezawa | H04N 19/184 |
| 2018/0124411 A1* | 5/2018 | Nakagami | H04N 19/513 |

OTHER PUBLICATIONS

Written Opinion of The International Searching Authority dated May 29, 2018 with respect to No. PCT/JP2018/013856, with English translation of the relevant part.

Chen, J. L. et al., Algorithm description of joint exploration test model 7 (JEM 7), Joint Video Exploration Team (JVET) 7th Meeting, JVET-G1001-v1, Aug. 19, 2017, Cited in ISR for No. PCT/JP2018/013856.

Xiu, X. Y. et al., On low-latency reduction for template-based inter prediction, Joint Video Experts Team (JVET) 10th Meeting, JVET-J0045-v1, Apr. 3, 2018, Cited in ISR for No. PCT/JP2018/013856.

* cited by examiner

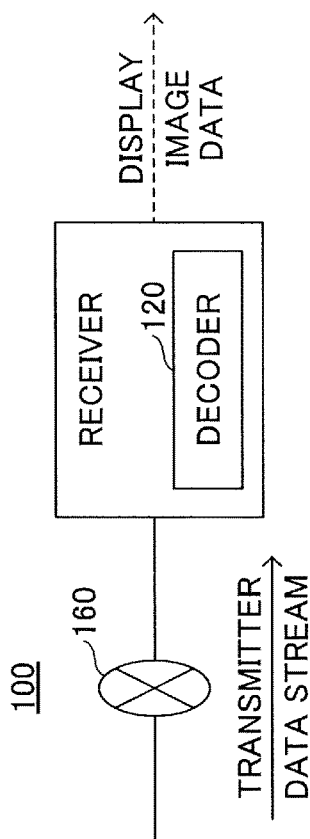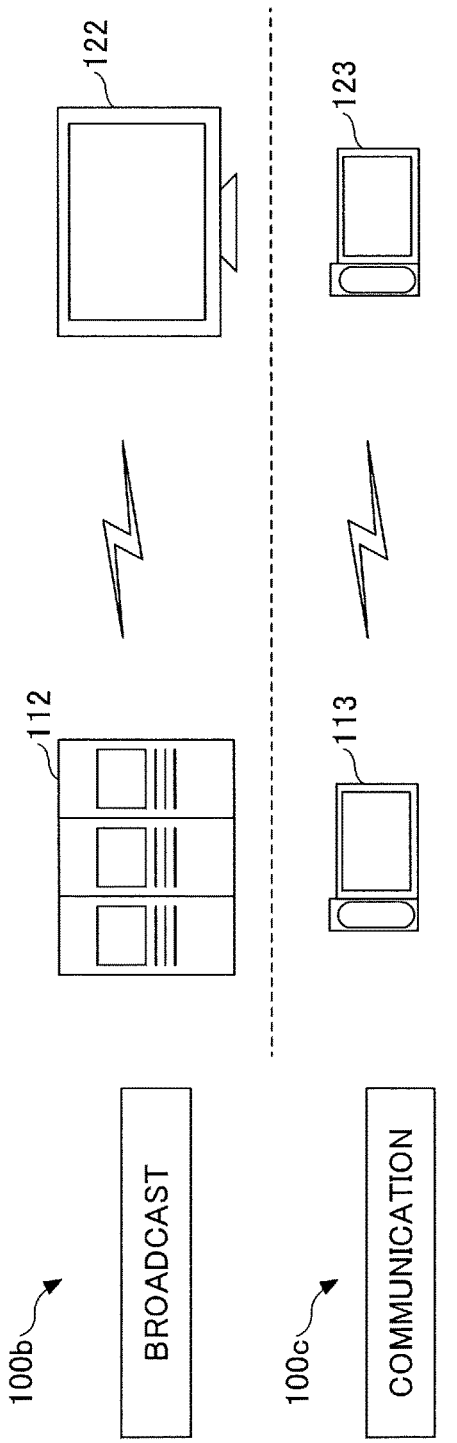

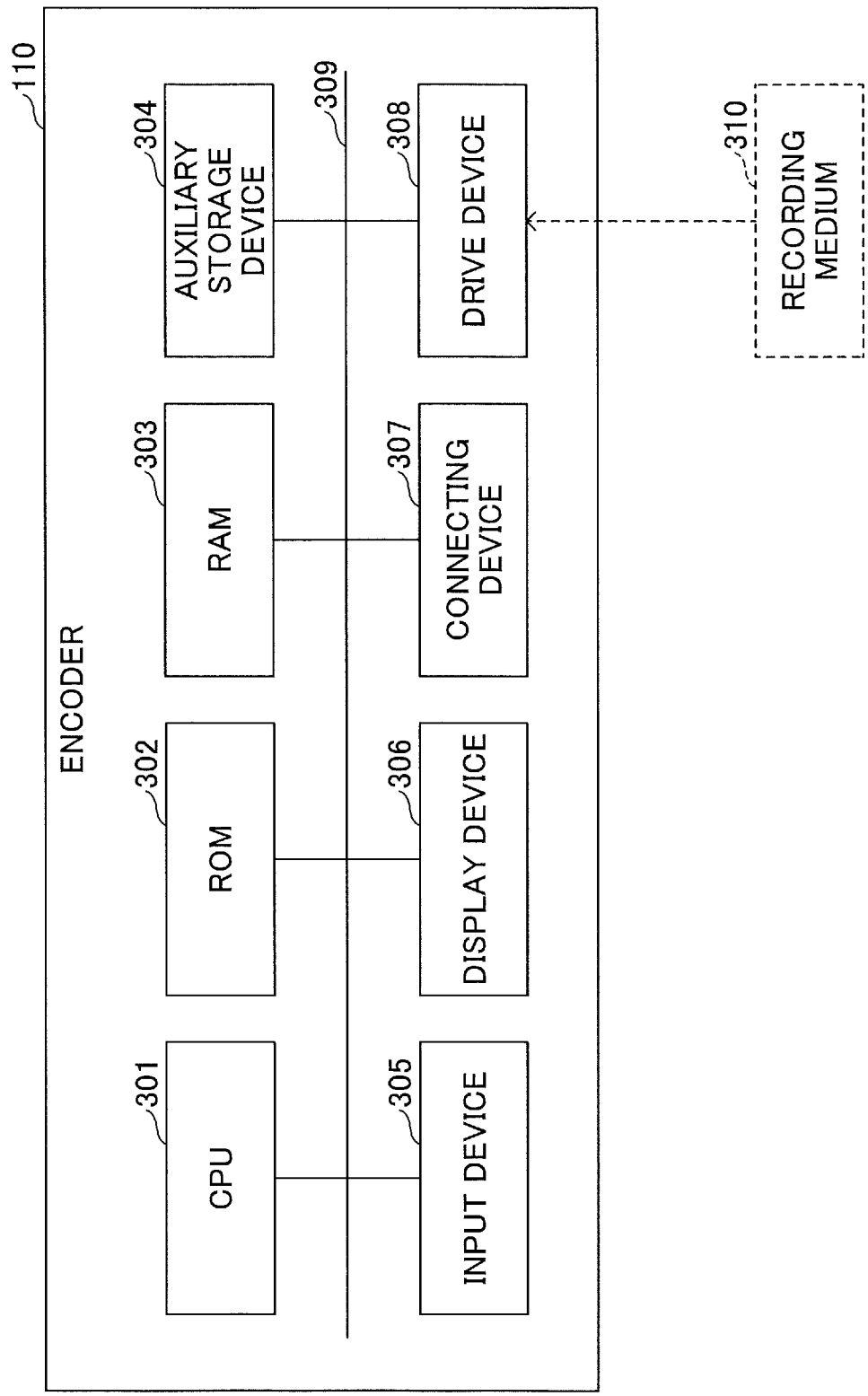

FIG.15

| DETERMINATION ITEM OF EXECUTION CONDITION | EXECUTION CONDITION INFORMATION | |
|---|---|---|
| | THRESHOLD OF DETERMINATION ITEM | DETERMINATION REASON |
| subCU SIZE | SMALLER THAN OR EQUAL TO 8 × 8 PIXELS | SMALL subCU EASILY CAUSES PERFORMANCE BOTTLENECK. |
| PICTURE TYPE | BEING NON-REFERENCE IMAGE | ERROR IS NOT ACCUMULATED BECAUSE NON-REFERENCE IMAGE IS NOT REFERENCED BY ANOTHER PICTURE. |

1500

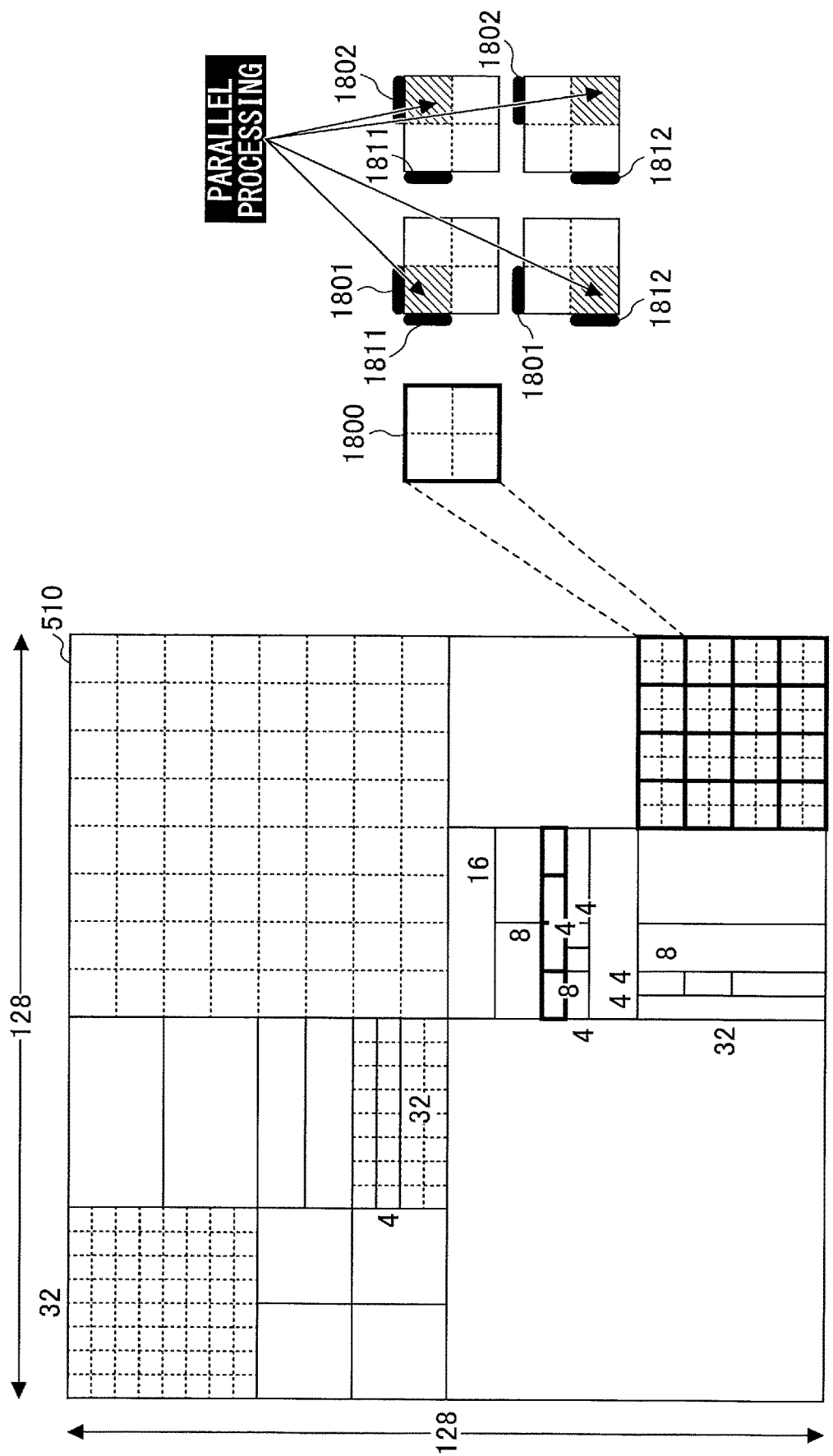

| DETERMINATION ITEM OF EXECUTION CONDITION | EXECUTION CONDITION INFORMATION | |
|---|---|---|
| | THRESHOLD OF DETERMINATION ITEM | DETERMINATION REASON |
| subCU SIZE | SMALLER THAN OR EQUAL TO 8 × 8 PIXELS | SMALL subCU EASILY CAUSES PERFORMANCE BOTTLENECK. |
| PICTURE TYPE | BEING NON-REFERENCE IMAGE | ERROR IS NOT ACCUMULATED BECAUSE NON-REFERENCE IMAGE IS NOT REFERENCED BY ANOTHER PICTURE. |
| CU QUANTIZATION PARAMETER | SMALLER THAN OR EQUAL TO 30 | DIFFERENCE BETWEEN DECODED IMAGE AND PREDICTION IMAGE IS SMALL. |
| CU LEVEL MOTION VECTOR | ABSOLUTE VALUE OF MOTION VECTOR IS SMALLER THAN OR EQUAL TO 1 PIXEL | PREDICTION IMAGE ITSELF TENDS TO BE DECODED IMAGE FOR STILL REGION. |

DECODING METHOD

CROSS-REFERENCE TO RELATED APPLICATIONS

This application is a continuation application of International Application No. PCT/JP2018/013856 filed on Mar. 30, 2018, and designated the U.S., the entire contents of which are incorporated herein by reference.

FIELD

The disclosure herein relates to a decoding method.

BACKGROUND

One example of an inter-picture prediction (i.e., an inter prediction) in the next generation video codec (i.e., the next generation codec following H.265/HEVC), which is currently discussed, is an inter prediction using template matching. The inter prediction using template matching is one of "motion compensation inter predictions" that use regions adjacent to a block to be decoded (i.e., template regions) to perform matching in a reference picture different in time and generate a prediction image by determining a motion vector.

Various improvement methods have been proposed for the motion compensation inter prediction in the standardized video codec. For example, in Patent Document 1 below, a method of setting regions having predetermined positional relationships with a block to be decoded as template regions in order to improve the processing efficiency in the inter prediction by using template matching, has been proposed.

With respect to the above, in the next generation codec, when the inter prediction is performed, a block is partitioned into blocks called subCUs for encoding. Thus, in the inter prediction using template matching in the next generation codec, there is a pattern in which a positional relationship with the block to be decoded does not match the predetermined positional relationship. As a result, the processing efficiency may not be improved as in the above-described Patent Document 1.

RELATED-ART DOCUMENTS

Patent Documents

[Patent Document 1] International Publication Pamphlet No. WO 2010/095560

SUMMARY

According to an embodiment of the present invention, with respect to a decoding method for decoding an image by using an inter-picture prediction, the decoding method includes obtaining a rectangular region to be decoded in a picture being decoded, setting a first template region in accordance with a position of the rectangular region to be decoded in the picture being decoded, setting a second template region corresponding to the first template region in a reference picture different in time from the picture being decoded, setting third template regions each of which is obtained by moving the second template region by using a corresponding one of multiple predetermined vectors in the reference picture, calculating image correlation values each of which is obtained between a corresponding one of the third template regions and the first template region, determining a motion vector of the rectangular region to be decoded by selecting one vector among the multiple predetermined vectors based on the image correlation values each corresponding to a respective one of the multiple predetermined vectors, and generating a prediction image of the rectangular region to be decoded based on the motion vector to perform motion compensation, wherein the setting a first template region includes setting a region adjacent to a predetermined block including the rectangular region to be decoded as the first template region when a size of the rectangular region to be decoded is smaller than or equal to a predetermined threshold size, or when a picture including the rectangular region to be decoded corresponds to a non-reference picture that is not referenced when another picture different in time is decoded, the predetermined block being determined by an encoder.

BRIEF DESCRIPTION OF THE DRAWINGS

FIGS. 1A, 1B, 1C, and 1D are drawings illustrating application examples of an encoder and a decoder;

FIG. 3 is a drawing illustrating an example of a hardware configuration of the encoder;

FIG. 15 is a drawing illustrating an execution condition of the template matching in the inter prediction mode of the encoder according to the first embodiment;

FIG. 18 is a first drawing illustrating a specific example of parallel processing in the inter prediction mode of the encoder according to the first embodiment;

FIG. 26 is a drawing illustrating an execution condition of the template matching in the inter prediction mode of the encoder according to the second embodiment;

DESCRIPTION OF THE EMBODIMENTS

Figure 2A:
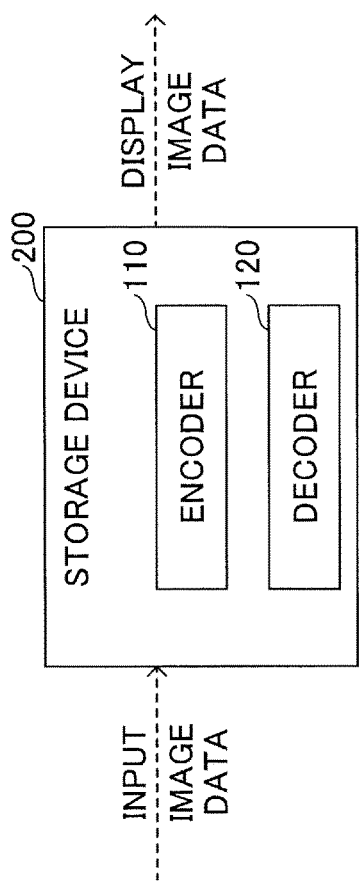
FIGS. 2A and 2B are drawings illustrating other application examples of the encoder and the decoder.

In the following, each embodiment will be described with reference to the accompanying drawings. In the present specification and the drawings, the components having substantially the same functional configuration are referenced by the same reference numerals, and the overlapping description is omitted.

First Embodiment

1. Application Examples of an Encoder and a Decoder

First, application examples of an encoder (i.e., an encoding device) and a decoder (i.e., a decoding device) will be described. FIGS. 1A, 1B, 1C, and 1D are drawings illustrating application examples of the encoder and the decoder.

As illustrated in FIG. 1A, an encoder 110 may be disposed in a transmitter, a decoder 120 may be disposed in a receiver, and the encoder 110 and the decoder 120 may be connected through a network 160 to form an image processing system 100 to which the encoder 110 and the decoder 120 are applied.

In the image processing system 100, the encoder 110 disposed in the transmitter generates a data stream (i.e., an encoding sequence) by encoding input image data. The transmitter transmits the generated data stream to the receiver through the network 160.

The receiver receives the data stream. The decoder 120 disposed in the receiver generates image data by decoding the data stream and displays the image data.

Because the transmission load required when image data is transmitted can be reduced by forming such an image processing system 100, the encoder and decoder can be applied to various fields, such as a field of the Internet, a broadcast field, and a communication field.

In FIG. 1B, an application example 100a indicates an example in which the image processing system 100 is applied to the field of the Internet. In the application example 100a, a data stream transmitted from a server 111, which is an example of the transmitter, is received and displayed by a personal computer 121a, a smart terminal 121b, or the like, which is an example of the receiver. This enables a user of the personal computer 121a or the smart terminal 121b to view moving image data stored in the server 111 through the Internet.

In FIG. 1C, an application example 100b indicates an example in which the image processing system 100 is applied to the broadcast field. In the application example 100b, a television 122, which is an example of the receiver, receives and displays a data stream transmitted from a broadcast transmitter 112, which is an example of the transmitter. This enables, for example, a user of the television 122 to watch broadcast contents transmitted by the broadcast transmitter 112.

In FIG. 1D, an application example 100c indicates an example in which the image processing system 100 is applied to the communication field. In the application example 100c, a video phone 123, which is an example of the receiver, receives and displays a data stream transmitted from a video phone 113, which is an example of the transmitter. This enables a user of the video phone 123 to talk with looking at a conversation partner's face.

Figure 2B:
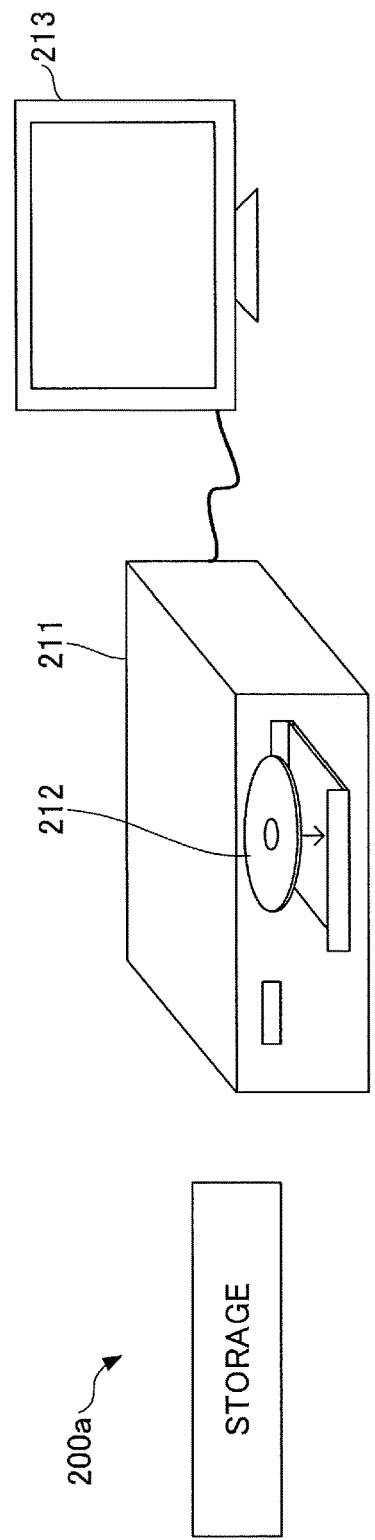

FIGS. 2A and 2B are drawings illustrating other application examples of the encoder and the decoder. As illustrated in FIG. 2A, the encoder 110 and the decoder 120 can be integrally configured to form a storage device 200 to which the encoder 110 and the decoder 120 are applied.

The storage device 200 encodes input image data using the encoder 110 and stores generated data stream in a recording medium. The storage device 200 generates and displays image data by decoding the data stream stored in the recording medium using the decoder 120.

Because the amount required when image data is stored can be reduced by forming such a storage device 200, the encoder and the decoder can be applied to a storage field, for example. An application example 200a indicates an example in which the storage device 200 is applied to the storage field. In the application example 200a illustrated in FIG. 2B, a video recorder 211, which is an example of the storage device 200, stores data stream generated by encoding image data using the encoder 110 that is incorporated, in the recording medium 212. The video recorder 211 displays image data generated by decoding the data stream read from the recording medium 212 by using the decoder 120 that is incorporated, on the monitor 213. This enables a user of the video recorder 211 to efficiently store obtained moving image data.

<2. Hardware Configuration of the Encoder and the Decoder>

Next, a hardware configuration of the encoder and the decoder will be described. As the encoder 110 and the decoder 120 have a similar hardware configuration, the hardware configuration of the encoder 110 will be described here.

FIG. 3 is a drawing illustrating an example of the hardware configuration of the encoder. As illustrated in FIG. 3, the encoder 110 includes a central processing unit (CPU) 301, a read only memory (ROM) 302, and a random access memory (RAM) 303. The CPU 301, the ROM 302, and the RAM 303 form what is called a computer. The encoder 110 also includes an auxiliary storage device 304, an input device 305, a display device 306, a connecting device 307, and a drive device 308. Each hardware of the encoder 110 is interconnected through a bus 309.

The CPU 301 executes various programs (e.g., an encoding program) installed in the auxiliary storage device 304.

The ROM 302 is a non-volatile memory. The ROM 302 functions as a main storage device for storing various programs, data, and the like that are necessary for the CPU 301 to execute various programs installed in the auxiliary storage device 304. Specifically, the ROM 302 stores a boot program such as basic input/output system (BIOS) and extensible firmware interface (EFI).

The RAM 303 is a volatile memory such as a dynamic random access memory (DRAM) or a static random access memory (SRAM). The RAM 303 functions as a main storage device that provides a workspace in which various programs installed in the auxiliary storage device 304 are expanded when the various programs are executed by the CPU 301.

The auxiliary storage device 304 is an auxiliary storage device that stores installed various programs or information used in executing the various programs.

The input device 305 is an input device used for inputting various instructions to the encoder 110.

The display device 306 is a display device that displays internal information of the encoder 110. The connecting device 307 is a communication device for communication by connecting the encoder 110 to the decoder 120.

The drive device 308 is a device for setting a computer-readable recording medium 310. The recording medium 310 includes a medium that records information optically, electrically, or magnetically, such as a CD-ROM, a flexible disk, and a magneto-optical disk. Alternatively, the recording medium 310 may include a semiconductor memory or the like that electrically records information, such as the ROM, and a flash memory.

The various programs to be installed in the auxiliary storage device 304 may be installed, for example, by setting the distributed recording medium 310 in the drive device 308 and reading the various programs recorded in the recording medium 310 using the drive device 308. Alternatively, various programs to be installed in the auxiliary storage device 304 may be installed by downloading from the network 160 through the connecting device 307.

The hardware configuration illustrated in FIG. 3 is only an example, and it is clear that a portion of the hardware illustrated in FIG. 3 may be excluded or replaced with another hardware depending on an application form.

<3. Functional Configuration of the Encoder>

Figure 4:
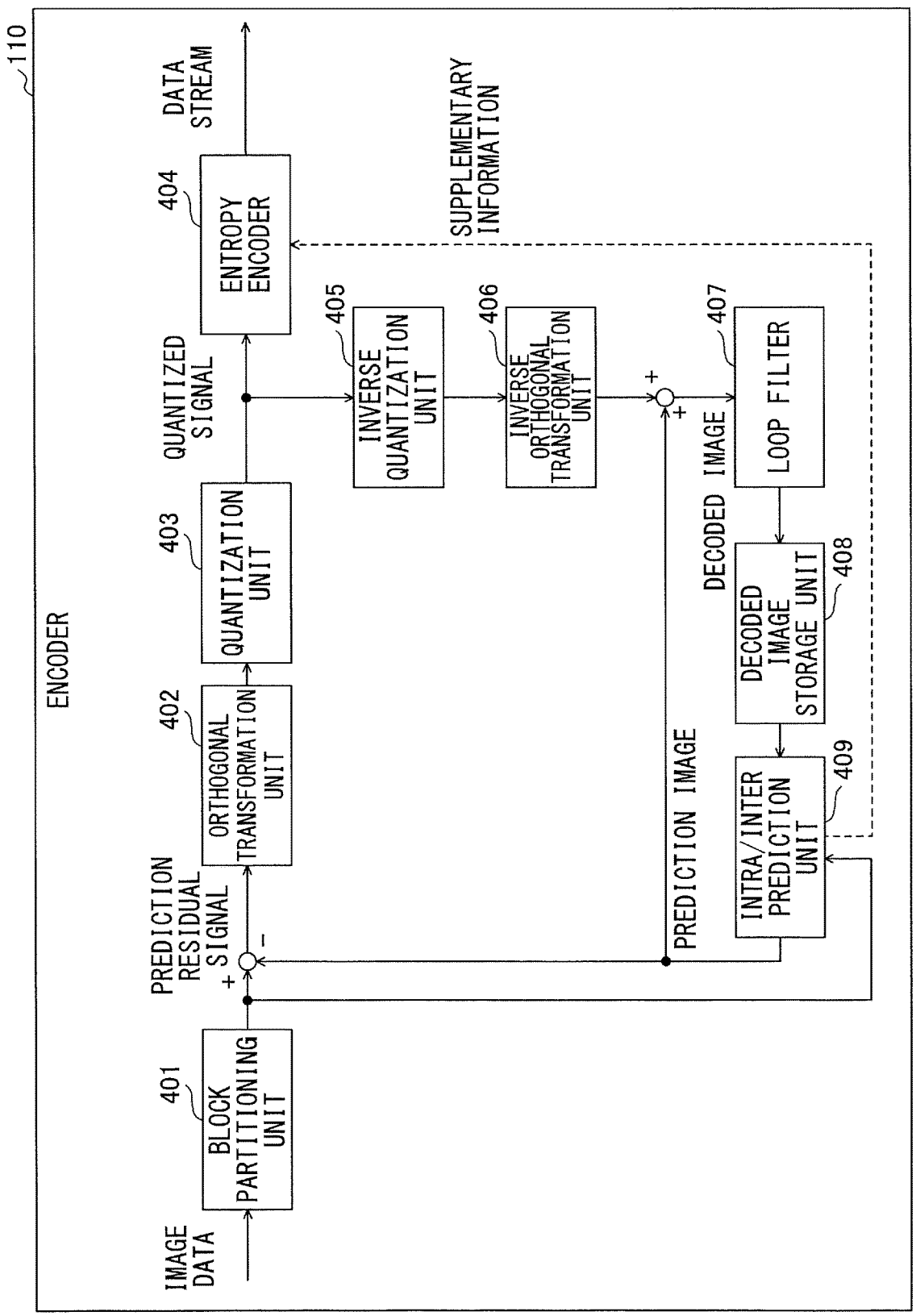
FIG. 4 is a drawing illustrating an example of a functional configuration of the encoder.

Next, a functional configuration of the encoder 110 will be described. FIG. 4 is a drawing illustrating an example of the functional configuration of the encoder. As illustrated in FIG. 4, the encoder 110 includes a block partitioning unit 401, an orthogonal transformation unit 402, a quantization unit 403, and an entropy encoder 404. The encoder 110 includes an inverse quantization unit 405, an inverse orthogonal transformation unit 406, a loop filter 407, a decoded image storage unit 408, and an intra/inter prediction unit 409.

The block partitioning unit 401 obtains each picture (which is called an input picture or an input frame) included in input image data. The block partitioning unit 401 partitions the input picture (i.e., the input frame) into fixed-size blocks in a stream. Further, the block partitioning unit 401 recursively partitions each of the fixed-size blocks into blocks of a coding unit. In a block partitioning unit of H.265/HEVC, the input picture is partitioned into coding tree units (CTUs), which are fixed-size blocks in the stream. In the block partitioning unit of H.265/HEVC, each CTU block is partitioned into coding units (CUs), which are blocks of the coding unit. Further, in the block partitioning unit of H.265/HEVC, each CU block is partitioned into blocks of a prediction unit (PU) and a transform unit (TU).

However, the international standard for the next generation codec following H.265/HEVC is expected to abolish the PU and TU and partition a block into all CU blocks. Thus, in the present embodiment, the following description assumes that the block partitioning unit 401 partitions the CTU block into all CU blocks. According to the contents discussed in the next generation codec following H.265/HEVC, the CTU block size is up to 128×128 pixels. Thus, in the following, the CTU block size will be described as 128×128 pixels.

Each input picture (i.e., input frame) of image data partitioned into the CU blocks by the block partitioning unit 401 is notified to an intra/inter prediction unit 409 and is used for calculating a prediction residual signal.

The orthogonal transformation unit 402 performs an orthogonal conversion process on the prediction residual signal calculated based on a difference between the input image in each CU block of the input picture and the prediction image in a corresponding CU block.

The quantization unit 403 quantizes the prediction residual signal on which the orthogonal transformation process has been performed to generate a quantized signal and outputs the quantized signal to the entropy encoding unit 404 and the inverse quantization unit 405.

The entropy encoder 404 performs entropy encoding of the quantized signal to generate and output a data stream.

The inverse quantization unit 405 performs inverse quantization on the quantized signal and outputs a result to the inverse orthogonal transformation unit 406. The inverse orthogonal transformation unit 406 performs an inverse orthogonal transformation process on the quantized signal that is inversely quantized. A decoded image is generated by adding a signal obtained by the inverse orthogonal transformation unit 406 to a prediction image generated by the intra/inter prediction unit 409, for example, and the decoded image is input to the loop filter 407.

The loop filter 407 performs filter processing to reduce encoded noise of the input decoded image. The decoded image storage unit 408 stores the decoded image filtered by the loop filter 407 for each picture (i.e., each frame).

The intra/inter prediction unit 409 performs the intra prediction (i.e., an intra-picture prediction) that generates a prediction image of the CU block to be processed by using the decode image of each CU block in the picture being decoded. The intra/inter prediction unit 409 uses the decoded image of each CU block in a reference picture to perform motion compensation between pictures, and perform a motion compensation inter prediction (i.e., an inter-picture prediction) for generating a prediction image of the CU block to be processed.

Further, the intra/inter prediction unit 409 outputs either an intra prediction image, which is a prediction image of each CU block generated by the intra prediction, or an inter prediction image, which is a prediction image of each CU block generated by the motion compensation inter prediction.

The prediction image of each CU block output from the intra/inter prediction unit 409 is used to calculate the residual of the input image of each CU block in the input picture, and the calculated prediction residual signal is input to the orthogonal transformation unit 402. The prediction image output from the intra/inter prediction unit 409 is added to the signal obtained by the inverse orthogonal transformation unit 406 and is input to the loop filter unit 407 as a decoded image.

<4. Details of the Intra/Inter Prediction Unit of the Encoder>

Details of the inter prediction process using template matching in the intra/inter prediction unit 409 of the encoder will be described. In the following, as a comparison, the inter prediction process using template matching in the inter-prediction mode being discussed in the next generation codec, will be described first (see <4.1>). Next, the inter prediction process using template matching in an inter prediction mode of an encoder according to a first embodiment will be described (see <4.2>).

<4.1 Inter Prediction Process Using Template Matching in the Inter Prediction Mode being Discussed in the Next Generation Codec>

Figure 5:
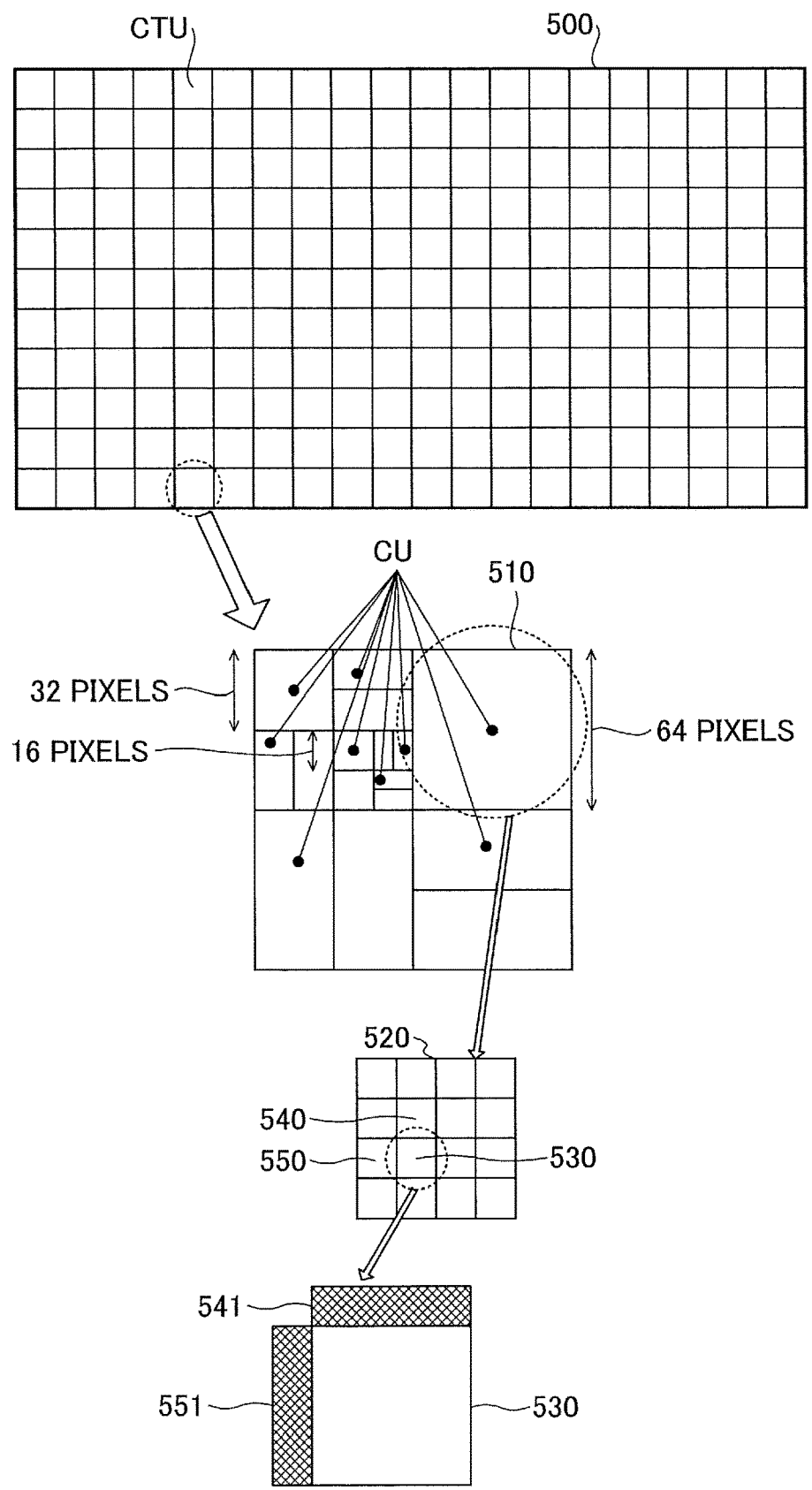
FIG. 5 is a drawing for describing a rectangular region to be decoded and template regions in an inter prediction mode being discussed in the next generation codec.

(1) Description of a Rectangular Region to be Decoded (subCU) and Template Regions First, a rectangular region to be decoded and template regions will be described when the inter prediction process using template matching is performed in the inter prediction mode being discussed in the next generation codec. FIG. 5 is a drawing for describing the rectangular region to be decoded and the template region in the inter prediction mode being discussed in the next generation codec.

As illustrated in FIG. 5, a CTU 510 of 128×128 pixels in an input picture (an input frame) 500 is partitioned into CU blocks, and the inter prediction process using template matching is performed on the CU blocks.

As illustrated in the CTU 510, the CTU is partitioned into CUs of various block sizes when the inter prediction is performed. In the example illustrated in FIG. 5, the CTU is partitioned into square CU blocks (8×8 pixels, 16×16 pixels, 32×32 pixels, and 64×64 pixels). Further, in the example illustrated in FIG. 5, the CTU is partitioned into rectangular CU blocks (4×8 pixels, 8×4 pixels, 8×16 pixels, 16×8 pixels, 16×32 pixels, 32×16 pixels, 32×64 pixels, 64×32 pixels, 64×128 pixels, and 128×64 pixels).

A CU block 520 is an enlarged view of a square block of 64×64 pixels that is partitioned. As illustrated in the CU block 520, in the inter prediction mode of the next generation codec, rectangular regions, such as subCUs 530, 540, and 550, are generated, and the prediction image and the decoded image are successively generated for each subCU used as a block to be decoded.

In the example of FIG. 5, when the prediction image and the decoded image are generated for the subCU 530 to be decoded by performing the inter prediction process using template matching, the subCU 540 adjacent to the upper side of the subCU 530 and the subCU 550 adjacent to the left side of the subCU 530 are used. That is, in order to generate the prediction image and the decoded image by performing the inter prediction process using template matching on the subCU 530, it is necessary that the prediction image and the decoded image for the subCUs 540 and 550 have been generated.

In the example of FIG. 5, a portion of the decoded image of the subCU 540 and a portion of the decoded image of the subCU 550 are set as template regions 541 and 551. Then, the decoded images of the set template regions 541 and 551 are used to perform the inter prediction process using template matching.

(2) Overview of the Template Matching

Figure 6:
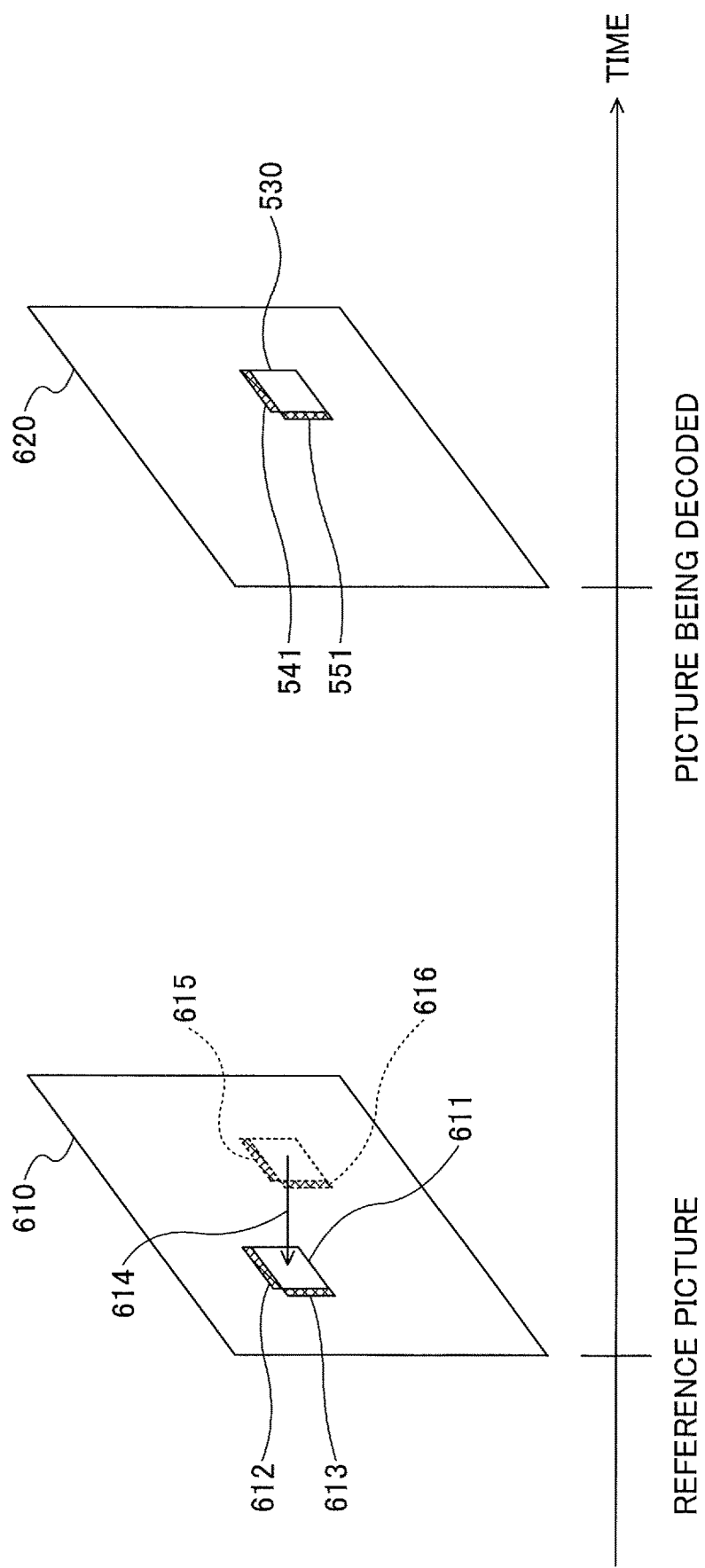
FIG. 6 is a drawing illustrating an overview of template matching in the inter prediction mode being discussed in the next generation codec.

Next, an overview of the template matching in the inter prediction mode being discussed in the next generation codec will be described. FIG. 6 is a drawing illustrating an overview of the template matching in the inter prediction mode being discussed in the next generation codec.

In FIG. 6, a picture 620 is a picture (i.e., a frame) that is being decoded by the intra/inter prediction unit 409. The example of FIG. 6 illustrates a state in which the template regions 541 and 551 are set with respect to the subCU 530 to be decoded.

In FIG. 6, a picture 610 is a reference picture (a decoded picture different in time from the picture 620 being decoded) on which matching is performed with the template regions set in the picture 620 being decoded.

The example of FIG. 6 illustrates a state in which template regions 615 and 616 (i.e., second template regions) are set as regions in the picture 610 corresponding to the set template regions 541 and 551 (i.e., first template regions).

The example of FIG. 6 also illustrates a state in which template regions 612 and 613 (i.e., third template region) are set by moving the template regions 615 and 616 by using a predetermined vector (i.e., a vector 614) in the picture 610.

Further, the example of FIG. 6 illustrates a state in which the vector 614 has been determined as a motion vector of a subCU 530 to be decoded because an image correlation value (i.e., a matching degree) calculated between the template regions 612 and 613 and the template regions 541 and 551 is maximum.

As described, portions of the decoded images of subCUs adjacent to the subCU 530 to be decoded are set as the template regions 541 and 551, and matching is performed in the picture 610, so that the motion vector 614 used for motion compensation inter prediction can be determined.

(3) Functional Configuration of the Intra/Inter Prediction Unit of the Encoder

Figure 7:
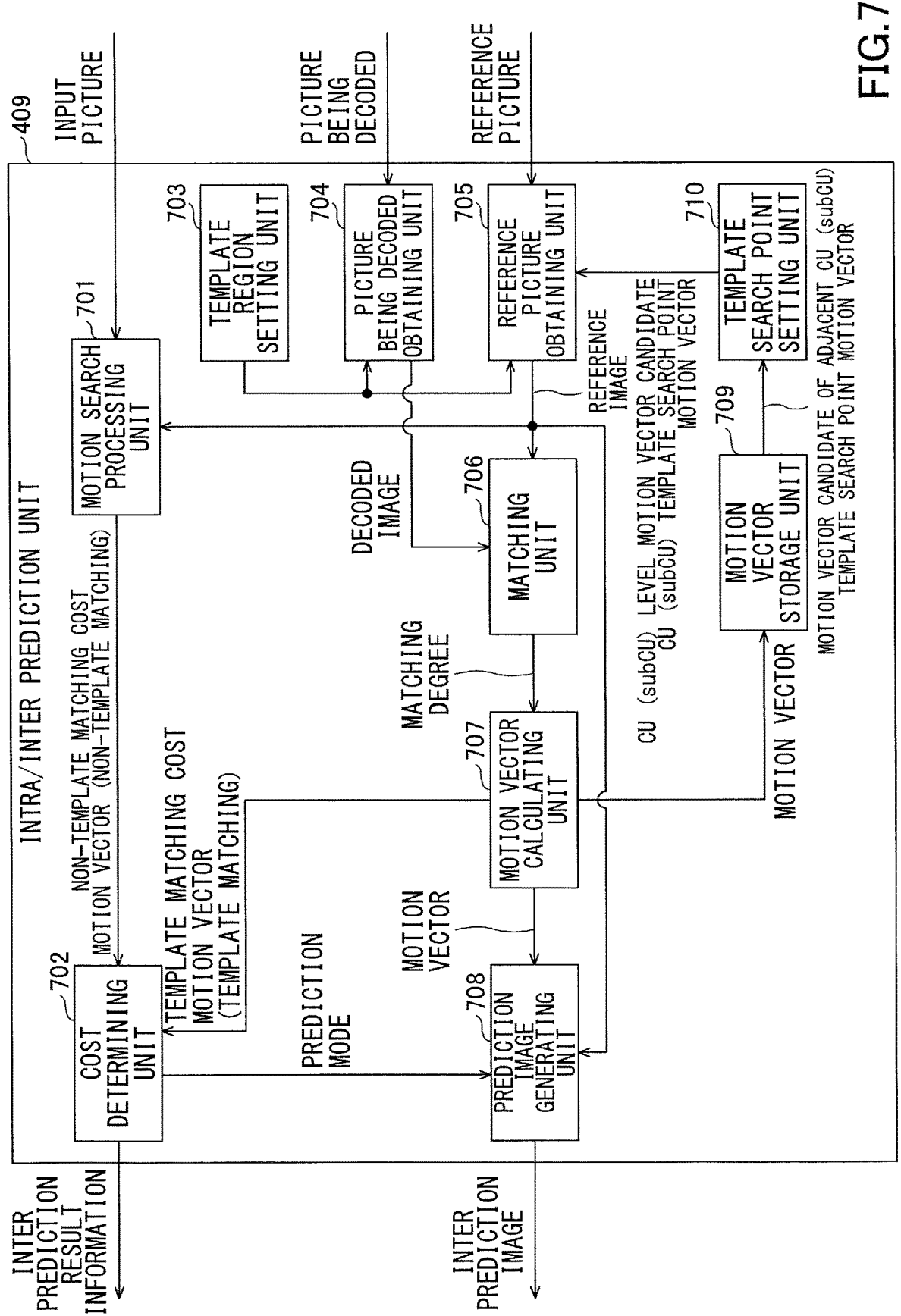
FIG. 7 is a drawing illustrating an example of a functional configuration of the encoder for achieving an inter prediction process using template matching in the inter prediction mode under consideration in the next generation codec.

Next, a functional configuration of the encoder for achieving the inter prediction process using template matching in the inter prediction mode being discussed in the next generation codec will be described. FIG. 7 is a drawing illustrating an example of the functional configuration for achieving the inter prediction process using template matching in the inter prediction mode being discussed in the next generation codec.

As illustrated in FIG. 7, in the inter prediction mode being discussed in the next generation codec, the intra/inter prediction unit 409 includes a motion search processing unit 701, a cost determining unit 702, a template region setting unit 703, and a picture being decoded obtaining unit 704. The intra/inter prediction unit 409 further includes a reference picture obtaining unit 705, a matching unit 706, a motion vector calculating unit 707, a prediction image generating unit 708, a motion vector storage unit 709, and a template search point setting unit 710.

The motion search processing unit 701 obtains, from the block partitioning unit 401, an input image of a CU block to be processed (i.e., a CU block including the subCU to be decoded) that is obtained by partitioning a predetermined CTU among CTUs of the input picture (i.e., the input frame).

The motion search processing unit 701 obtains a decoded picture that is read out as a reference picture by the reference picture obtaining unit 705 from among decoded pictures stored in the decoded image storage unit 408. Further, the motion search processing unit 701 performs a non-template matching process (i.e., a general search process other than the template matching process) on the reference picture with respect to the input image of the CU block to be processed. Thus, the motion search processing unit 701 calculates a CU level motion vector in non-template matching and the cost in the non-template matching, and notifies the cost determining unit 702.

The cost determining unit 702 obtains the CU level motion vector in the non-template matching and the cost in the non-template matching notified by the motion search processing unit 701. The cost determining unit 702 obtains a CU level motion vector in the template matching and the cost in the template matching notified by the motion vector calculating unit 707, which will be described later.

Further, the cost determining unit 702 compares the obtained costs to determine a CU prediction mode and outputs the determined CU prediction mode as an inter prediction result information. When the cost determining unit 702 determines a mode using the motion vector of the non-template matching as the CU prediction mode, the cost determining unit 702 notifies the prediction image generating unit 708 of the motion vector as the CU level motion vector. The cost determining unit 702 notifies the prediction image generating unit 708 of the determined CU prediction mode.

When the cost determining unit 702 determines a mode using the motion vector of the template matching as the CU prediction mode, the cost determining unit 702 notifies the prediction image generating unit 708 of the determined CU prediction mode. For the purpose of simplicity, the following description assumes that the CU prediction mode is determined to be the mode using the motion vector of the template matching.

In the CU level motion search, the template region setting unit 703 sets CU level template regions for the CU block to be decoded in the picture being decoded obtained by the picture being decoded obtaining unit 704. In the subCU level motion search, the template region setting unit 703 sets subCU level template regions for the subCU to be decoded in the picture being decoded obtained by the picture being decoded obtaining unit 704.

Further, in the CU level motion search, the template region setting unit 703 sets template regions corresponding to the CU level template regions that have been set for the CU block to be decoded in the reference picture obtained by the reference picture obtaining unit 705. In the subCU level motion search, the template region setting unit 703 sets template regions corresponding to the subCU level template regions that have been set for the subCU to be decoded in the reference picture obtained by the reference picture obtaining unit 705.

The picture being decoded obtaining unit 704 is an example of an obtaining unit. The picture being decoded obtaining unit 704 reads the picture being decoded from the decoded image storage unit 408. In the CU level motion search, the picture being decoded obtaining unit 704 notifies the matching unit 706 of decoded images of the CU level template regions that have been set by the template region setting unit 703 with respect to the CU block to be decoded.

In the subCU level motion search, the picture being decoded obtaining unit 704 notifies the matching unit 706 of decoded images of the subCU level template regions that have been set by the template region setting unit 703 with respect to the subCU to be decoded.

The reference picture obtaining unit 705 is an example of a second setting unit. The reference picture obtaining unit 705 reads out a predetermined decoded picture (i.e., a decoded picture different in time) as the reference picture from among decoded pictures stored in the decoded image storage unit 408. The reference picture obtaining unit 705 notifies the motion search processing unit 701 of the read-out reference picture.

The reference picture obtaining unit 705 extracts reference images corresponding to the CU level template regions that have been set by the template search point setting unit 710 in the read-out reference picture.

The template search point setting unit 710 sets template regions at respective positions corresponding to multiple CU level motion vector candidates with respect to the CU level template regions in the reference picture that have been set by the template region setting unit 703. The reference picture obtaining unit 705 extracts the reference images of the CU level template regions set at positions corresponding to the multiple motion vector candidates and notifies the matching unit 706.

Additionally, the template search point setting unit 710 sets template regions at respective positions corresponding to CU level template search point motion vectors with respect to one CU level motion vector candidate. The CU level template search point motion vectors are motion vectors around one motion vector candidate to be a base point at the CU level. The reference picture obtaining unit 705 extracts reference images of the CU level template regions set at positions corresponding to the template search point motion vectors and notifies the matching unit 706.

The reference picture obtaining unit 705 identifies a CU block at a position corresponding to the one CU level template search point motion vector (i.e., one determined CU level motion vector) set by the template search point setting unit 710 in the reference picture.

The reference picture obtaining unit 705 extracts reference images of the subCU level template region that have been set by the template search point setting unit 710 from the identified CU block in the reference picture.

The template search point setting unit 710 sets template regions at respective positions corresponding to multiple subCU level motion vector candidates with respect to the subCU level template regions that have been set by the template region setting unit 703 in the identified CU block in the reference picture. The reference picture obtaining unit 705 extracts reference images of the subCU level template regions set at the positions corresponding to the multiple motion vector candidates and notifies the matching unit 706.

Additionally, the template search point setting unit 710 sets template regions at respective positions corresponding to the subCU level template search point motion vectors with respect to the one subCU level motion vector candidate. The subCU level template search point motion vectors are multiple motion vectors around the one motion vector candidate to be the base point at the subCU level. The reference picture obtaining unit 705 extracts reference images of the subCU level template regions set at positions corresponding to the template search point motion vectors and notifies the matching unit 706.

In the CU level motion search, the matching unit 706 calculates the matching degree between a decoded image of the CU level template region, which has been notified by the picture being decoded obtaining unit 704, and a reference image of the CU level template region, which has been notified by the reference picture obtaining unit 705.

The reference images of the CU level template regions notified by the reference picture obtaining unit 705 include reference images extracted based on multiple CU level motion vector candidates and reference images extracted based on the CU level template search point motion vectors. The matching unit 706 notifies the motion vector calculating unit 707 of the calculated matching degree.

The matching unit 706 also calculates the matching degree between a decoded image of the subCU level template region and a reference image of the subCU level template region in the subCU level motion search.

The decoded images of the subCU level template regions are notified by the picture being decoded obtaining unit 704. The reference images of the subCU level template regions are notified by the reference picture obtaining unit 705. The reference images of the subCU level template regions notified by the reference picture obtaining unit 705 include reference images extracted based on multiple subCU level motion vector candidates and reference images extracted based on the subCU level template search point motion vectors. The matching unit 706 notifies the motion vector calculating unit 707 of the calculated matching degree.

The motion vector calculating unit 707 identifies the maximum matching degree from the matching degrees of the reference images of the template regions set at positions corresponding to multiple CU level motion vector candidates among the matching degrees notified by the matching unit 706.

The motion vector calculating unit 707 stores a CU level motion vector candidate corresponding to the identified maximum matching degree in the motion vector storage unit 709 as one motion vector candidate to be the base point at the CU level.

The motion vector calculating unit 707 obtains the CU level matching degrees notified by the matching unit 706 in response to the one motion vector candidate, which is used as the base point at the CU level, being stored in the motion vector storage unit 709. At this time, the matching degrees obtained by the motion vector calculating unit 707 are the matching degrees of the reference images of the template regions set at positions corresponding to the CU level template search point motion vectors (i.e., multiple motion vectors around one motion vector candidate to be the base point at the CU level).

The motion vector calculating unit 707 determines the CU level motion vector in the template matching based on the obtained matching degrees and stores the determined CU level motion vector in the motion vector storage unit 709.

The motion vector calculating unit 707 calculates the cost of the template matching performed by using the determined CU level motion vector. The motion vector calculating unit 707 notifies the cost determining unit 702 of the determined CU level motion vector and cost.

The motion vector calculating unit 707 obtains the subCU level matching degrees notified by the matching unit 706 in response to the determined CU level motion vector being stored in the motion vector storage unit 709. The motion vector calculating unit 707 identifies the maximum matching degree from the matching degrees of the reference images of the template regions set at positions corresponding to multiple subCU level motion vector candidates among the obtained matching degrees.

The motion vector calculating unit 707 stores one subCU level motion vector candidate corresponding to the identified maximum matching degree in the motion vector storage unit 709 as one motion vector candidate to be the base point at the subCU level.

The motion vector calculating unit 707 obtains the subCU level matching degree notified by the matching unit 706 in response to the one motion vector candidate, which is used as the base point at the subCU level, being stored in the motion vector storage unit 709. At this time, the matching degrees obtained by the motion vector calculating unit 707 are the matching degrees of the reference images of the template regions set at positions corresponding to the subCU level template search point motion vectors (i.e., multiple motion vectors around the one motion vector candidate to be the base point at the subCU level). The motion vector calculating unit 707 determines the subCU level motion vector in the template matching based on the obtained matching degrees and notifies the prediction image generating unit 708.

The prediction image generating unit 708 is an example of a generating unit. When a mode of using a motion vector of the non-template matching is notified by the cost determining unit 702 as the CU prediction mode, the prediction image generating unit 708 obtains the motion vector of the non-template matching from the cost determining unit 702. In this case, the prediction image generating unit 708 identifies a reference image corresponding to the motion vector of the non-template matching in the reference picture notified by the reference picture obtaining unit 705. The prediction image generating unit 708 generates the prediction image using the identified reference image to perform the motion compensation inter prediction. The prediction image generating unit 708 outputs the prediction image of the generated CU block as an inter prediction image.

When a mode of using a motion vector of the template matching is notified by the cost determining unit 702 as the CU prediction mode, the prediction image generating unit 708 obtains the determined subCU level motion vector, which is notified successively by the motion vector calculating unit 707.

The prediction image generating unit 708, in the reference picture notified by the reference picture obtaining unit 705, identifies a reference image corresponding to the determined subCU level motion vector, which is successively notified by the motion vector calculating unit 707, and successively outputs the reference image as a prediction image of the subCU to be decoded. Further, the prediction image generating unit 708 generates the prediction image of the CU block by using respective identified reference images. The prediction image generating unit 708 outputs the generated prediction image of the CU block as an inter prediction image.

The motion vector storage unit 709 stores the one motion vector candidate to be the base point at the CU level. The motion vector storage unit 709 stores the determined CU level motion vector. The motion vector storage unit 709 stores the one motion vector candidate to be the base point at the subCU level.

The template search point setting unit 710 sets template regions at respective positions corresponding to multiple CU level motion vector candidates with respect to the CU level template regions in the reference picture set by the template region setting unit 703.

The template search point setting unit 710 determines the CU level template search point motion vector based on the one motion vector candidate to be the base point at the CU level stored in the motion vector storage unit 709. In the reference picture, the template search point setting unit 710 sets template regions at positions corresponding to the CU level template search point motion vector.

The template search point setting unit 710 sets template regions at respective positions corresponding to multiple subCU level motion vector candidates with respect to the subCU level template regions set by the template region setting unit 703 in the CU block in the identified reference picture.

The template search point setting unit 710 determines the subCU level template search point motion vector based on the one motion vector candidate to be the base point at the subCU level stored in the motion vector storage unit 709. In the reference picture, the template search point setting unit 710 sets template regions at respective positions corresponding to the subCU level template search point motion vector.

(4) Flow of the Inter Prediction Process

Figure 8:
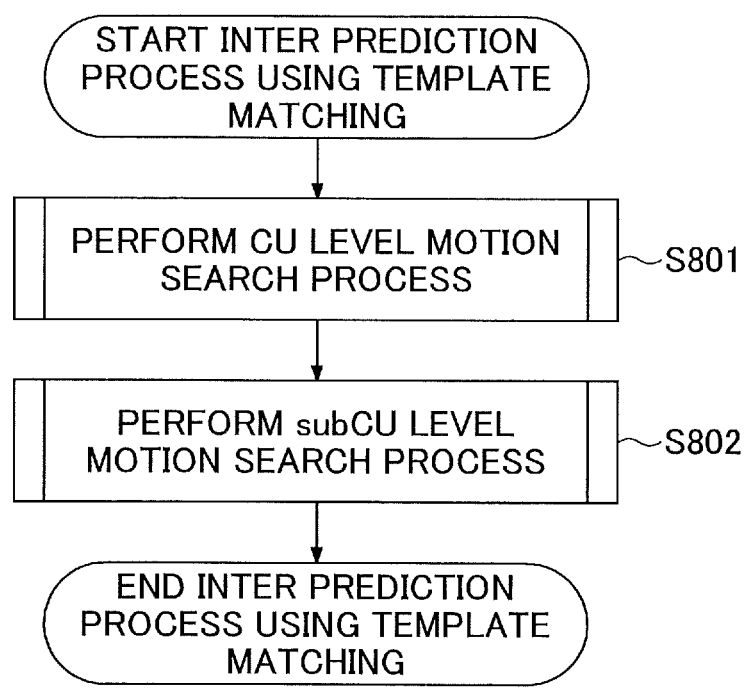
FIG. 8 is a flowchart illustrating a flow of the inter prediction process using template matching in the inter prediction mode being discussed in the next generation codec.

Next, a flow of inter prediction processing using the template matching in the inter prediction mode being discussed in the next generation codec will be described. FIG. 8 is a flowchart illustrating the flow of the inter prediction process using template matching in the inter-prediction mode being discussed in the next generation codec.

In step S801, the intra/inter prediction unit 409 performs a CU-level motion search process to determine a CU-level motion vector.

In step S802, the intra/inter prediction unit 409 performs a subCU level motion search process based on the CU level motion vector determined in step S801 to determine a subCU level motion vector. In the following, the details of steps S801 and S802 will be described.

Flow of the CU level motion search process (step S801)

Figure 9:
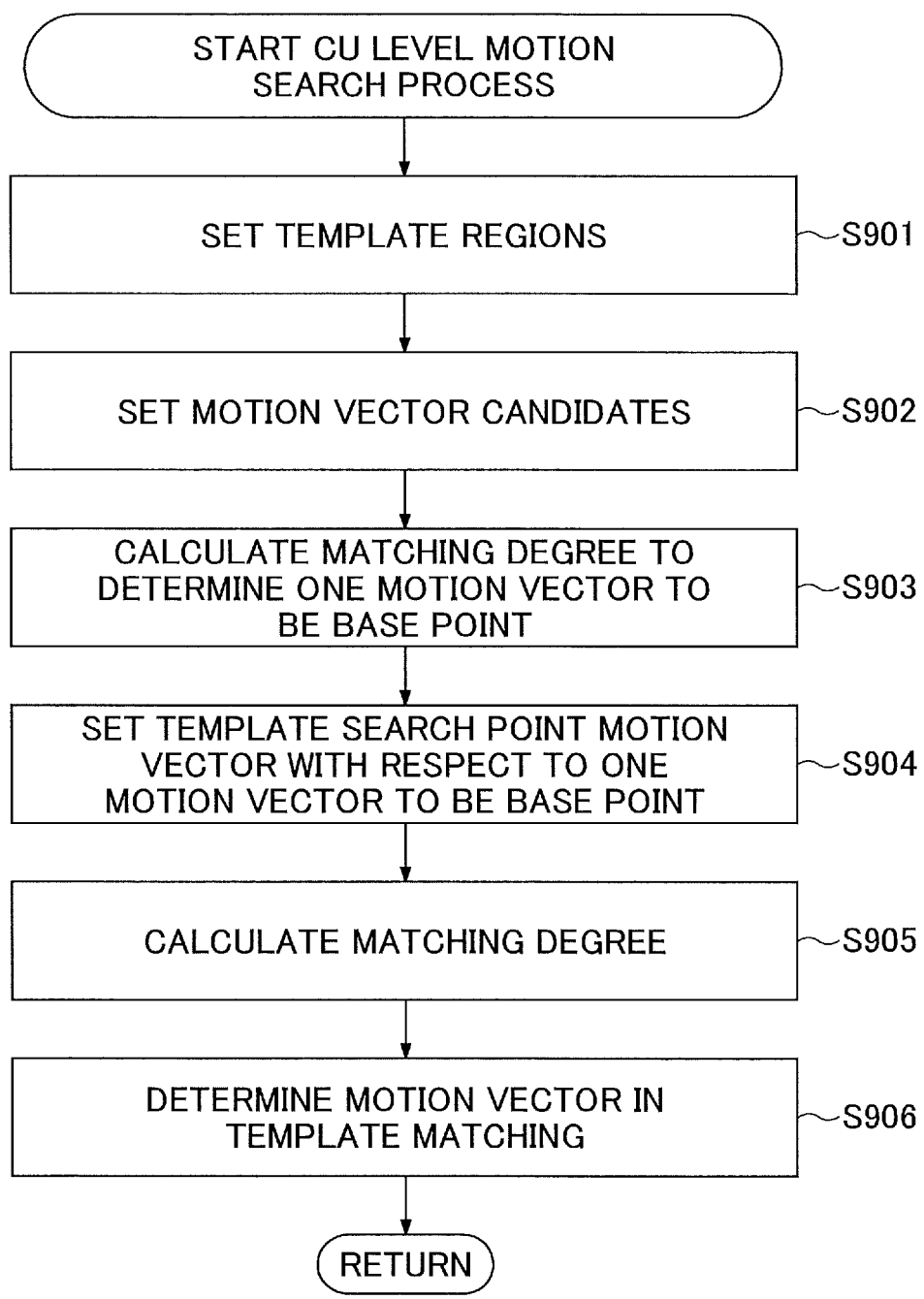
FIG. 9 is a flowchart illustrating a flow of a CU level motion search process, which illustrates the details of step S801.

FIG. 9 is a flowchart illustrating a flow of the CU level motion search process, which illustrates the details of step S801.

In step S901, the template region setting unit 703 sets CU level template regions with respect to the CU block to be decoded in the picture being decoded.

In step S902, the template search point setting unit 710 sets template regions at respective positions corresponding to multiple CU level motion vector candidates in the reference picture.

In step S903, the matching unit 706 calculates the matching degree between the decoded image of the CU level template region set in step S901 and the reference image of the CU level template region set in step S902. The motion vector calculating unit 707 identifies the maximum matching degree among the calculated matching degrees. Further, the motion vector calculating unit 707 determines the CU level motion vector candidate corresponding to the identified maximum matching degree as the one motion vector candidate to be the base point at the CU level.

In step S904, the template search point setting unit 710 sets template regions at respective positions corresponding to the CU level template search point motion vector with respect to the one motion vector candidate to be the base point at the CU level.

In step S905, the matching unit 706 calculates the matching degrees between the decoded images of the CU level template regions set in step S901 and the reference images of the template regions set at the positions corresponding to the CU level template search point motion vectors.

In step S906, the motion vector calculating unit 707 determines a CU level motion vector in the template matching based on the calculated matching degrees. Thus, the reference picture obtaining unit 705 can identify a CU block at a position corresponding to the one determined CU level motion vector (i.e., a CU block in the reference picture corresponding to the CU block to be decoded).

Flow of the subCU level motion search process (step S802)

Figure 10:
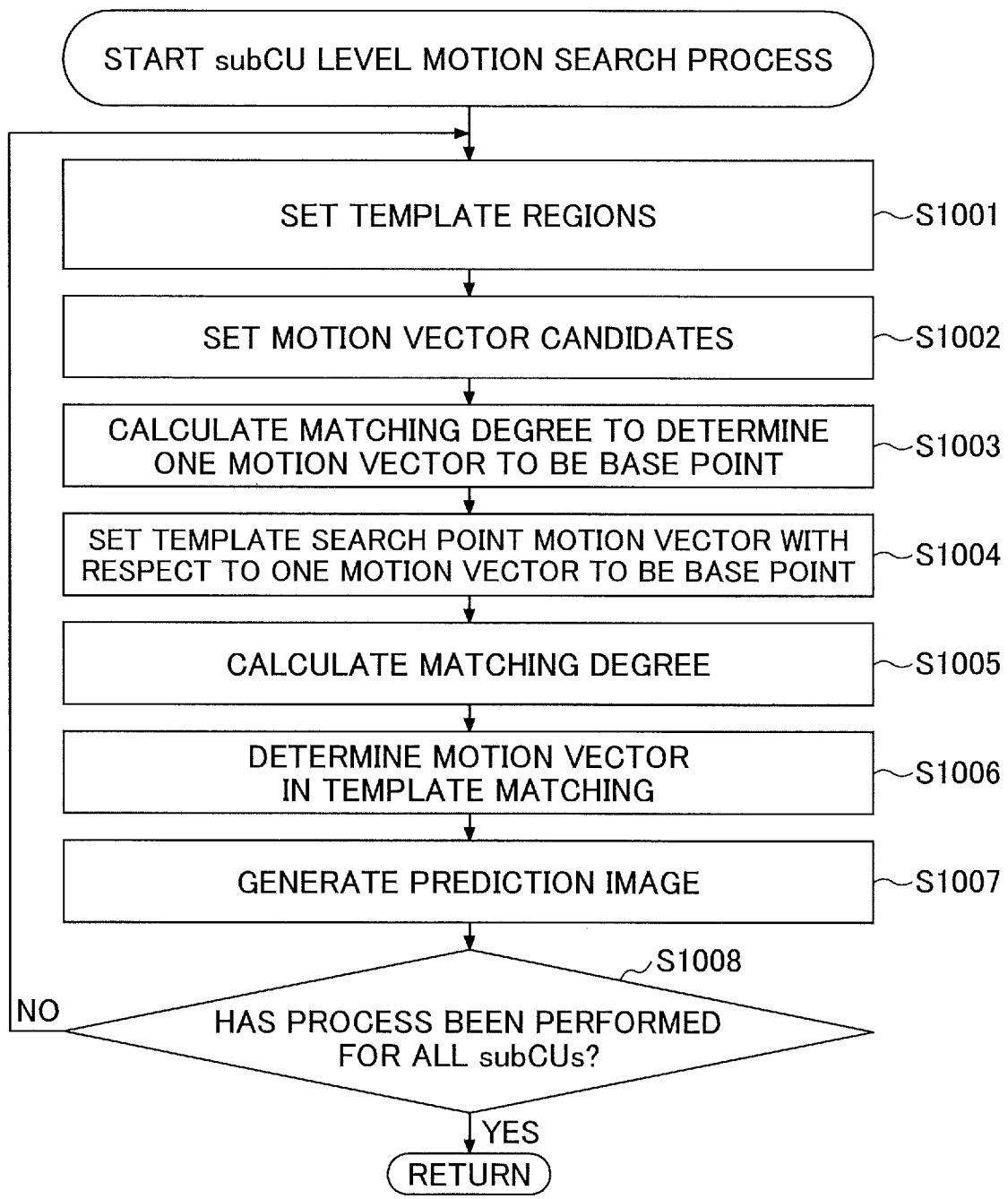
FIG. 10 is a flowchart illustrating a flow of a subCU level motion search process, which illustrates the details of step S802.

FIG. 10 is a flowchart illustrating a flow of the subCU level motion search process, which illustrates the details of step S802.

In step S1001, the template region setting unit 703 sets subCU level template regions with respect to the subCU to be decoded in the picture being decoded.

In step S1002, the template search point setting unit 710 sets template regions at respective positions corresponding to multiple subCU level motion vector candidates in the CU block in the reference picture identified by the reference picture obtaining unit 705.

In step S1003, the matching unit 706 calculates the matching degrees between the decoded images of the subCU level template regions set in step S1001 and the reference images of the subCU level template regions set in step S1002. The motion vector calculating unit 707 identifies the maximum matching degree among the calculated matching degrees. Further, the motion vector calculating unit 707 determines the subCU level motion vector candidate corresponding to the identified maximum matching degree as the one motion vector candidate to be the base point at the subCU level.

In step S1004, the template search point setting unit 710 sets template regions at respective positions corresponding to the subCU template search point level motion vectors with respect to the one motion vector candidate to be the base point at the subCU level.

In step S1005, the matching unit 706 calculates the matching degree between the decoded images of the subCU level template regions set in step S1001 and the reference images of the template regions set at the positions corresponding to the subCU level template search point motion vector.

In step S1006, the motion vector calculating unit 707 determines the subCU level motion vector in the template matching based on the calculated matching degrees.

In step S1007, the prediction image generating unit 708 identifies the reference image corresponding to the determined sub CU level motion vector and outputs the determined reference image as the prediction image of the subCU to be decoded. Further, the prediction image generating unit 708 generates the prediction image of the CU block by using respective determined reference images and outputs the prediction image as the inter prediction image.

The prediction image of the subCU output by the prediction image generating unit 708 is added to the signal obtained from the inverse orthogonal transformation unit 406 and is input to the loop filter 407 as the decoded image of the subCU.

In step S1008, the picture being decoded obtaining unit 704 determines whether the prediction image is output for all subCUs included in the CU to be processed in the picture being decoded. In step S1008, when it is determined that there is a subCU that does not output the prediction image (i.e., NO in step S1008), the process returns to step S1001.

In step S1008, when it is determined that the prediction image has been output for all of the subCUs included in the CU to be processed in the picture being decoded (i.e., YES in step S1008), the subCU level motion search process is terminated.

(5) Timing Chart for Each subCU

Figure 11A:
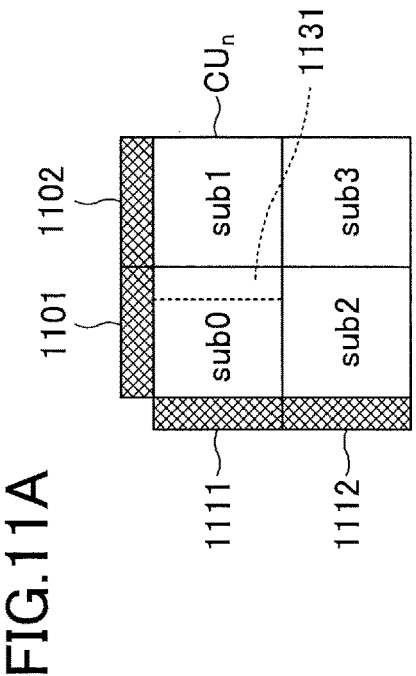
FIGS. 11A and 11B are drawings illustrating processing contents and processing timings for each subCU in the inter prediction mode being discussed in the next generation codec.
Figure 11B:
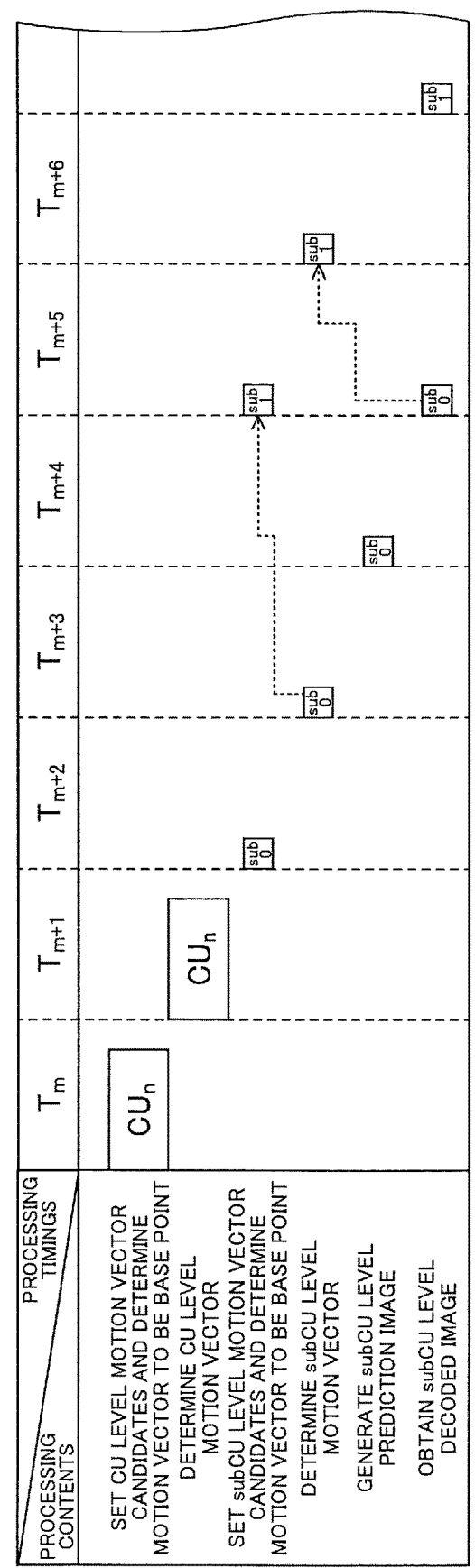

Next, processing contents and processing timings for each subCU in the inter prediction mode being discussed in the next generation codec will be described. FIG. 11A and FIG. 11B are drawings illustrating the processing contents and the processing timings for each subCU in the inter prediction mode being discussed in the next generation codec.

FIG. 11A illustrates an example of the CU block including subCUs to be decoded. The example of FIG. 11A indicates that the CU block including the subCUs to be decoded is "$CU_n$", and the CU block includes four subCUs (i.e., "sub0", "sub1", "sub2", and "sub3"). The example of FIG. 11A also indicates that decoded images have been respectively generated with respect to an upper CU block and a left CU block that are adjacent to the "$CU_n$". Further, the example of FIG. 11A indicates that portions of the decoded images of the adjacent CU blocks are set as template regions 1101, 1102, 1111, and 1112.

FIG. 11B is a drawing illustrating the processing timings when the intra/inter prediction unit 409 performs a process on the four subCUs included in the "$CU_n$". The example of FIG. 11B divides the process performed by the intra/inter predicting unit 409 into the following items.

Set the CU level motion vector candidates and determine one motion vector candidate to be the base point
Determine the CU level motion vector
Set the subCU level motion vector candidates and determine one motion vector candidate to be the base point
Determine the subCU level motion vector
Generate the subCU level prediction image
Obtain the subCU-level decoded image In the example of FIG. 11B, the processing timings "$T_m$" to "$T_{m+6}$" are illustrated for the convenience of space of the drawing.

First, as illustrated in FIG. 11B, at the processing timing "$T_m$", template regions are set at respective positions corresponding to the CU level motion vector candidates with respect to the "$CU_n$", and one motion vector candidate to be the base point at the CU level is determined. Subsequently, at the processing timing "$T_{m+1}$", the CU level motion vector is determined with respect to "$CU_n$".

At the processing timing "$T_{m+2}$", template regions are set at respective positions corresponding to the subCU level motion vector candidates with respect to the "sub0", and one motion vector candidate to be the base point at the subCU level is determined. Subsequently, at the processing timing "$T_{m+3}$", the subCU level motion vector is determined with respect to the "sub0". Here, when determining the motion vector of the "sub0", decoded images of template regions 1101 and 1111 are used.

At the processing timing "$T_{m+4}$", the prediction image is generated for the "sub0", and the prediction image is output. Further, the decoded image is generated in response to the prediction image being output, and the decoded image generated for "sub0" is obtained at the processing timing "$T_{m+5}$".

In response to the decoded image for sub0 being obtained, a template region 1131 to be used for determining the subCU level motion vector can be set with respect to "sub1".

Thus, at the processing timing "$T_{m+5}$", the template regions are set at respective positions corresponding to the subCU level motion vector candidates with respect to the "sub1", relative to the subCU level motion vector determined with respect to the "sub0", and one motion vector candidate to be the base point at the subCU level is determined. Subsequently, at the processing timing "$T_{m+6}$", the subCU level motion vector is determined with respect to the "sub1". When determining the motion vector of the "sub1", decoded images of template regions 1102 and 1131 are used.

As described, in a case of the inter prediction mode being discussed in the next generation codec, it is necessary that the decoded images of the upper and left subCUs adjacent to the subCU to be decoded have been generated in order to determine the subCU level motion vector (see dotted arrows in FIG. 11B). Therefore, the inter prediction mode being discussed in the encoder of the next generation codec is not considered as being highly efficient.

<4.2 Inter Prediction Process Using Template Matching in the Inter Prediction Mode of an Encoder According to the First Embodiment>

Next, an inter prediction process using template matching in the inter prediction mode of an encoder according to the first embodiment will be described.

Figure 12:
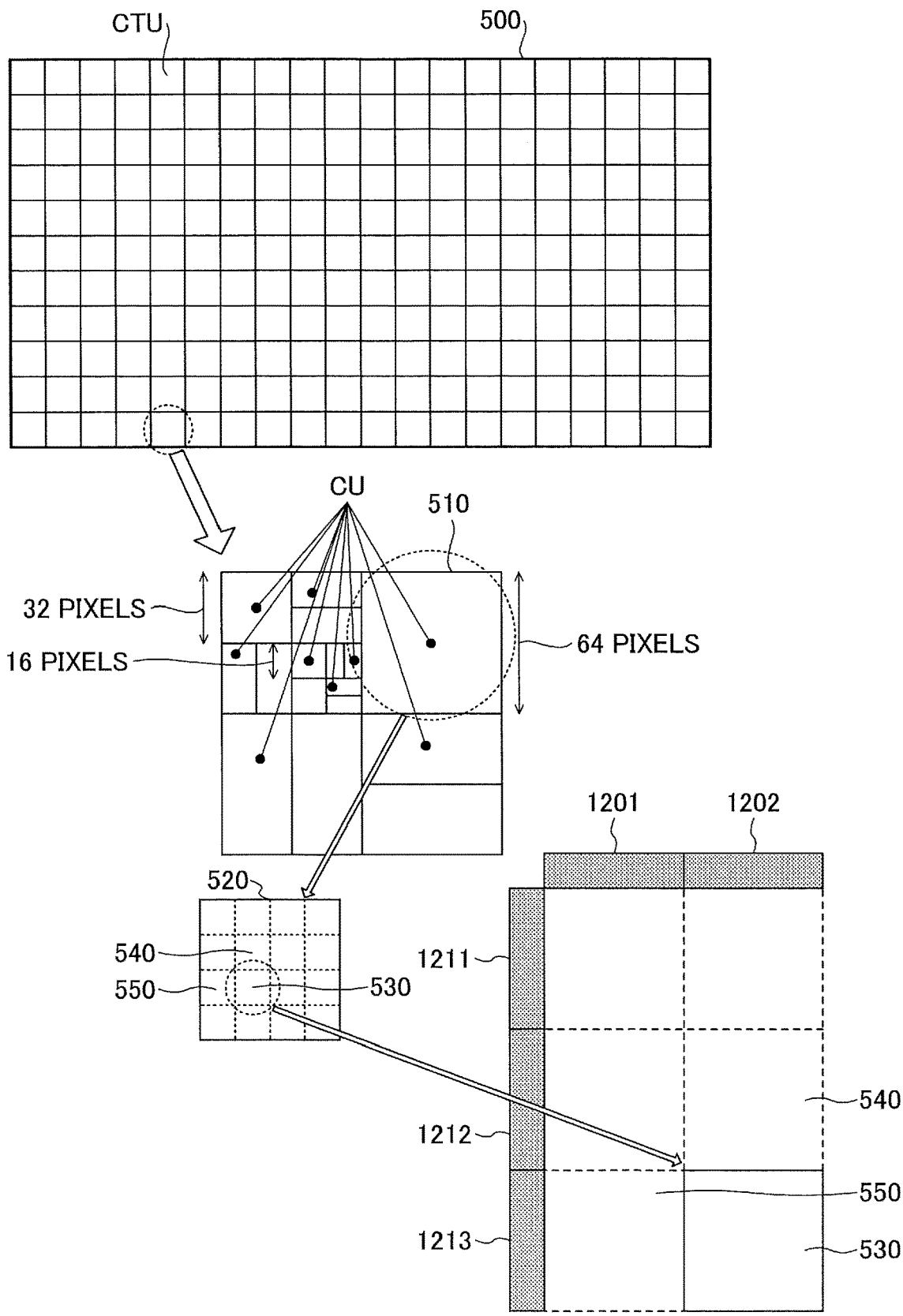
FIG. 12 is a drawing for describing a rectangular region to be decoded and template regions in an inter prediction mode of an encoder according to a first embodiment.

(1) Description of a Rectangular Region (subCU) to be Decoded and Template Regions First, a rectangular region to be decoded and template regions used when the inter prediction process using template matching is performed in the inter prediction mode of the encoder according to the first embodiment will be described. FIG. 12 is a drawing for describing the rectangular region to be decoded and the template regions in the inter prediction mode of the encoder according to the first embodiment.

As described with reference to FIG. 5, the encoder according to the first embodiment also partitions the CTU 510 of 128×128 pixels of the input picture (i.e., the input frame) 500 into CU blocks. With respect to the CU blocks, the inter prediction using the template matching is performed (see FIG. 12).

The CU block 520 is an enlarged view of a square partitioned block of 64×64 pixels. As described with reference to FIG. 5, in the inter prediction mode in the next generation codec, rectangular regions, such as the subCUs 530, 540, and 550, are generated, and the prediction image and the decoded image are generated for each subCU used as a block to be decoded.

However, in the encoder according to the first embodiment, the prediction images and the decoded images of multiple subCUs are generated in parallel. Thus, in the encoder according to the first embodiment, portions of blocks adjacent to a predetermined block are set as template regions. The predetermined block is a coding unit block including multiple subCUs to be decoded. In the example of FIG. 12, the predetermined block is the CU block 520.

For example, when the subCU to be decoded is the subCU 530, both the prediction images and the decoded images of the following blocks have been generated at the time of performing the template matching.

A CU block adjacent to the upper side of the CU block 520 including the subCU 530 to be decoded A CU block adjacent to the left side of the block 520 to be decoded including the subCU 530 to be decoded Thus, in the encoder according to the first embodiment, portions of the CU blocks adjacent to the upper side and the left side are set as template regions 1202 and 1213, and the template matching is performed with respect to the subCU 530 to be decoded.

Similarly, when the subCU to be decoded is the subCU 540 for example, both the prediction images and the decoded images of the following blocks have been generated at the time of performing the template matching.

A CU block adjacent to the upper side of the CU block 520 including the subCU 540 to be decoded A CU block adjacent to the left side of the CU block 520 including the subCU 540 to be decoded Thus, in the encoder according to the first embodiment, portions of the CU blocks adjacent to the upper side and the left side are set as template regions 1202 and 1212, and the template matching is performed with respect to the subCU 540 to be decoded. That is, with respect to the subCU 530 and the subCU 540, the template matching can be performed in parallel (the same applies to the subCU 550 and others).

As described above, by setting portions of the coding unit (CU) blocks on the upper side and the left side of the CU block including the subCU to be decoded as template regions, it is possible to perform the template matching in parallel for multiple subCUs.

(2) Overview of the Template Matching

Figure 13:
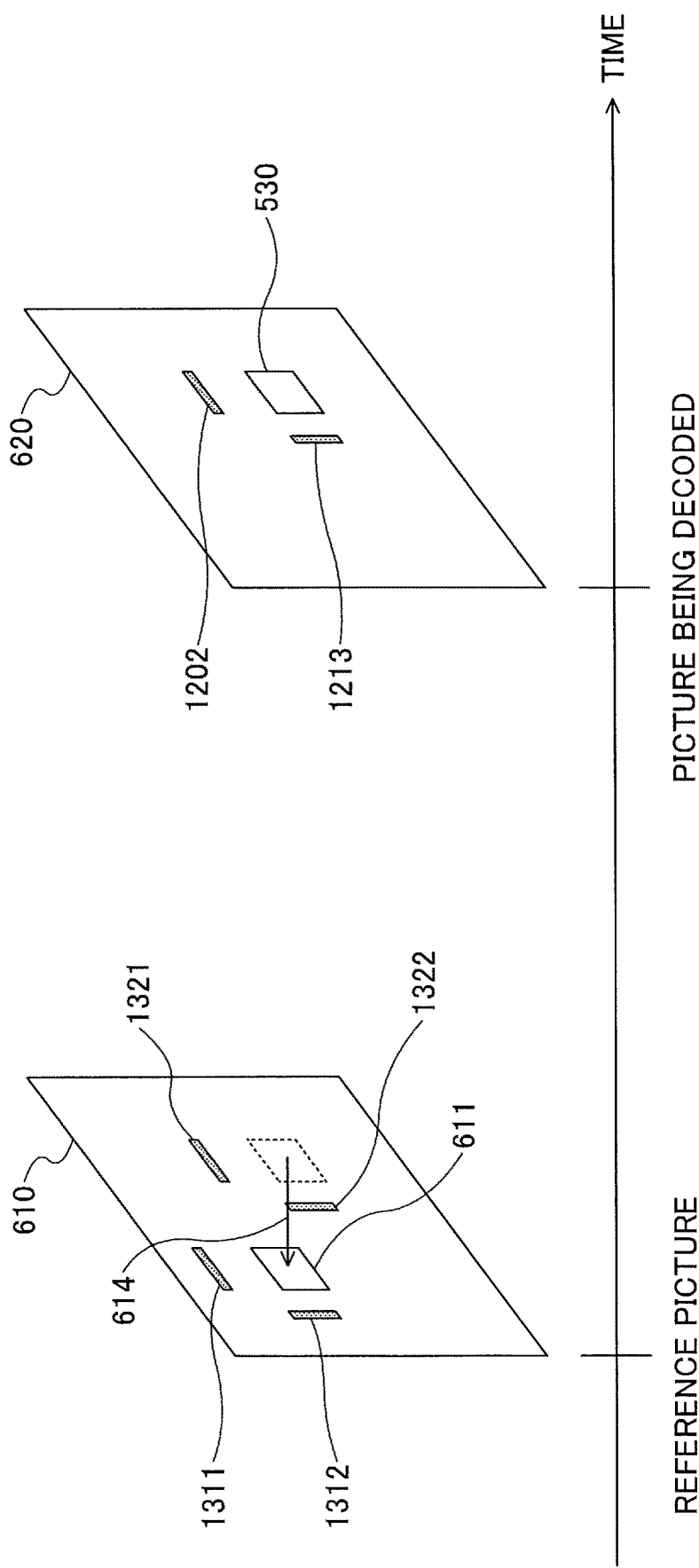
FIG. 13 is a drawing illustrating an overview of template matching in the inter prediction mode of the encoder according to the first embodiment.

Next, an overview of the template matching in the inter prediction mode of the encoder according to the first embodiment will be described. FIG. 13 is a drawing illustrating an overview of the template matching in the inter prediction mode of the encoder according to the first embodiment.

In FIG. 13, the picture 620 is a picture (i.e., a frame) being decoded by the intra/inter predicting unit 409. The example of FIG. 13 illustrates a state in which the template regions 1202 and 1213 have been set with respect to the subCU 530 to be decoded.

In FIG. 13, the picture 610 is a reference picture (i.e., a decoded picture different in time from the picture 620 being decoded) in which matching with the template regions set in the picture 620 being decoded is performed.

The example of FIG. 13 illustrates a state in which template regions 1321 and 1322 (i.e., second template regions) are set as regions in the picture 610 corresponding to the set template regions 1202 and 1213 (i.e., first template regions).

The example of FIG. 13 illustrates a state in which template regions 1311 and 1312 (i.e., third template regions) are set by moving the template regions 1321 and 1322 by using a predetermined vector (i.e., the vector 614) in the picture 610.

Further, the example of FIG. 13 illustrates a state in which the vector 614 has been determined as the motion vector of the subCU 530 to be decoded, since an image matching degree calculated between template regions 1311 and 1312 and template regions 1202 and 1213 is maximum.

As described, portions of the decoded images of the CU blocks adjacent to the CU block including the subCU 530 to be decoded are set as the template regions 1202 and 1213, and matching is performed in the picture 610, so that the motion vector 614 to be used for the motion compensation inter prediction can be determined.

(3) Functional Configuration of the Intra/Inter Prediction Unit of the Encoder

Figure 14:
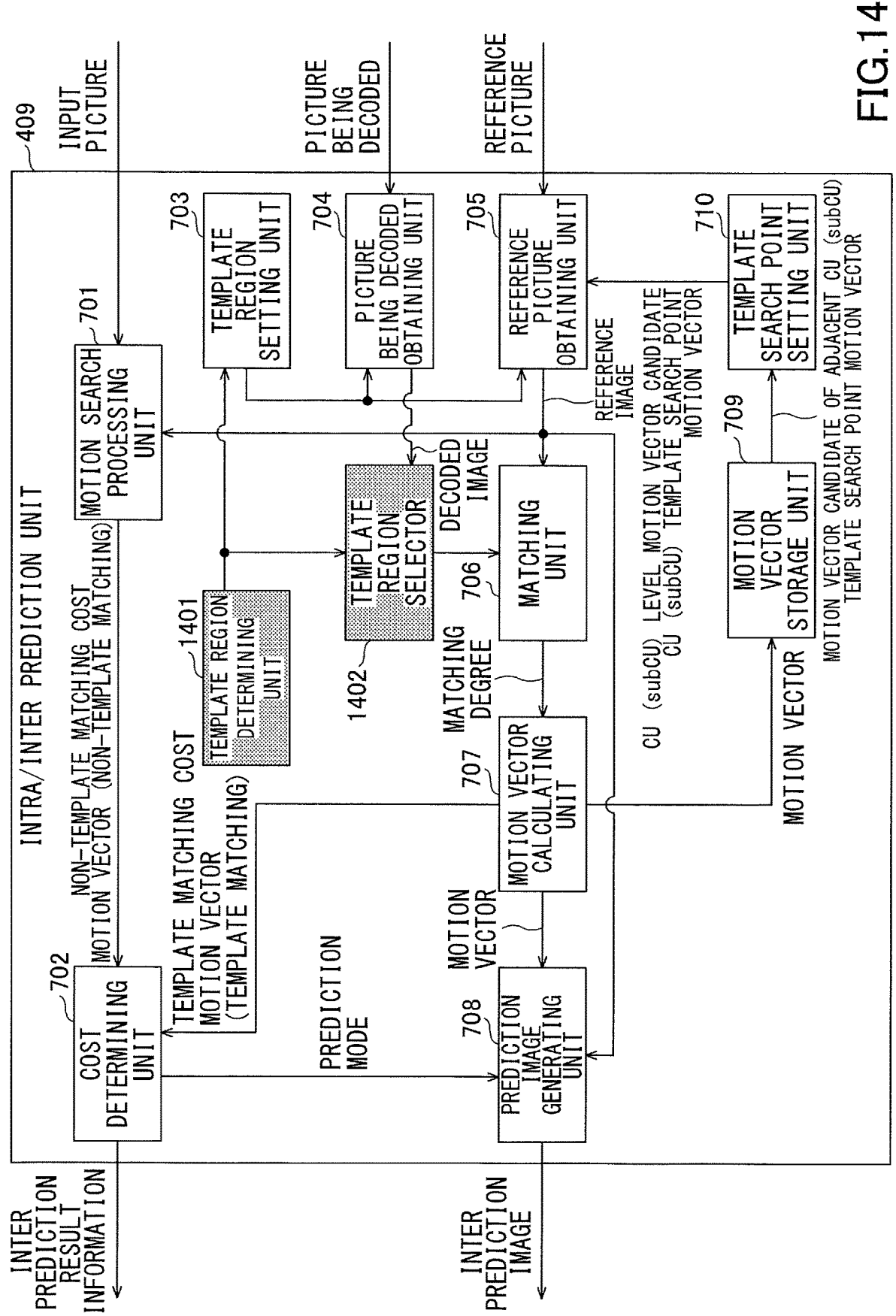
FIG. 14 is a drawing illustrating an example of a functional configuration for achieving an inter prediction process using template matching in the inter prediction mode of the encoder according to the first embodiment.

Next, a functional configuration for achieving the inter prediction process using template matching in the inter prediction mode of the encoder according to the first embodiment will be described. FIG. 14 is a drawing illustrating an example of the functional configuration for achieving the inter prediction process using template matching in the inter prediction mode of the encoder according to the first embodiment.

FIG. 14 differs from FIG. 7 in that a template region determining unit 1401 and a template region selector 1402 are included in FIG. 14. In the following, differences from FIG. 7 will be mainly described.

The template region determining unit 1401 determines whether the subCU to be decoded satisfies a predetermined execution condition. The template region determining unit 1401 notifies the template region setting unit 703 of a determined result of whether the predetermined execution condition is satisfied.

In the template region setting unit 703, when the template region determining unit 1401 notifies the determination result indicating that the predetermined execution condition is not satisfied, the template regions described with reference to FIG. 5 are set to the picture being decoded obtaining unit 704. Specifically, a portion of a decoded image of a subCU adjacent to the upper side of the subCU to be decoded and a portion of a decoded image of a subCU adjacent to the left side of the subCU to be decoded are set as template regions. In this case, the picture being decoded obtaining unit 704 notifies the template region selector 1402 of the decoded images of the template regions set by the template region setting unit 703 among the decoded images included in the picture being decoded (i.e., portions of the decoded images of the adjacent subCUs).

When the template region determining unit 1401 notifies the determined result indicating that the predetermined execution condition is satisfied, the template region setting unit 703 sets the template regions described with reference to FIG. 12 to the picture being decoded obtaining unit 704. Specifically, the template region setting unit 703 identifies a CU block including the subCU to be decoded and sets portions of the decoded images of CU blocks adjacent to the upper and left sides of the identified CU block as the template regions. In this case, the picture being decoded obtaining unit 704 notifies the template region selector 1402 of the decoded images of the template regions set by the template region setting unit 703 among the decoded images included in the picture being decoded (i.e., portions of the decoded images of the adjacent CU blocks).

When the template region selector 1402 is notified of the determined result indicating that the predetermined execution condition is not satisfied, the template region selector 1402 selects the decoded images of the template regions notified by the picture being decoded obtaining unit 704 (i.e., portions of the decoded images of the adjacent subCUs). The template region selector 1402 notifies the matching unit 706 of the decoded images of the selected template regions. This enables the matching unit 706 to perform the template matching on the subCU to be decoded in the reference picture by using the decoded images of the template regions according to the determined result notified by the template region determining unit 1401.

When the template region selector 1402 is notified of the determined result indicating that the predetermined execution condition is satisfied, the template region selector 1402 selects the decoded images of the template regions notified by the picture being decoded obtaining unit 704 (i.e., portions of the decoded images of the adjacent CU blocks). The template region selector 1402 notifies the matching unit 706 of the selected decoded images of the template regions. This enables the matching unit 706 to perform the template matching on the subCU to be decoded in the reference picture by using the decoded images of the template regions according to the determined result notified by the template region determining unit 1401.

(4) Execution Condition Information

Next, the execution condition of the template matching determined by the template region determining unit 1401 when the template matching is performed on the subCU to be decoded will be described. FIG. 15 is a drawing illustrating the execution condition of the template matching in the inter prediction mode of the encoder according to the first embodiment.

As illustrated in FIG. 15, execution condition information 1500 includes a "determination item of the execution condition", a "threshold of the determination item", and a "determination reason" as items of the information.

The "determination item of the execution condition" stores a determination item for determining whether the execution condition is satisfied for the subCU to be decoded.

The "threshold of the determination item" stores a threshold for determining that a determination item stored in a corresponding "determination item of the execution condition" satisfies the execution condition. The "determination reason" stores a reason for determining that the execution condition is satisfied.

The example of FIG. 15 illustrates that the "subCU size" is included as the "determination item of the execution condition", and when the size of the subCU to be decoded is smaller than or equal to a predetermined threshold size (i.e., "8×8 pixels or smaller"), it is determined that the execution condition is satisfied. When the subCU size is small, the encoder processing efficiency is reduced if the processing does not proceed to the next subCU unless the generation of prediction images and decoded images for the adjacent subCUs are completed.

Therefore, in the encoder according to the first embodiment, when the subCU block to be decoded is a subCU smaller than or equal to the predetermined size, portions of the decoded images of the CU blocks adjacent to the CU block including the subCU to be decoded are set as template regions. This enables the encoder according to the first embodiment to achieve parallel processing that performs the template matching in parallel on multiple subCUs.

The example of FIG. 15 illustrates that a "picture type" is included as the "determination item of the execution condition", and when a picture type of the subCU to be decoded is a "non-reference picture", it is determined that the execution condition is satisfied. When the picture type is a non-reference picture, the subCU to be decoded is not a picture referenced by another picture being decoded in the template matching. This is based on a consideration that when a region away from the subCU to be decoded is set as a template region, even if the encoding error increases, the encoding error itself is not accumulated because the decoded picture is not referenced.

Therefore, in the encoder according to the first embodiment, when the subCU block to be decoded is a subCU of a non-reference picture, portions of the decoded images of the CU blocks adjacent to the CU block including the subCU to be decoded are set as template regions. This enables the encoder according to the first embodiment to achieve parallel processing that performs the template matching in parallel on multiple subCUs.

As described, when the execution condition defined in the execution condition information 1500 is satisfied, the processing efficiency can be improved without affecting the image quality by performing the parallel processing.

(5) Flow of the Inter Prediction Process (Flow of the subCU Level Motion Search Process)

Next, in the inter prediction mode of the encoder according to the first embodiment, a flow of the inter prediction process using template matching will be described. As an entire flow of the inter prediction process using template matching in the inter prediction mode of the encoder according to the first embodiment is similar to the flow in FIG. 8, the description will be omitted here.

The flow of step S801 of FIG. 8 among the steps in FIG. 8 (i.e., the CU level motion search process), which is described in detail in FIG. 9, is the same in the inter prediction mode of the encoder according to the first embodiment. Thus, step S802 (i.e., the subCU level movement search process) among the steps in FIG. 8 will be described.

Figure 16:
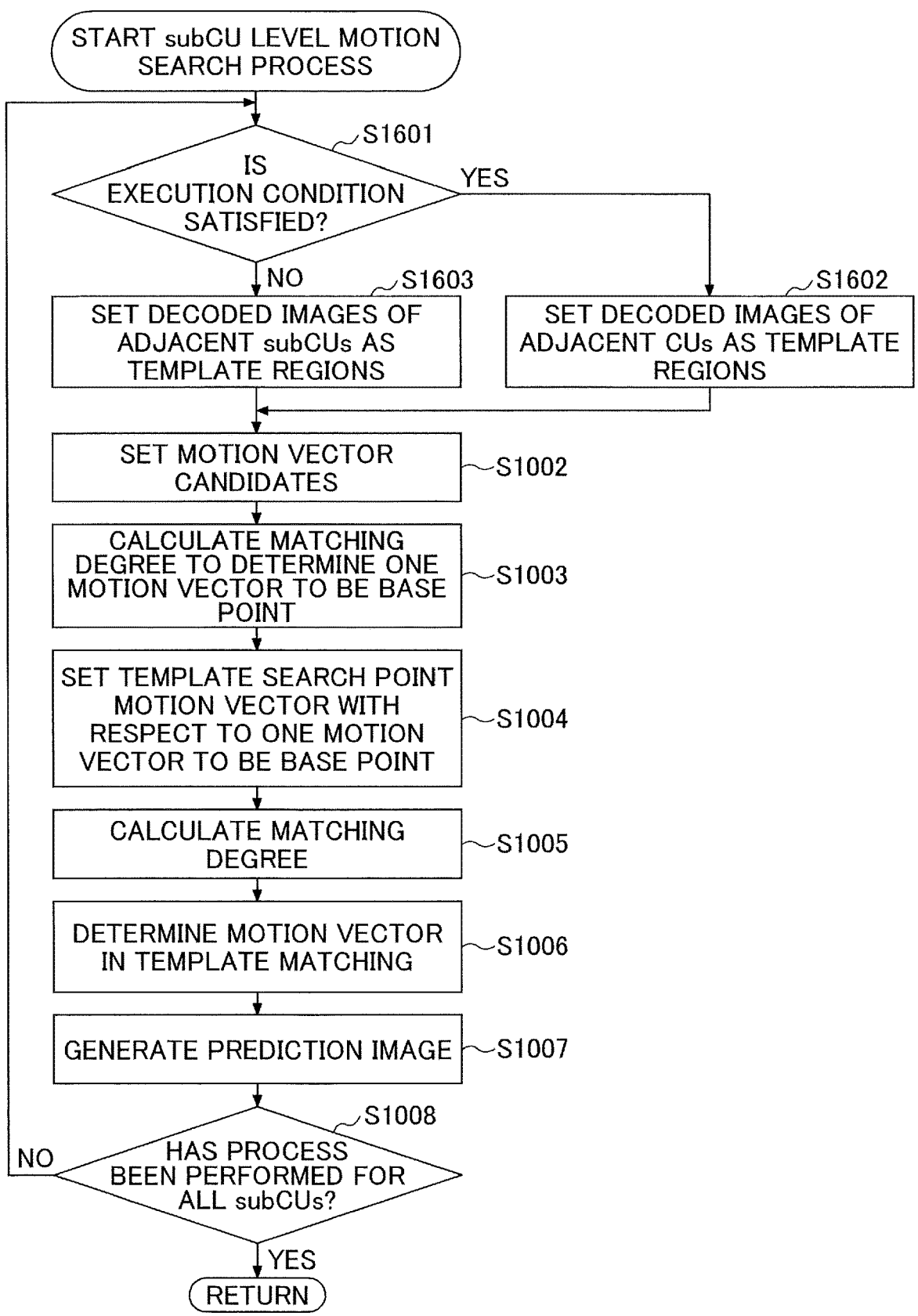
FIG. 16 is a flowchart illustrating a flow of a subCU level motion search process in the inter prediction mode of the encoder according to the first embodiment.

FIG. 16 is a flowchart illustrating a flow of a subCU level motion search process in the inter prediction mode of the encoder according to the first embodiment. Steps from step S1601 to step S1603 are different from FIG. 10.

In step S1601, the template region determining unit 1401 determines whether the subCU to be decoded satisfies the execution condition illustrated in the execution condition information 1500. In step S1601, when it is determined that the execution condition is satisfied (i.e., YES in step S1601), the process proceeds to step S1602.

In step S1602, the template region setting unit 703 sets portions of the decoded images of the CU blocks adjacent to the CU block including the subCU to be decoded as template regions.

In step S1601, when it is determined that the execution condition is not satisfied (i.e., NO in step S1601), the process proceeds to step S1603. In step S1603, the template region setting unit 703 sets portions of the decoded images of the subCUs adjacent to the subCU to be decoded as template regions.

(6) Timing Chart for Each subCU

Figure 17A:
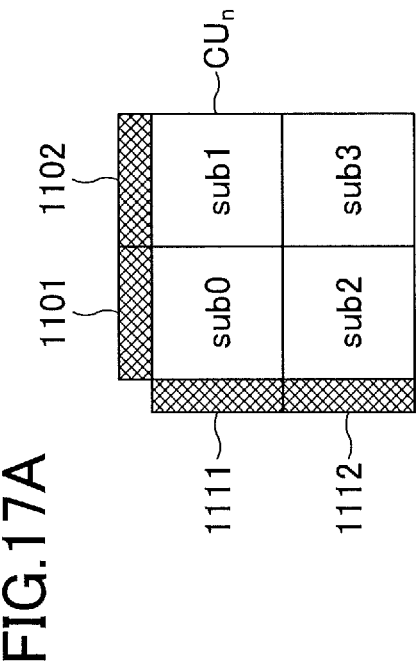
FIGS. 17A and 17B are drawings illustrating processing contents and processing timings for each subCU in the inter prediction mode of the encoder according to the first embodiment.
Figure 17B:
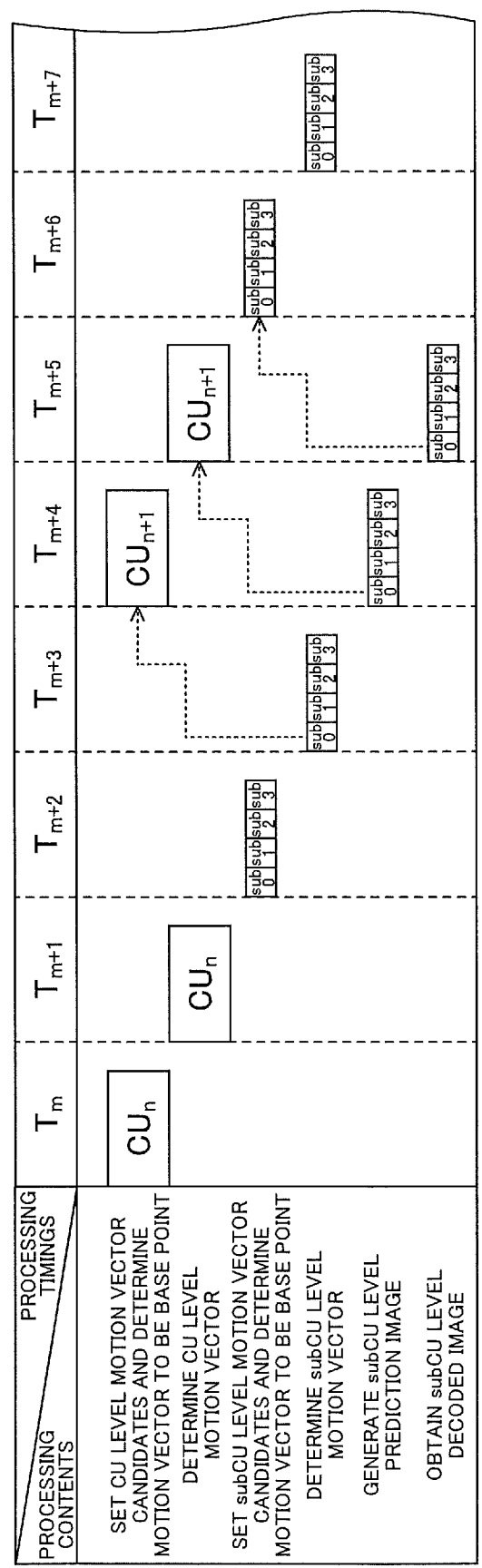

Next, processing contents and processing timings for each subCU in the inter prediction mode of the encoder according to the first embodiment will be described. FIG. 17A and FIG. 17B are drawings illustrating the processing contents and the processing timings for each subCU in the inter prediction mode of the encoder according to the first embodiment.

FIG. 17A illustrates an example of a CU block including subCUs to be decoded. The example of FIG. 17A illustrates that a CU block including the subCU to be decoded is "$CU_n$", and the CU block includes regions of four subCUs ("sub0", "sub1", "sub2", and "sub3"). The example of FIG. 17A illustrates that decoded images have been generated for both upper and left CU blocks adjacent to "$CU_n$". The example of FIG. 17A also illustrates that portions of the decoded images of the adjacent CU blocks are set as template regions 1101 to 1112.

FIG. 17B is a drawing illustrating processing timings when the intra/inter predicting unit 409 performs the processing on the four subCUs included in the "$CU_n$". As in FIG. 11B, the example of FIG. 17B divides the process performed by the intra/inter predicting unit 409 into the following items.

Set the CU level motion vector candidates and determine one motion vector candidate to be the base point Determine the CU level motion vector
Set the subCU level motion vector candidates and determine one motion vector candidate to be the base point
Determine the subCU level motion vector
Generate the subCU-level prediction image
Obtain the subCU level decoded image In the example of FIG. 17B, the processing timings "$T_m$" to "$T_{m+7}$" are illustrated for the convenience of space. Here, the following description assumes that the subCU to be decoded satisfies the execution condition defined in the execution condition information 1500.

As illustrated in FIG. 17B, at the processing timing "$T_m$", template regions are set at respective positions corresponding to the CU level motion vector candidates with respect to the "$CU_n$" and one motion vector candidate to be the base point at the CU level is determined. Subsequently, at the processing timing "$T_{m+1}$", the CU level motion vector is determined with respect to "$CU_n$".

Subsequently, at the processing timing "$T_{m+2}$", template regions are set at respective positions corresponding to the subCU level motion vector candidates with respect to the "sub0" to "sub3", and processes each determining one motion vector candidate to be the base point at the subCU level are performed in parallel. Subsequently, at the processing timing "$T_{m+3}$", processes respectively determining the subCU level motion vectors with respect to "sub0" to "sub3" are performed in parallel.

The subCU level motion vector for the "sub0" is determined by template matching using decoded images of the template regions 1101 and 1111. The subCU level motion vector for the "sub1" is determined by template matching using decoded images of the template regions 1102 and 1111. The subCU level motion vector for the "sub2" is determined by template matching using decoded images of the template regions 1101 and 1112. The subCU level motion vector for the "sub3" is determined by template matching using decoded images of the template regions 1102 and 1112.

When the subCU level motion vectors of "sub0" to "sub3" are determined, the process proceeds to the processing of "$CU_{n+1}$", which is a CU block next to "$CU_n$", and setting the CU level motion vector candidates and determining one motion vector candidate to be the base point are performed.

Specifically, at the processing timing "$T_{m+4}$", template regions are set at respective positions corresponding to the CU level motion vector candidates with respect to the "$CU_{n+1}$", and one motion vector candidate to be the base point at the CU level is determined. Subsequently, at processing timing "$T_{m+5}$", the CU level motion vector is determined for "$CU_{n+1}$".

At the processing timing "$T_{m+4}$", prediction images of the "sub0" to "sub3" are generated and output in parallel. Because the subCU level motion vector has been already determined for each of the "sub0" to "sub3", generating the prediction images can be performed in parallel.

Further, the prediction image is output to generate a decoded image, and at the processing timing "$T_{m+5}$", the decoded image generated for each of the "sub0" to the "sub3" is obtained. Since the prediction image has already been output for each of the "sub0" to the "sub3", obtaining the decoded images can be performed in parallel.

The respective decoded images of the "sub0" to "sub3" are obtained, and then it is possible to determine the motion vectors for the subCUs included in the "$CU_{n+1}$" block, which is a CU block next to the "$CU_n$".

Thus, first, at the processing timing "$T_{m+6}$", template regions are set at respective positions corresponding to the CU level motion vector candidates with respect to "$CU_{n+1}$", and one motion vector candidate to be the base point at the subCU level is determined. Subsequently, at the processing timing "$T_{m+7}$", processes determining the subCU level motion vectors for the "sub0" to the "sub3" are performed in parallel.

As described above, the encoder according to the first embodiment can perform the parallel processing for the multiple subCUs, thereby improving the processing efficiency. As a result, the decoded images can be generated for the four subCUs included in the "$CU_n$" between the processing timing "$T_m$" and the processing timing "$T_{m+5}$".

(7) First Specific Example of the Parallel Processing

Next, a specific example of the parallel processing performed on multiple subCUs in the inter prediction mode of the encoder according to the first embodiment will be described. FIG. 18 is a first drawing illustrating a specific example of the parallel processing in the inter prediction mode of the encoder according to the first embodiment. The example of FIG. 18 illustrates parallel processing performed on subCUs included in a CU block 1800 of 8×8 pixels generated by partitioning the CTU 510 of 128×128 pixels (because the subCU size is 4×4 pixels, the parallel processing is performed).

In the example of FIG. 18, the CU block 1800 is partitioned into four subCUs. In the example of FIG. 18, with respect to the four subCUs, portions of decoded images of CU blocks adjacent to the upper and left sides of the CU block 1800 are set as template regions 1801, 1802, 1811, and 1812. This enables parallel processing to be performed on the four subCUs included in the CU block 1800.

(8) Second Specific Example of the Parallel Processing

Figure 19:
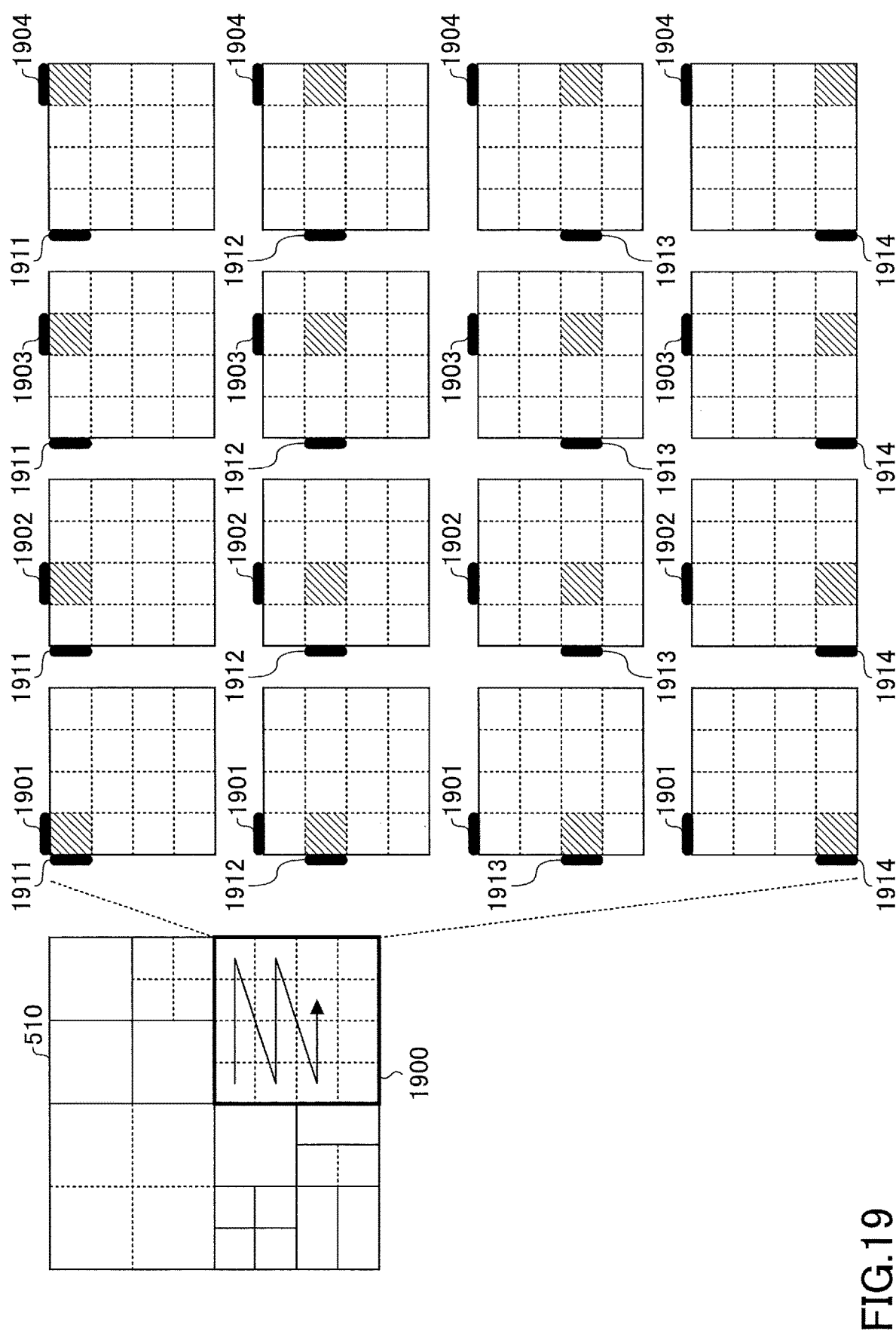
FIG. 19 is a second drawing illustrating a specific example of parallel processing in the inter prediction mode of the encoder according to the first embodiment.

FIG. 19 is a second drawing illustrating a specific example of the parallel processing in the inter prediction mode of the encoder according to the first embodiment. The example of FIG. 19 illustrates parallel processing performed on subCUs included in a CU block 1900 of 64×64 pixels generated by partitioning the CTU 510 of 128×128 pixels. The following description assumes that the parallel processing is performed because the picture type is a non-reference image.

In the example of FIG. 19, the CU block 1900 is partitioned into 16 subCUs. In the example of FIG. 19, with respect to the 16 subCUs, portions of decoded images of CU blocks adjacent to the upper and left sides of the CU block 1900 are set as template regions 1901 to 1904 and 1911 to 1914. This enables parallel processing to be performed on 16 subCUs included in the CU block 1900.

(9) Third Specific Example of the Parallel Processing

Figure 20:
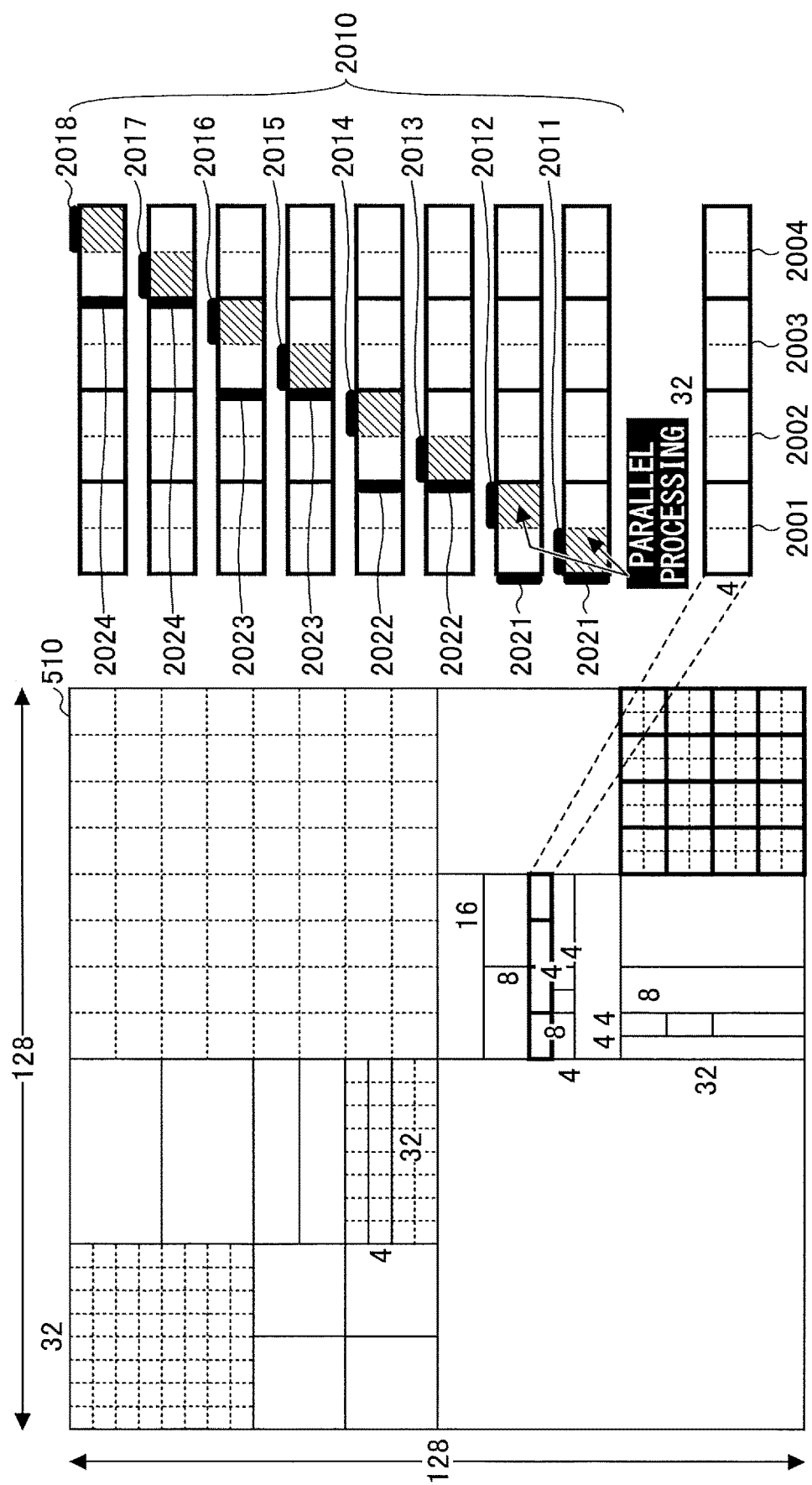
FIG. 20 is a third drawing illustrating a specific example of parallel processing in the inter prediction mode of the encoder according to the first embodiment.

FIG. 20 is a third drawing illustrating a specific example of the parallel processing in the inter prediction mode of the encoder according to the first embodiment. The example of FIG. 20 illustrates a case in which CU blocks 2001 to 2004 of 8×4 pixels generated by partitioning the CTU 510 of 128×128 pixels are processed.

In the example of FIG. 20, the CU blocks 2001 to 2004 are each partitioned into two subCUs. Thus, the subCU size is 4×4 pixels, and parallel processing is performed on the two subCUs.

A drawing referenced by a reference numeral 2010 illustrates a state in which a template region is set for each subCU included in the CU blocks 2001 to 2004 in time series, and indicates that the time axis moves from the bottom to the top.

As indicated by the drawing referenced by the reference numeral 2010, for each of the two subCUs included in the CU block 2001, portions of decoded images of CU blocks adjacent to the upper and left sides of the CU block 2001 are set as template regions 2011, 2012, and 2021. This enables the parallel processing to be performed on the two subCUs included in the CU block 2001.

The two subCUs included in the CU block 2001 are processed in parallel, and decoded images are generated for the subCUs. Subsequently, the process proceeds to the CU block 2002. Specifically, with respect to two subCUs included in the CU block 2002, portions of decoded images of a CU block adjacent to the upper side of the CU block 2002 and a CU block adjacent to the left side of the CU block 2002 (i.e., the CU block 2001) are set as template regions 2013, 2014, and 2022. This enables the parallel processing to be performed on the two subCUs included in the CU block 2002.

The two subCUs included in the CU block 2002 are processed in parallel, and decoded images are generated for the subCUs. Subsequently, the process proceeds to the CU block 2003. Specifically, with respect to two subCUs included in the CU block 2003, portions of decoded images of a CU block adjacent to the upper side of the CU block 2003 and a CU block adjacent to the left side of the CU block 2003 (i.e., the CU block 2002) are set as template regions 2015, 2016, and 2023. This enables the parallel processing to be performed on the two subCUs included in the CU block 2003.

The two subCUs included in the CU block 2003 are processed in parallel, and decoded images are generated for the subCUs. Subsequently, the process proceeds to the CU block 2004. Specifically, with respect to two subCUs included in the CU block 2004, portions of decoded images of a CU block adjacent to the upper side of the CU block 2004 and a CU block adjacent to the left side of the CU block 2004 (i.e., the CU block 2003) are set as template regions 2017, 2018, and 2024. This enables the parallel processing to be performed on the two subCUs included in the CU block 2004.

<5. Functional Configuration of the Decoder>

Figure 21:
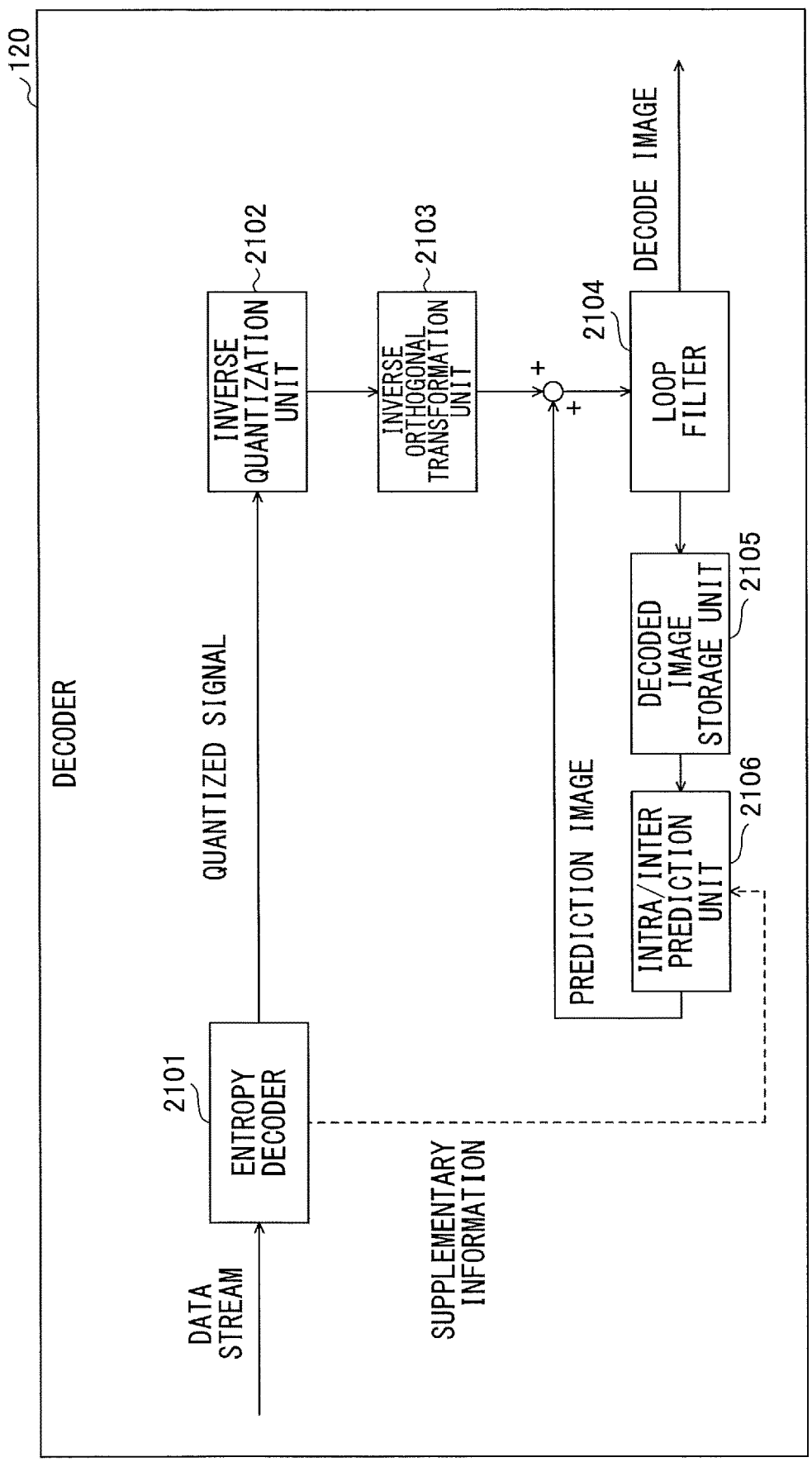
FIG. 21 is a drawing illustrating an example of a function configuration of a decoder.

Next, a functional configuration of a decoder 120 achieved by executing a decoding program will be described. FIG. 21 is a drawing illustrating an example of the functional configuration of the decoder. As illustrated in FIG. 21, the decoder 120 includes an entropy decoder 2101, an inverse quantization unit 2102, an inverse orthogonal transformation unit 2103, a loop filter 2104, a decoded image storage unit 2105, and an intra/inter prediction unit 2106.

The entropy decoder 2101 decodes a received data stream and outputs a quantized signal. The entropy decoder 2101 extracts supplementary information from the data stream and notifies the intra/inter prediction unit 2106.

The inverse quantization unit 2102 performs inverse quantization on the quantized signal and outputs a result to the inverse orthogonal transformation unit 2103. The inverse orthogonal transformation unit 2103 performs an inverse orthogonal transformation process on the quantized signal that is inversely quantized to obtain a prediction residual signal.

The prediction residual signal obtained by the inverse orthogonal transformation unit 2103 is added to the prediction image generated by the intra-inter prediction unit 2106 for each CU block, for example. This generates a decoded image of each CU block and the decoded image is input to the loop filter 2104.

The loop filter 2104 performs filter processing to reduce encoded noise of the input decoded image.

The loop filter 2104 outputs the filtered decoded image as a decoded result and stores the decoded result in the decoded image storage unit 2105.

The intra/inter prediction unit 2106 performs the intra prediction (i.e., in-picture prediction) that generates a prediction image by using the decoded image in the picture being decoded. The intra/inter prediction unit 2106 performs motion compensation between pictures by using the decoded image in the reference picture and performs motion compensation inter prediction (i.e., inter-picture prediction) that generates the prediction image.

Further, the intra/inter prediction unit 2106 outputs either the prediction image generated by the intra prediction or the prediction image generated by the motion compensation inter prediction. The output prediction image is added to the prediction residual signal obtained by the inverse orthogonal transformation unit 2103 to generate a decoded image, and the decoded image is input to the loop filter 2104.

<6. Details of the Intra/Inter Prediction Unit of the Decoder>

Subsequently, details of an inter prediction process using template matching in an intra/inter prediction unit 2106 of the decoder will be described. In the decoder as well, an inter prediction process using template matching in an inter prediction mode being discussed in the next generation codec will be described first (see <6.1>). Next, the inter prediction process using template matching in the inter prediction mode of the decoder according to the first embodiment will be described (see <6.2>).

<6.1 Functional Configuration of the Intra/Inter Prediction Unit of the Decoder for Achieving the Inter Prediction Process Using Template Matching in the Inter Prediction Mode being Discussed in the Next Generation Codec>

Figure 22:
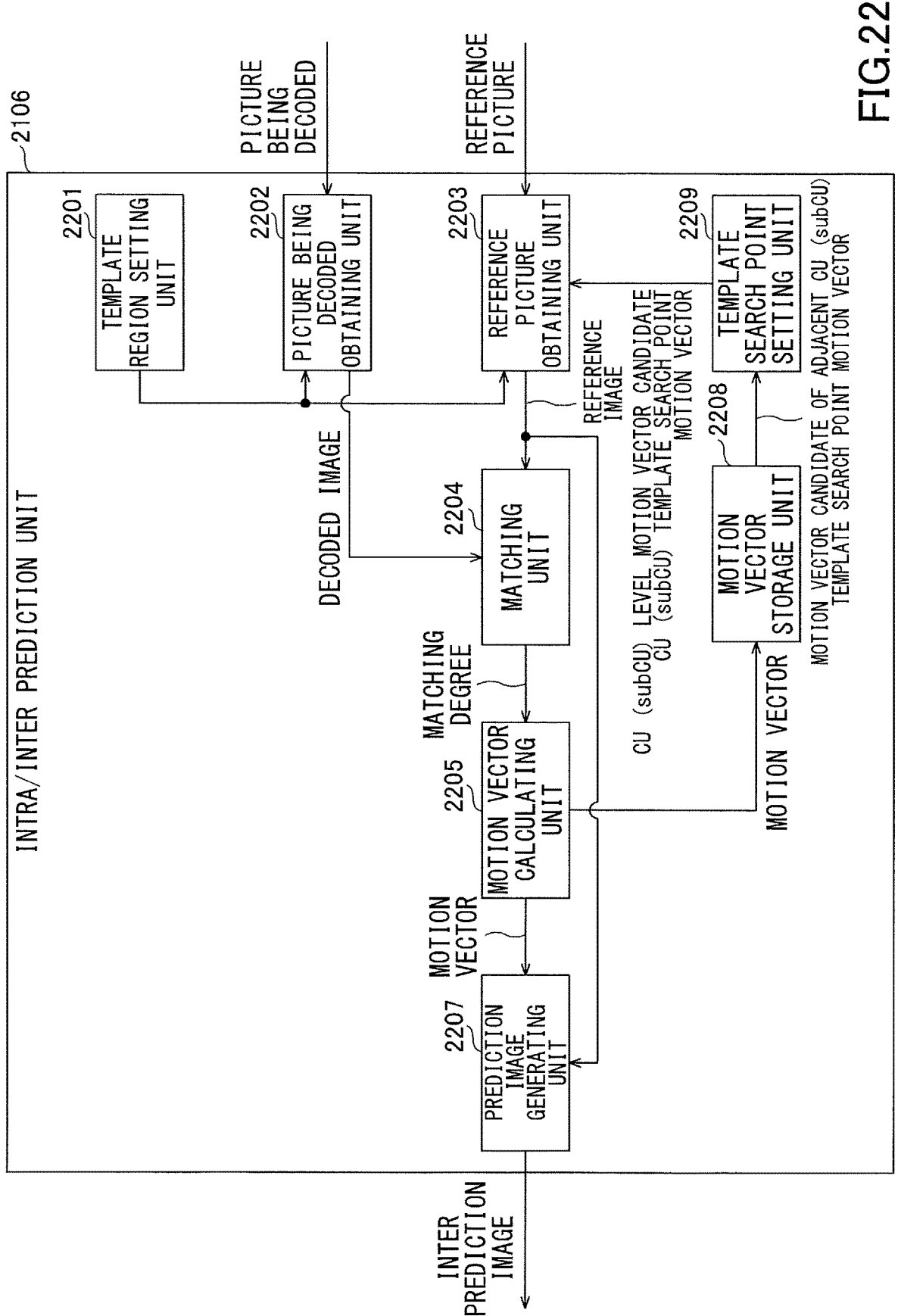
FIG. 22 is a drawing illustrating a functional configuration of the decoder for achieving an inter prediction process using template matching in the inter prediction mode being discussed in the next generation codec.

FIG. 22 is a drawing illustrating an example of a functional configuration of the decoder for achieving the inter prediction process using template matching in the inter prediction mode being discussed in the next generation codec.

As illustrated in FIG. 22, in the inter prediction mode being discussed in the decoder of the next generation codec, the intra/inter prediction unit 2106 includes a template region setting unit 2201, a picture being decoded obtaining unit 2202, and a reference picture obtaining unit 2203. The intra/inter prediction unit 2106 includes a matching unit 2204, a motion vector calculating unit 2205, a prediction image generating unit 2207, a motion vector storage unit 2208, and a template search point setting unit 2209.

The template region setting unit 2201 is an example of the first setting unit. In the CU level motion search, the template region setting unit 2201 sets CU level template regions to the CU block to be decoded in the picture being decoded obtained by the picture being decoded obtaining unit 2202. In the subCU level motion search, the template region setting unit 2201 sets subCU level template regions to the subCU to be decoded in the picture being decoded obtained by the picture being decoded obtaining unit 2202.

In the CU level motion search, the template region setting unit 2201 sets template regions corresponding to the CU level template regions set for the CU block to be decoded, in the reference picture obtained by the reference picture obtaining unit 2203. In the subCU level motion search, the template region setting unit 2201 sets template regions corresponding to the subCU level template regions set for the subCU to be decoded, in the reference picture obtained by the reference picture obtaining unit 2203.

The picture being decoded obtaining unit 2202 is an example of the obtaining unit. The picture being decoded obtaining unit 2202 reads out the picture being decoded from the decoded image storage unit 2105. In the CU level motion search, the picture being decoded obtaining unit 2202 notifies the matching unit 2204 of the decoded images of the CU level template regions set by the template region setting unit 2201 for the CU block to be decoded.

In the subCU level motion search, the picture being decoded obtaining unit 2202 notifies the matching unit 2204 of the decoded images of the subCU level template regions set by the template region setting unit 2201 for the subCU to be decoded.

The reference picture obtaining unit 2203 is an example of the second setting unit. The reference picture obtaining unit 2203 reads out a predetermined decoded picture (i.e., a decoded picture different in time) among the decoded pictures stored in the decoded image storage unit 2105 as the reference picture.

The reference picture obtaining unit 2203 extracts reference images of CU level template regions set by the template search point setting unit 2209 in the read-out reference picture.

Here, the template search point setting unit 2209 sets the template regions at respective positions corresponding to multiple CU level motion vector candidates for the CU level template regions in the reference picture set by the template region setting unit 2201. The reference picture obtaining unit 2203 extracts the reference images of the CU level template regions set at the positions corresponding to the multiple motion vector candidates and notifies the matching unit 2204.

The template search point setting unit 2209 sets template regions at respective positions corresponding to the CU level template search point motion vectors with respect to one CU level motion vector candidate. The CU level template search point motion vector is a motion vector around one motion vector candidate serving as the base at the CU-level. The reference picture obtaining unit 2203 extracts reference images of CU level template regions set at positions corresponding to the template search point motion vectors and notifies the matching unit 2204.

The reference picture obtaining unit 2203 identifies a CU block at the position corresponding to the one CU level template search point motion vector (i.e., the determined one CU level motion vector) set by the template search point setting unit 2209 in the reference picture.

The reference picture obtaining unit 2203 extracts the reference image of the subCU level template region set by the template search point setting unit 2209 from the identified CU block in the reference picture.

The template search point setting unit 2209 sets template regions at respective positions corresponding to multiple subCU level motion vector candidates in the identified CU block of the reference picture with respect to the subCU level template region set by the template region setting unit 2201. The reference picture obtaining unit 2203 extracts the reference images of the subCU level template regions set at the positions corresponding to the multiple motion vector candidates and notifies the matching unit 2204.

The template search point setting unit 2209 sets template regions at respective positions corresponding to the subCU level template search point motion vectors with respect to the one subCU level motion vector candidate. The subCU level template search point motion vectors are multiple motion vectors around one motion vector candidate to be the base point at the subCU level. The reference picture obtaining unit 2203 extracts reference images of the subCU level template regions set at the positions corresponding to the template search point moving vectors and notifies the matching unit 2204.

The matching unit 2204 is an example of a calculation unit. In the CU level motion search, the matching unit 2204 calculates the matching degree between the decoded image of the CU level template region notified by the picture being decoded obtaining unit 2202 and the reference image of the CU level template region notified by the reference picture obtaining unit 2203.

The reference images of the CU level template regions notified by the reference picture obtaining unit 2203 include reference images extracted based on multiple CU level motion vector candidates and reference images extracted based on the CU level template search point motion vectors. The matching unit 2204 notifies the motion vector calculating unit 2205 of the calculated matching degrees.

In the subCU level motion search, the matching unit 2204 calculates the matching degree between the decoded image of the subCU level template region and the reference image of the subCU level template region.

The decoded image of the subCU level template region is notified by the picture being decoded obtaining unit 2202. The reference images of the subCU level template region are notified by the reference picture obtaining unit 2203. The reference images of the subCU level template region notified by the reference picture obtaining unit 2203 include reference images extracted based on multiple subCU level motion vector candidates and reference images extracted based on the subCU level template search point motion vectors. The matching unit 2204 notifies the motion vector calculating unit 2205 of the calculated matching degrees.

The motion vector calculating unit 2205 is an example of a determining unit. The motion vector calculating unit 2205 identifies the maximum matching degree from the matching degrees of the reference images of the template regions set at positions corresponding to multiple CU level motion vector candidates among the matching degrees notified by the matching unit 2204.

The motion vector calculating unit 2205 stores a CU level motion vector candidate corresponding to the identified maximum matching degree in the motion vector storage unit 2208 as one motion vector candidate to be the base point at the CU level.

The motion vector calculating unit 2205 obtains the CU level matching degree notified by the matching unit 2204 in response to the one motion vector candidate, which is used as the base point at the CU level, being stored in the motion vector storage unit 2208. At this time, the matching degrees obtained by the motion vector calculating unit 2205 are the matching degrees of the reference images of the template regions set at positions corresponding to the CU level template search point motion vectors (i.e., multiple motion vectors around one motion vector candidate to be the base point at the CU level).

Further, the motion vector calculating unit 2205 determines the motion vector in the CU level template matching based on the obtained matching degrees and stores the determined CU level motion vector in the motion vector storage unit 2208.

The motion vector calculating unit 2205 obtains the subCU level matching degree notified by the matching unit 2204 in response to the determined CU level motion vector being stored in the motion vector storage unit 2208. The motion vector calculating unit 2205 identifies the maximum matching degree from the matching degrees of the reference images of the template regions set at positions corresponding to multiple subCU level motion vector candidates among the obtained matching degrees.

The motion vector calculating unit 2205 stores one subCU level motion vector candidate corresponding to the identified maximum matching degree in the motion vector storage unit 2208 as one motion vector candidate to be the base point at the subCU level.

The motion vector calculating unit 2205 obtains the subCU level matching degrees notified by the matching unit 2204 in response to the one motion vector candidate to be the base point at the subCU level being stored in the motion vector storage unit 2208. At this time, the matching degrees obtained by the motion vector calculating unit 2205 are the matching degrees of the reference images of the template regions set at positions corresponding to the subCU level template search point motion vectors (i.e., multiple motion vectors around the one motion vector candidate to be the base point at the subCU level). Further, the motion vector calculating unit 2205 determines the motion vector in the subCU level template matching based on the obtained matching degrees and notifies the prediction image generating unit 2207.

The prediction image generating unit 2207 is an example of a generating unit. The prediction image generating unit 2207, in the reference picture notified by the reference picture obtaining unit 2203, identifies the reference image corresponding to the determined subCU level motion vector, which is successively notified by the motion vector calculating unit 2205. Further, the prediction image generating unit 2207 generates and outputs the prediction image of the subCU block by using each identified reference image.

The motion vector storage unit 2208 stores the one motion vector candidate to be the base point at the CU level. The motion vector storage unit 2208 stores the determined CU level motion vector. The motion vector storage unit 2208 stores the one motion vector candidate to be the base point at the subCU level.

The template search point setting unit 2209 sets template regions at respective positions corresponding to multiple CU level motion vector candidates with respect to the CU level template region in the reference picture set by the template region setting unit 2201.

The template search point setting unit 2209 determines the CU level template search point motion vectors based on the one motion vector candidate to be the base point at the CU level stored in the motion vector storage unit 2208. In the reference picture, the template search point setting unit 2209 sets template regions at respective positions corresponding to the CU level template search point motion vectors.

The template search point setting unit 2209 sets template regions at respective positions corresponding to multiple subCU level motion vector candidates with respect to the subCU level template regions set by the template region setting unit 2201 in the CU block in the identified reference picture.

The template search point setting unit 2209 determines the subCU level template search point motion vectors based on the one motion vector candidate to be the base point at the subCU level stored in the motion vector storage unit 2208. In the reference picture, the template search point setting unit 2209 sets template regions at respective positions corresponding to the subCU level template search point motion vectors.

<6.2 Functional Configuration of the Intra/Inter Prediction Unit for Achieving the Inter Prediction Process Using Template Matching in the Inter Prediction Mode of the Decoder According to the First Embodiment>

Figure 23:
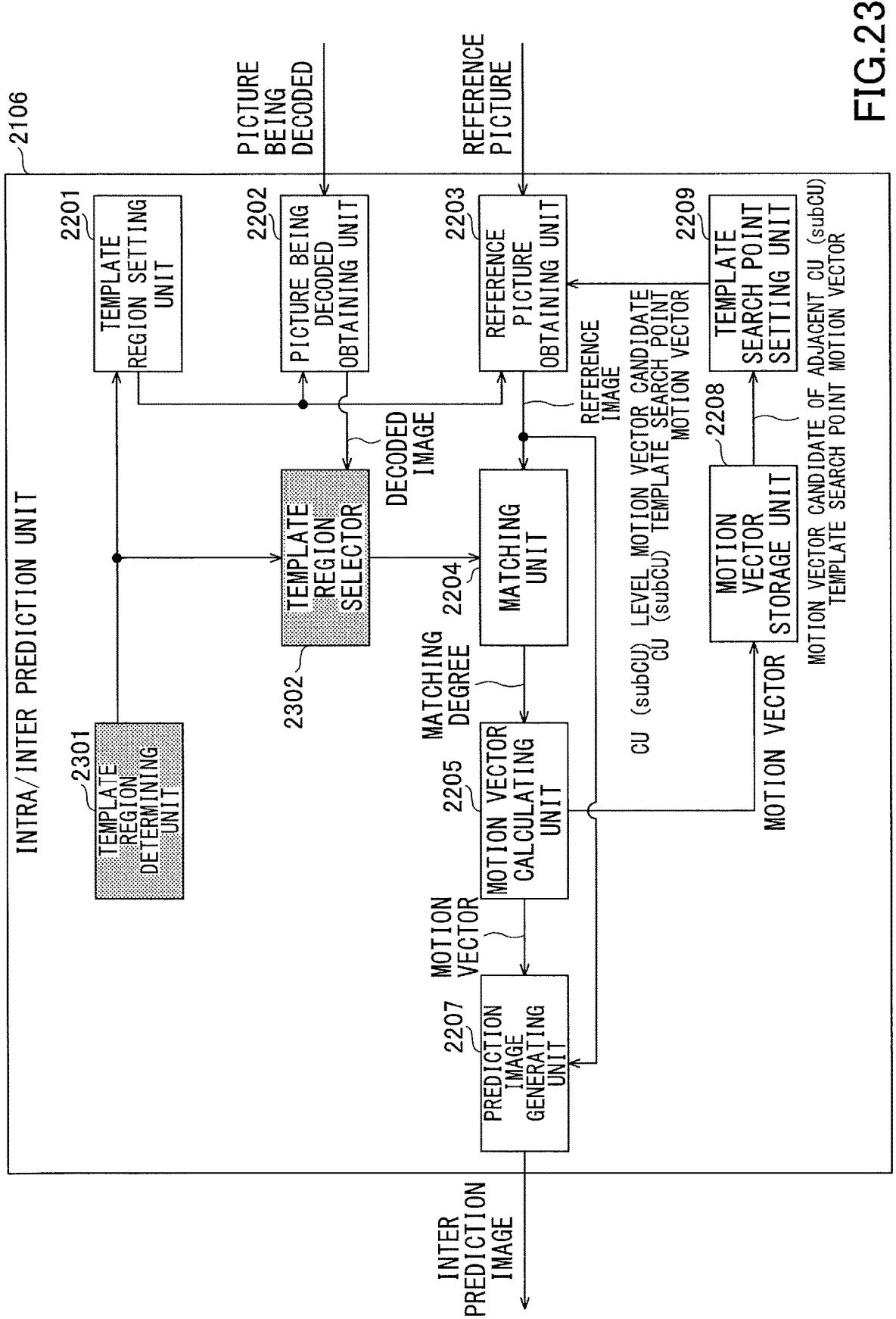
FIG. 23 is a drawing illustrating a functional configuration for achieving an inter prediction process using template matching in an inter prediction mode of a decoder according to the first embodiment.

Next, a functional configuration for achieving the inter prediction process using template matching in the inter prediction mode of the decoder according to the first embodiment will be described. FIG. 23 is a drawing illustrating an example of the functional configuration for achieving the inter prediction process using template matching in the inter prediction mode of the decoder according to the first embodiment.

FIG. 23 differs from FIG. 22 in that a template region determining unit 2301 and a template region selector 2302 are included in FIG. 23. In the following, differences from FIG. 22 will be mainly described.

The template region determining unit 2301 determines whether the subCU to be decoded satisfies a predetermined execution condition. The template region determining unit 2301 notifies the template region setting unit 2201 of a determined result of whether the predetermined execution condition is satisfied.

In the template region setting unit 2201, when the template region determining unit 2301 notifies the determination result indicating that the predetermined execution condition is not satisfied, the template regions described with reference to FIG. 5 are set to the picture being decoded obtaining unit 2202. Specifically, a portion of a decoded image of a subCU adjacent to the upper side of the subCU to be decoded and a portion of a decoded image of a subCU adjacent to the left side of the subCU to be decoded are set as template regions. In this case, the picture being decoded obtaining unit 2202 notifies the template region selector 2302 of the decoded images of the template regions set by the template region setting unit 2201 among the decoded images included in the picture being decoded (i.e., portions of the decoded images of the adjacent subCUs).

When the template region determining unit 2301 notifies the determined result indicating that the predetermined execution condition is satisfied, the template region setting unit 2201 sets the template regions described with reference to FIG. 12 to the picture being decoded obtaining unit 2202. Specifically, the template region setting unit 2201 identifies a CU block including the subCU to be decoded and sets portions of the decoded images of CU blocks adjacent to the upper and left sides of the identified CU block as template regions. In this case, the picture being decoded obtaining unit 2202 notifies the template region selector 2302 of the decoded images of the template regions set by the template region setting unit 2201 among the decoded images included in the picture being decoded (i.e., portions of the decoded images of the adjacent CU blocks).

The template region selector 2302 selects the decoded images of the template regions notified by the picture being decoded obtaining unit 2202 (i.e., portions of the decoded images of the adjacent subCUs) when the determined result indicating that the predetermined execution condition is not satisfied is notified. The template region selector 2302 notifies the matching unit 2204 of the decoded images of the selected template regions. Thus, in the matching unit 2204, the template matching can be performed on the subCU to be decoded in the reference picture by using the decoded images of the template regions according to the determined result notified by the template region determining unit 2301.

When the template region selector 2302 is notified of the determined result indicating that the predetermined execution condition is satisfied, the template region selector 2302 selects the decoded images of the template regions notified by the picture being decoded obtaining unit 2202 (i.e., portions of the decoded images of the adjacent CU blocks). The template region selector 2302 notifies the matching unit 2204 of the decoded images of the selected template regions. This enables the matching unit 2204 to perform the template matching on the subCU to be decoded in the reference picture by using the decoded images of the template regions according to the determined result notified by the template region determining unit 2301.

<7. Summary>

As is clear from the above description, when the intra/inter prediction unit of the encoder according to the first embodiment performs the inter prediction process using template matching in the inter prediction mode, the following processing is performed.

Partition a coding unit (CU) block into multiple rectangular regions (subCUs)

Determine whether the rectangular region to be decoded satisfies a predetermined execution condition, and set portions of decoded images of blocks adjacent to the coding unit block including the rectangular regions as template regions when it is determined that the rectangular region satisfies the predetermined execution condition Perform template matching by parallel processing on all rectangular regions included in the coding unit block by using the set template regions, and output a prediction image of each rectangular region.

This enables the encoder according to the first embodiment to improve processing efficiency in the inter prediction using template matching.

When the intra/inter prediction unit of the decoder according to the first embodiment performs the inter prediction process using template matching in the inter prediction mode, the following processing is performed.

Partition a coding unit (CU) block into multiple rectangular regions (subCUs)

Determine whether the rectangular region to be decoded satisfies a predetermined execution condition, and set portions of decoded images of blocks adjacent to the coding unit block including the rectangular regions as template regions when it is determined that the rectangular region satisfies the predetermined execution condition Perform template matching by parallel processing on all rectangular regions included in the coding unit block by using the set template regions, and output a prediction image of each rectangular region.

This enables the decoder according to the first embodiment to improve processing efficiency in the inter prediction using template matching.

Second Embodiment

In the first embodiment described above, the portions of the decoded images of the blocks adjacent to the coding unit block including the subCUs to be decoded are set as template regions, thereby improving the processing efficiency. With respect to this, in the second embodiment, portions of prediction images of subCUs adjacent to the subCU to be decoded are set as template regions, thereby improving the processing efficiency. In the following, the second embodiment will be described focusing on differences from the first embodiment described above.

<1. Inter Prediction Process Using Template Matching in the Inter Prediction Mode of an Encoder According to a Second Embodiment>

Figure 24:
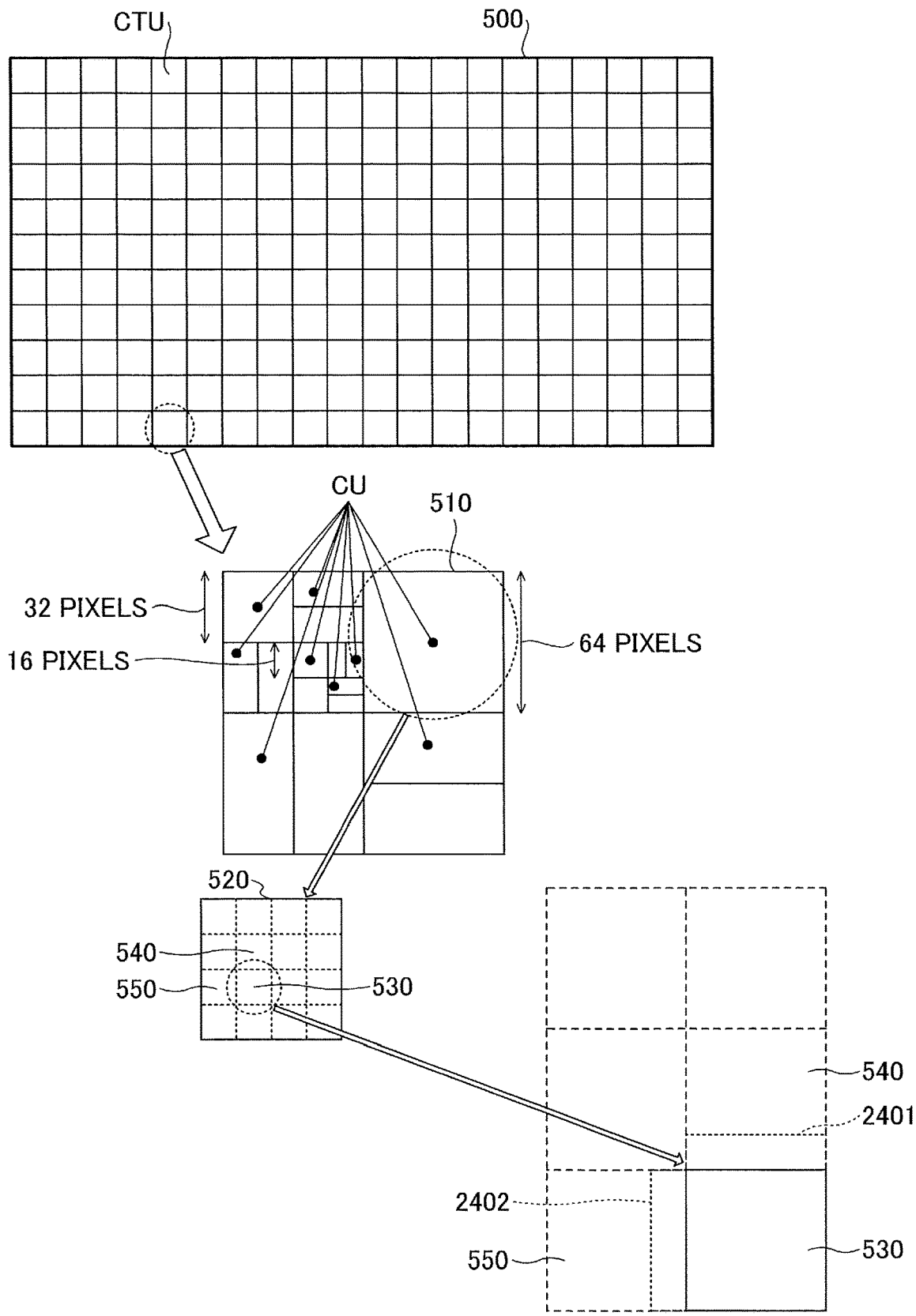
FIG. 24 is a drawing for describing a rectangular region to be decoded and template regions in an inter prediction mode of an encoder according to a second embodiment.

(1) Description of a Rectangular Region (subCU) to be Decoded and Template Regions First, in an inter-prediction mode of an encoder according to a second embodiment, a rectangular region to be decoded and template regions used when an inter prediction process using template matching is performed will be described. FIG. 24 is a drawing for describing the rectangular region to be decoded and the template regions in the inter prediction mode of the encoder according to the second embodiment.

As described with reference to FIG. 12, the encoder according to the second embodiment also partitions the CTU 510 of 128×128 pixels of the input picture (i.e., the input frame) 500 into CU blocks. With respect to the CU blocks, the inter prediction using the template matching is performed (see FIG. 24).

The CU block 520 is an enlarged view of a square block partitioned into 64×64 pixels. As described with reference to FIG. 12, in the inter prediction mode of the next generation codec, rectangular regions, such as the subCUs 530, 540, and 550, are generated, and the prediction image and the decoded image are generated for each subCU used as a block to be decoded.

As in the first embodiment, the encoder according to the second embodiment generates the prediction images and the decoded images of multiple subCUs in parallel. In the encoder according to the second embodiment, portions of prediction images of subCUs adjacent to the subCU to be decoded are set as template regions.

For example, as illustrated in FIG. 24, when the subCU to be decoded is the subCU 530, the template matching is performed using the following portions of prediction images as template regions.

A portion of a prediction image of a subCU 540 adjacent to the upper side of the subCU block 530

A portion of a prediction image of a subCU 550 adjacent to the left side of the subCU block 530 to be decoded Specifically, prediction images of the template regions 2401 and 2402 are used to perform the template matching with respect to the subCU 530 to be decoded.

In this manner, by setting the portions of the prediction images of the subCUs adjacent to the subCU to be decoded as template regions, the template matching of the subCU to be decoded can be performed in parallel with the processing of the adjacent subCU.

(2) Functional Configuration of the Encoder of the Intra/Inter Prediction Unit

Figure 25:
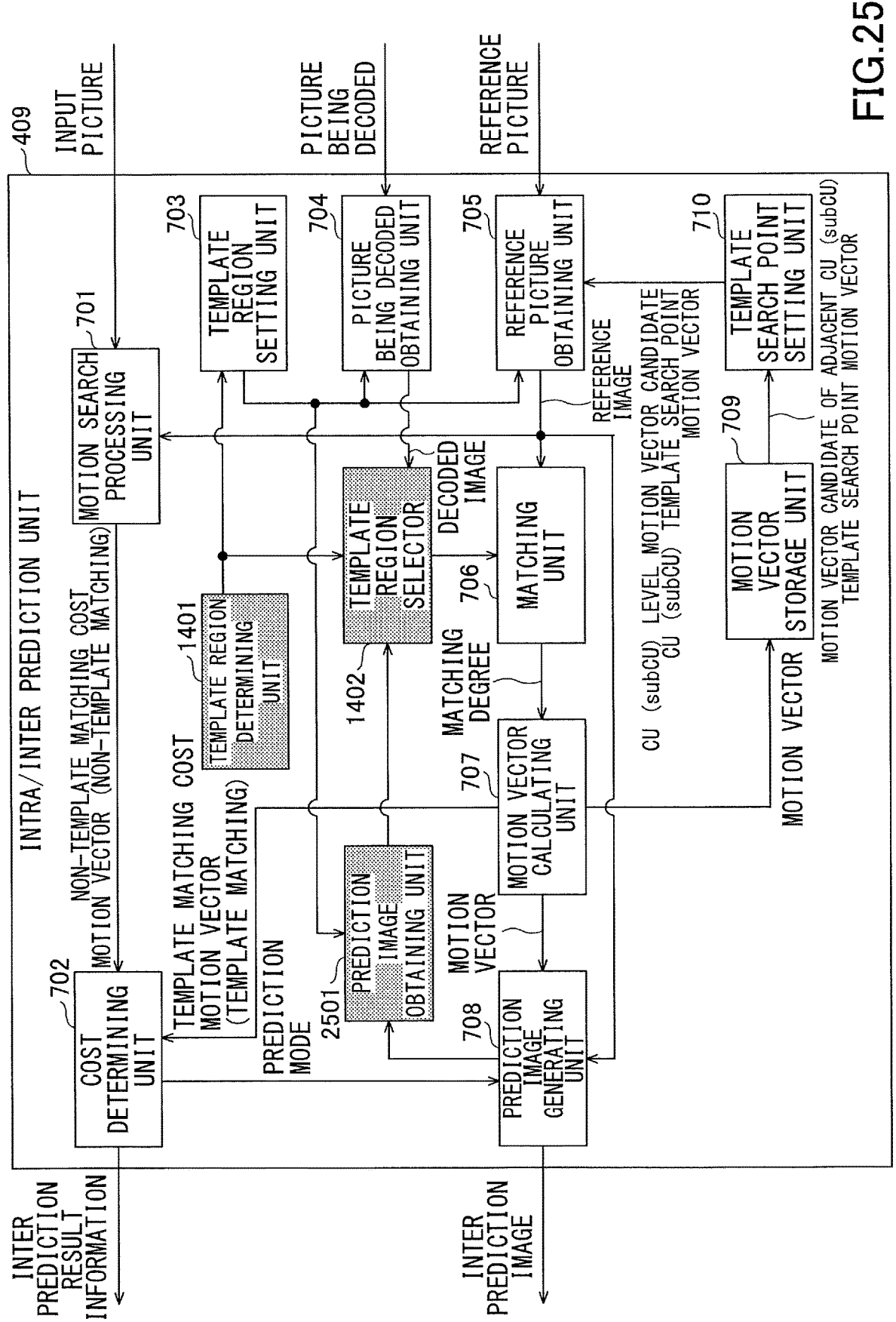
FIG. 25 is a drawing illustrating an example of a functional configuration for achieving an inter prediction process using template matching in the inter prediction mode of the encoder according to the second embodiment.

Next, a functional configuration of the encoder for achieving the inter prediction process using template matching in the inter prediction mode according to the second embodiment will be described. FIG. 25 is a drawing illustrating an example of the functional configuration for achieving the inter prediction process using template matching in the inter prediction mode of the encoder according to the second embodiment.

FIG. 25 differs from FIG. 14 in that a prediction image obtaining unit is included in FIG. 25. In the following, differences from FIG. 14 will be mainly described.

The prediction image obtaining unit 2501 obtains a prediction image of a subCU adjacent to the subCU to be decoded, which is generated by the prediction image generating unit 708. Specifically, the prediction image obtaining unit 2501 obtains prediction images of template regions set by the template region setting unit 703 (i.e., template regions set at positions of subCUs adjacent to the subCU to be decoded). The prediction image obtaining unit 2501 notifies the template region selector 1402 of the obtained prediction images of the template regions.

When the template region setting unit 703 is notified, by the template region determining unit 1401, of a determined result indicating that the predetermined execution condition is satisfied, the template region setting unit 703 sets the template regions described with reference to FIG. 24 to the prediction image obtaining unit 2501.

Specifically, the template region setting unit 703 sets a portion of a prediction image of a subCU adjacent to the upper side of the subCU to be decoded and a portion of a prediction image of a subCU adjacent to the left side of the subCU to be decoded as template regions. In this case, the prediction image obtaining unit 2501 notifies the template region selector 1402 of the prediction images of the template regions set by the template region setting unit 703 (i.e., portions of the prediction images of the adjacent subCUs) among the prediction images generated by the prediction image generating unit 708.

When the template region selector 1402 is notified of a determined result indicating that the predetermined execution condition is not satisfied, the template region selector 1402 selects the decoded images of the template regions notified by the picture being decoded obtaining unit 704 (i.e., portions of the decoded images of the adjacent subCUs). The template region selector 1402 notifies the matching unit 706 of the selected decoded images of the template regions. This enables the matching unit 706 to perform the template matching on the subCU to be decoded in the reference picture by using the decoded images of the template regions according to the determined result notified by the template region determining unit 1401.

When the template region selector 1402 is notified of a determined result indicating that the predetermined execution condition is satisfied, the template region selector 1402 selects the prediction images of the template regions notified by the prediction image obtaining unit 1403 (i.e., portions of the prediction images of the adjacent CU blocks). The template region selector 1402 notifies the matching unit 706 of the selected prediction images of the template regions. This enables the matching unit 706 to perform the template matching on the subCU to be decoded in the reference picture by using the prediction images of the template regions according to the determined result notified by the template region determining unit 1401.

(3) Execution Condition Information

Next, the execution condition of the template matching determined by the template region determining unit 1401 when the template matching is performed on the subCU to be decoded will be described. FIG. 26 is a drawing illustrating the execution condition of the template matching in the inter prediction mode of the encoder according to the second embodiment.

As illustrated in FIG. 26, execution condition information 2600 includes a "determination item of the execution condition", a "threshold of the determination item", and a "determination reason" as items of the information.

The "determination item of the execution condition" stores a determination item for determining whether the execution condition is satisfied for the subCU to be decoded.

The "threshold of the determination item" stores a threshold for determining that a determination item stored in the corresponding "determination item of the execution condition" satisfies the execution condition. The "determination reason" stores a reason for determining that the execution condition is satisfied.

In the example of FIG. 26, the "subCU size" and the "picture type" are stored as the "determination item of the execution condition". Since the "sub CU size" and the "picture type" have been described with reference to FIG. 15 in the first embodiment, the description will be omitted here.

The example of FIG. 26 illustrates that a "CU quantization parameter" is included as the "determination item of the execution condition". When a quantization parameter of a CU block including the subCU to be decoded is smaller than or equal to a predetermined threshold value (e.g., 30 or smaller), it is determined that the execution condition of the determination item is satisfied. This is because when the quantization parameter of the CU block is "30 or smaller", a difference between the decoded image and the prediction image is small, and the influence of setting the template region by using the prediction image can be reduced.

Thus, in the encoder according to the second embodiment, when the quantization parameter of the block of the CU including the subCU to be decoded is "30 or smaller", portions of the prediction images of the subCUs adjacent to the subCU to be decoded are set as template regions. This enables the encoder according to the second embodiment to achieve parallel processing for performing the template matching on multiple subCUs in parallel.

The example of FIG. 26 also illustrates that a "CU-level motion vector" is included as the "determination item of the execution condition". When an absolute value of the CU level motion vector with respect to the CU block including the subCU to be decoded is smaller than or equal to a predetermined number of pixels (e.g., "1 pixel or smaller"), it is determined that the execution condition of the determination item is satisfied. The absolute value of the CU level motion vector smaller than or equal to 1 pixel indicates that the CU block is a block in a static region, and in this case, the prediction image itself is often to be the decoded image.

Therefore, in the encoder according to the second embodiment, when the CU level motion vector with respect to the CU block including the subCU to be decoded is "1 pixel or smaller", portions of the prediction images of the subCUs adjacent to the subCU to be decoded are set as template regions. This enables the encoder according to the second embodiment to achieve parallel processing for performing the template matching on multiple subCUs in parallel.

(4) Flow of the Inter Prediction Process (Flow of the subCU Level Motion Search Process)

Next, in the inter prediction mode of the encoder according to the second embodiment, a flow of the inter prediction process using template matching will be described. As in the first embodiment, since an entire flow of the inter prediction process using template matching in the inter prediction mode of the encoder according to the second embodiment is similar to the flow in FIG. 8, the description will be omitted here.

The flow of step S801 of FIG. 8 among the steps in FIG. 8 (i.e., the CU level motion search process), which is described in detail in FIG. 9, is the same in the inter prediction mode of the encoder according to the second embodiment. Thus, step S802 (i.e., the subCU level movement search process) among the steps in FIG. 8 will be described.

Figure 27:
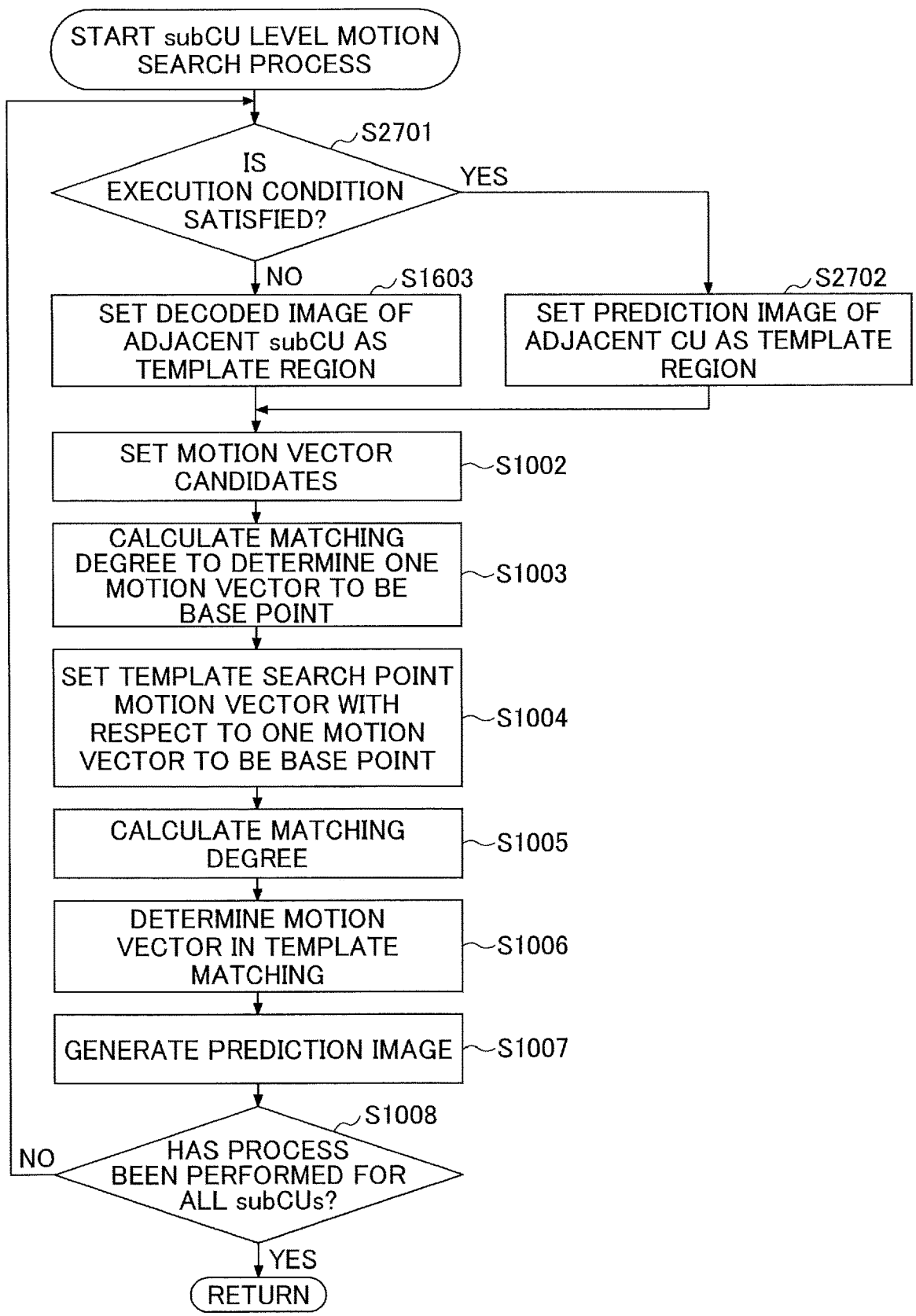
FIG. 27 is a flowchart illustrating a flow of a subCU level motion search process in the inter prediction mode of the encoder according to the second embodiment.

FIG. 27 is a flowchart illustrating a flow of a subCU level motion search process in the inter prediction mode of the encoder according to the second embodiment. Steps from step S2701 to step S2703 are different from FIG. 10.

In step S2701, the template region determining unit 1401 determines whether the subCU to be decoded satisfies the execution condition illustrated in the execution condition information 2600. In step S2701, when it is determined that the execution condition is satisfied (i.e., YES in step S2701), the process proceeds to step S2702.

In step S2702, the prediction image obtaining unit 2501 obtains prediction images of subCUs adjacent to the upper and left sides of the subCU to be decoded from the prediction image generating unit 708. When a decoded image has already been generated for the subCU adjacent to the upper side of the subCU to be decoded or the subCU adjacent to the left side of the subCU to be decoded, the picture being decoded obtaining unit 704 may obtain the decoded image of the subCU adjacent to the upper side of the subCU to be decoded or the decoded image of the subCU adjacent to the left side of the subCU to be decoded. The template region selector 1402 selects portions of the prediction images or the decoded images of the subCUs adjacent to the subCU to be decoded as images of template regions.

(5) Timing Chart for Each subCU

Figure 28A:
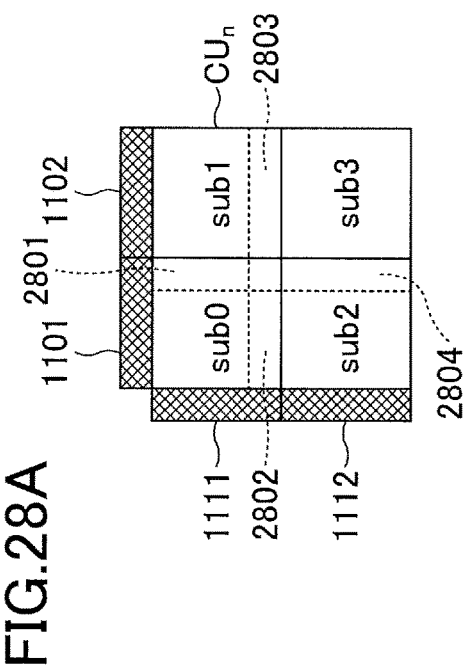
FIGS. 28A and 28B are drawings illustrating processing contents and processing timings for each subCU in the inter prediction mode of the encoder according to the second embodiment.
Figure 28B:
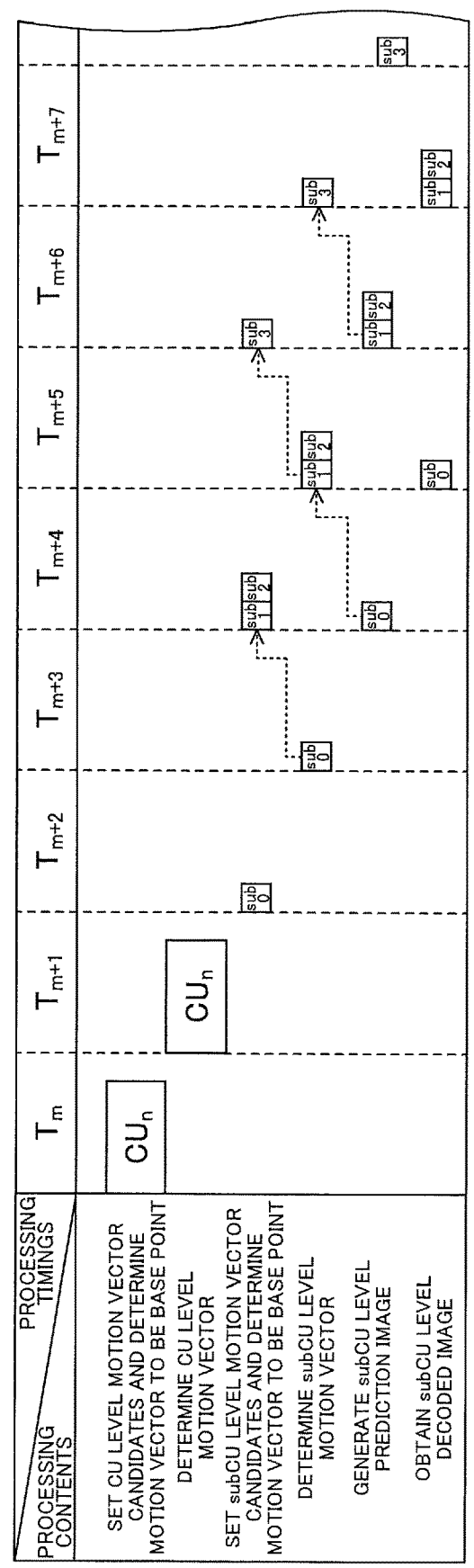

Next, processing contents and processing timings for each subCU in the inter prediction mode of the encoder according to the second embodiment will be described. FIG. 28A and FIG. 28B are drawings illustrating the processing contents and the processing timings for each subCU in the inter prediction mode of the encoder according to the second embodiment.

FIG. 28A illustrates an example of the CU block including subCUs to be decoded. The example of FIG. 28A illustrates that a CU block including the subCU to be decoded is "$CU_n$", and the CU block includes regions of four subCUs ("sub0", "sub1", "sub2", and "sub3"). The example of FIG. 28A also illustrates that decoded images have been generated for both upper and left CU blocks adjacent to "$CU_n$". The example of FIG. 28A also illustrates that portions of the decoded images of the adjacent CU blocks are set as template regions 1101, 1102, 1111, and 1112.

FIG. 28B is a drawing illustrating the processing timings when the intra/inter predicting unit 409 performs processing on the four subCUs included in the "$CU_n$". As in FIG. 11B, the example of FIG. 28B divides the process performed by the intra/inter predicting unit 409 into the following items.

Set the CU level motion vector candidates and determine one motion vector candidate to be the base point
Determine the CU level motion vector
Set the subCU level motion vector candidates and determine one motion vector candidate to be the base point
Determine the subCU level motion vector
Generate the subCU-level prediction image
Obtain the subCU level decoded image In the example of FIG. 28B, the processing timings "$T_m$" to "$T_{m+7}$" are illustrated for the convenience of space. Here, the following description assumes that the subCU to be decoded satisfies the execution condition defined in the execution condition information 2600.

As illustrated in FIG. 28B, at the processing timing "$T_m$", template regions are set at respective positions corresponding to the CU level motion vector candidates with respect to the "$CU_n$" and one motion vector candidate to be the base point at the CU level is determined. Subsequently, at the processing timing "$T_{m+1}$", the CU level motion vector is determined with respect to "$CU_n$".

Subsequently, at the processing timing "$T_{m+2}$", the subCU level motion vector candidates are set to "sub0", and one motion vector candidate to be the base point at the subCU level is determined.

Subsequently, at the processing timing "$T_{m+3}$", the subCU level motion vector is determined with respect to the "sub0". Here, when determining the motion vector of the "sub0", decoded images of template regions 1101 and 1111 are used. Here, when the subCU level motion vector is determined with respect to the "sub0", it is possible to set template regions for respective positions corresponding to the subCU level motion vector candidates with respect to the "sub1" and "sub2".

At the processing timing "$T_{m+4}$", with respect to the "sub1" and the "sub2", template regions are set at respective positions corresponding to the subCU level motion vector candidates, and one motion vector candidate to be the base point at the subCU level is determined. At the processing timing "$T_{m+4}$", the prediction image is simultaneously generated for "sub0" and output.

Here, when the prediction image is generated for "sub0", it is possible to determine the subCU level motion vector for "sub1" and "sub2".

Thus, at the processing timing "$T_{m+5}$", the subCU level motion vectors are determined for the "sub1" and the "sub2". In determining the motion vector of the "sub1", a decoded image of the template region 1102 and a prediction image of the template region 2801 are used. In determining the motion vector of the "sub2", a prediction image of the template region 2802 and a decoded image of the template region 1112 are used.

Since a decoded image is generated in response to the prediction image being output, at the processing timing "$T_{m+5}$", the decoded image generated for "subCU0" is simultaneously obtained.

When the subCU level motion vectors are determined for the "sub1" and "sub2", template regions can be set at respective positions corresponding to the subCU level motion vector candidates for the "sub3".

Thus, at the processing timing "$T_{m+6}$", the template regions are set at the respective positions corresponding to the subCU level motion vector candidates for the "sub3", and one motion vector candidate to be the base point at the subCU level is determined. At the processing timing "$T_{m+6}$", the prediction images for the "sub1" and the "sub2" are simultaneously generated and output.

Here, when prediction images are generated for the "sub1" and the "sub2", it is possible to determine the subCU level motion vector for the "sub3".

Thus, at the processing timing "$T_{m+7}$", the subCU level motion vector is determined for the "sub3". In determining the motion vector of the "sub3", a prediction image of the template region 2803 and a prediction image of the template region 2804 are used.

Since a decoded image is generated in response to the prediction image being output, at the processing timing "$T_{m+7}$", the decoded images generated for "sub1" and "sub2" are simultaneously obtained.

As described above, the encoder according to the second embodiment can perform parallel processing on multiple subCUs, thereby improving the processing efficiency. As a result, the decoded images can be generated for the four subCUs included in the "$CU_n$" between the processing timing "$T_m$" and the processing timing "$T_{m+9}$".

(6) First Specific Example of Parallel Processing

Figure 29:
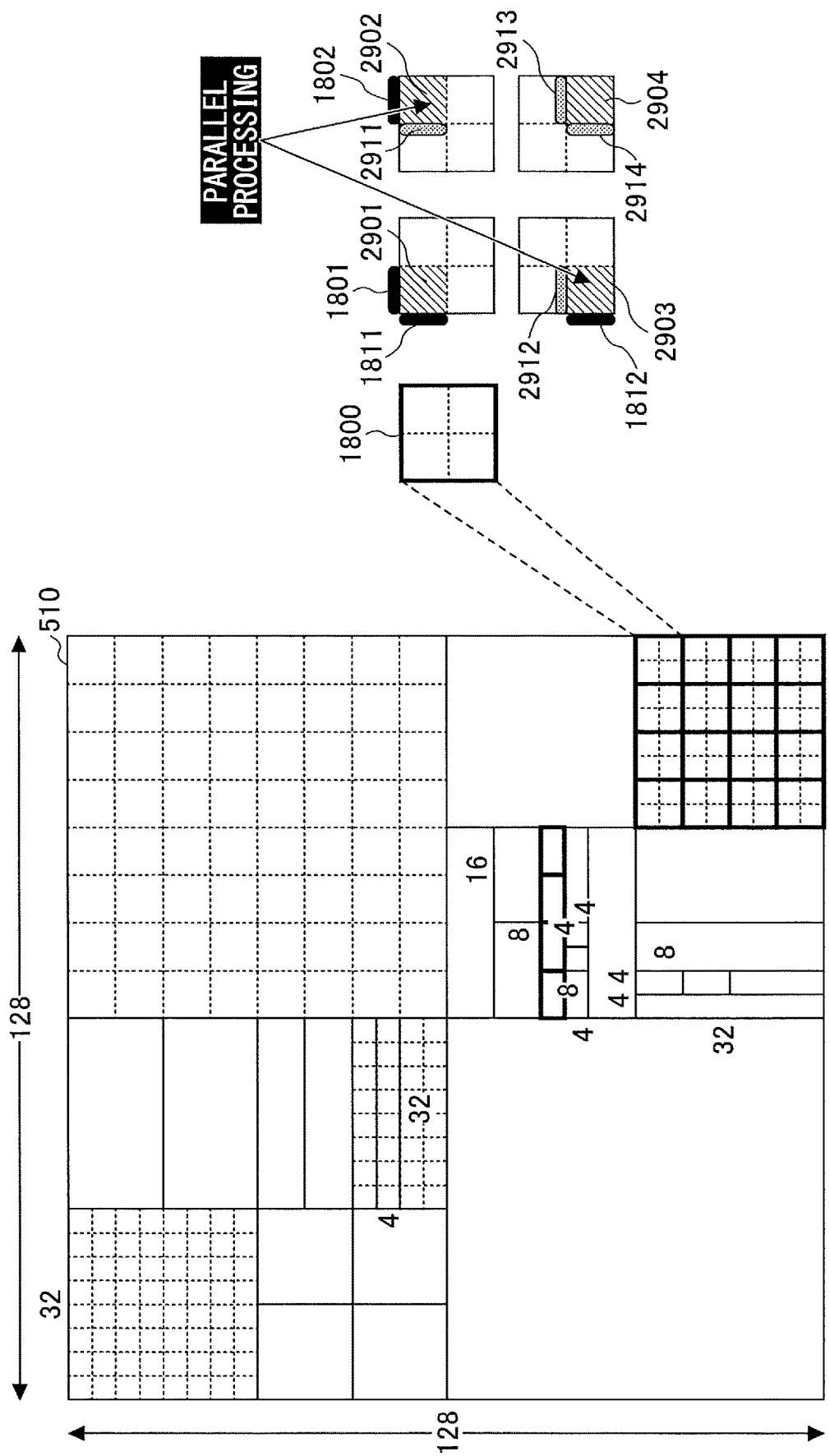
FIG. 29 is a first drawing illustrating a specific example of parallel processing in the inter prediction mode of the encoder according to the second embodiment.

Subsequently, a specific example of parallel processing performed on multiple subCUs in the inter prediction mode of the encoder according to the second embodiment will be described. FIG. 29 is a first drawing illustrating a specific example of the parallel processing in the inter prediction mode of the encoder according to the second embodiment. The example of FIG. 29 illustrates parallel processing performed on subCUs included in the CU block 1800 of 8×8 pixels generated by partitioning the CTU 510 of 128×128 pixels (because the subCU size is 4×4 pixels, the parallel processing is performed).

In the example of FIG. 29, the CU block 1800 is partitioned into four subCUs. In the example of FIG. 29, template regions are set for each of the four subCUs 2901 to 2904 as follows.

subCU 2901: Set a portion of a decoded image of an upper subCU adjacent to the subCU 2901 and a portion of a decoded image of a left subCU adjacent to the subCU 2901 as template regions 1801 and 1811 subCU 2902: Set a portion of a decoded image of an upper subCU adjacent to the subCU 2902 and a portion of a prediction image of the subCU 2901 adjacent to the left of the subCU 2902 as template regions 1802 and 2911 subCU 2903: Set a portion of a prediction image of the subCU 2901 adjacent to the upper side of the subCU 2903 and a portion of a decoded image of a left subCU adjacent to the subCU 2903 as template regions 2912 and 1812 subCU 2904: Set a portion of a prediction image of the subCU 2902 adjacent to the upper side of the subCU 2904 and a portion of a prediction image of the subCU 2903 adjacent to the left side of the subCU 2904 as template regions 2913 and 2914

This enables, for example, template matching of the subCU 2902 and the subCU 2903 among the four subCUs 2901 to 2904 included in the CU block 1800 to be performed in parallel with the processing of the subCU 2901.

(7) Second Specific Example of Parallel Processing

Figure 30:
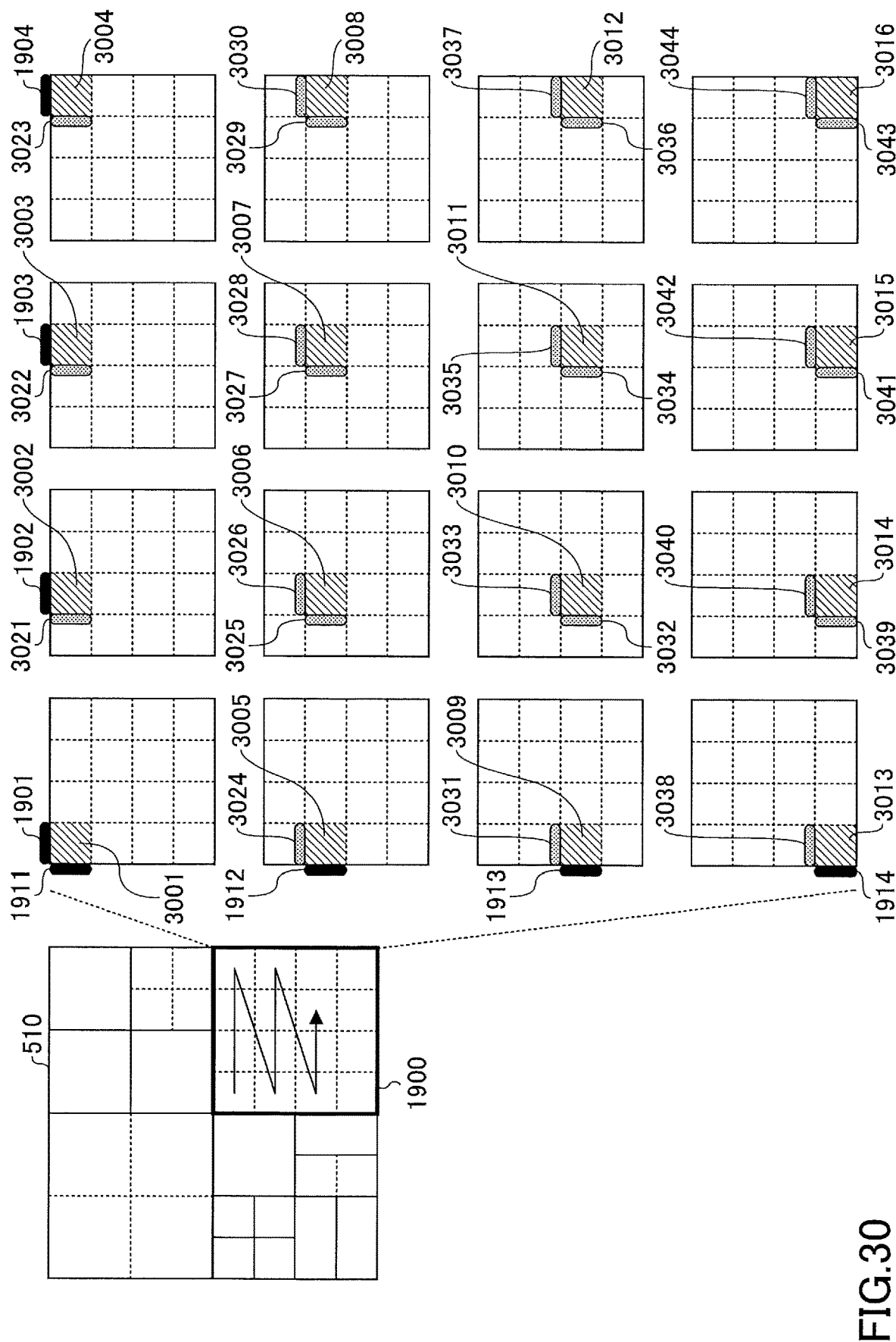
FIG. 30 is a second drawing illustrating a specific example of parallel processing in the inter prediction mode of the encoder according to the second embodiment.

FIG. 30 is a second drawing illustrating a specific example of parallel processing in the inter prediction mode of the encoder according to the second embodiment. The example in FIG. 30 illustrates the parallel processing performed on the subCUs included in the CU block 1900 of 64×64 pixels generated by partitioning the CTU 510 of 128×128 pixels. The following description assumes that the parallel processing is performed because a quantization parameter of the CU block 1900 is 30 or smaller.

In the example of FIG. 30, the CU block 1900 is partitioned into 16 subCUs. In the example of FIG. 30, for each of the 16 subCUs, a portion of a decoded image or a prediction image of an upper subCU adjacent to the subCU and a portion of a decoded image or a prediction image of a left subCU adjacent to the subCU are set as template regions.

For example, in a case of the subCU 3001, a portion of a decoded image of an upper subCU adjacent to the subCU 3001 is set as the template region 1901, and a portion of a decoded image of a left subCU adjacent to the subCU 3001 is set as the template region 1911.

This enables template matching of, for example, the subCU 3002 and the subCU 3005 to be performed in parallel with the processing of the subCU 3001. Further, template matching of, for example, the subCUs 3003, 3006, and 3009 can be performed in parallel with the processing of the subCU 3002 and the subCU 3005.

(8) Third Specific Example of Parallel Processing

Figure 31:
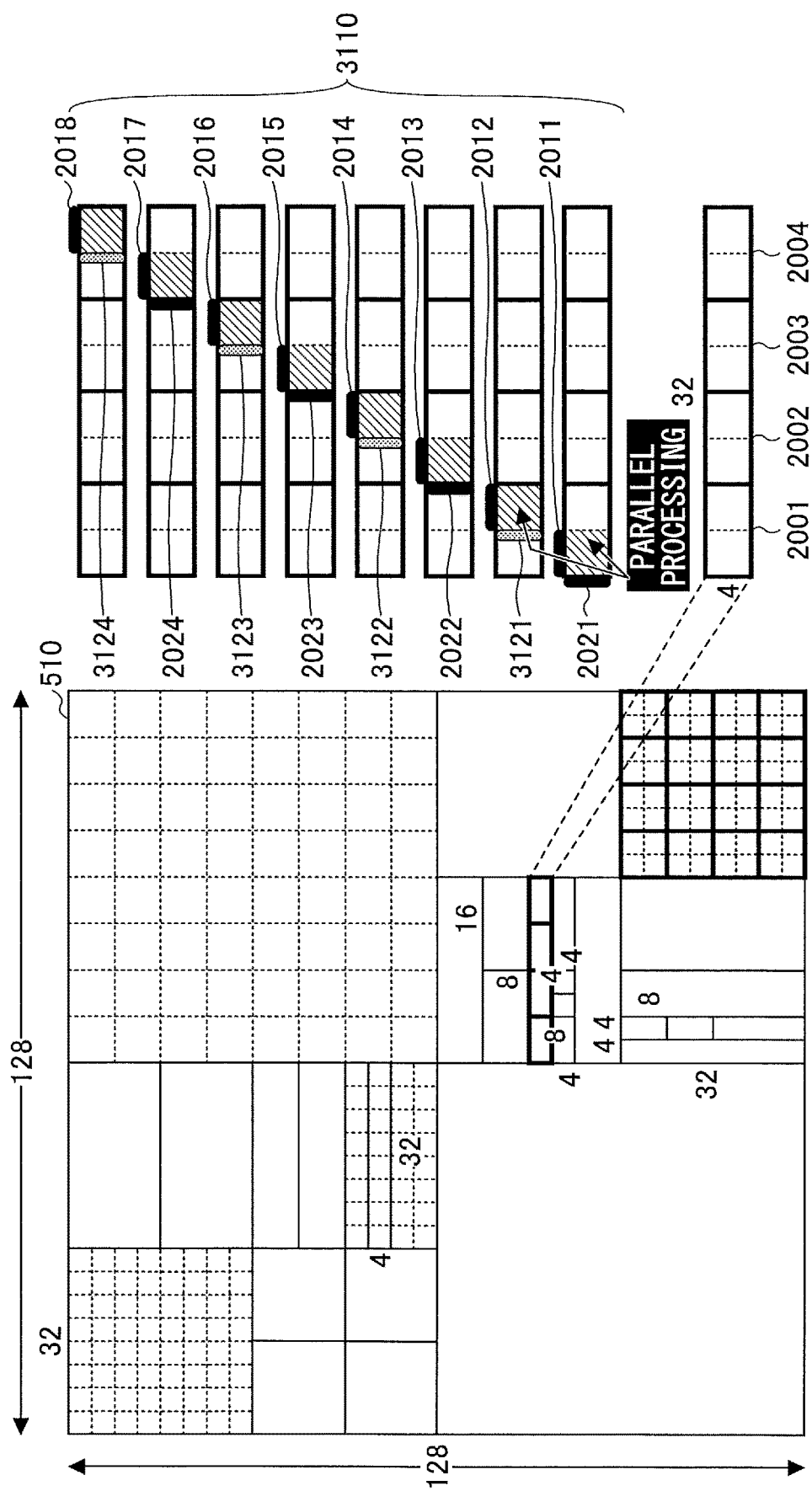
FIG. 31 is a third drawing illustrating a specific example of parallel processing in the inter prediction mode of the encoder according to the second embodiment.

FIG. 31 is a third drawing illustrating a specific example of parallel processing in an inter prediction mode of the encoder according to the second embodiment. The example of FIG. 31 illustrates a case in which CU blocks 2001 to 2004 of 8×4 pixels generated by partitioning the CTU 510 of 128×128 pixels are processed.

In the example of FIG. 31, the CU blocks 2001 to 2004 are each partitioned into two subCUs. Thus, the subCU size is 4×4 pixels, and parallel processing is performed on the two subCUs.

A drawing referenced by a reference numeral 3110 illustrates a state in which a template region is set for each subCU included in the CU blocks 2001 to 2004 in time series, and indicates that the time axis moves from the bottom to the top.

As indicated by the drawing referenced by the reference numeral 3110, for each two subCUs included in the CU block 2001, a portion of a decoded image of a subCU adjacent to the upper side of the left subCU and a portion of a decoded image of a subCU adjacent to the left side of the left subCU are set as template regions 2011 and 2012. A portion of a decoded image of a subCU adjacent to the upper side of the right subCU and a portion of a prediction image of a subCU adjacent to the left side of the left subCU, among the two subCUs included in the CU block 2001, are set as template regions 2012 and 3121.

This enables template matching of the right subCU to be performed in parallel with the processing of the left subCU, among the two subCUs included in the CU block 2001.

The two subCUs included in the CU block 2001 are processed in parallel, and decoded images are generated for the subCUs. Subsequently, the process proceeds to the CU block 2002. Specifically, a portion of a decoded image of a subCU adjacent to the upper side of the left subCU and a portion of a decoded image of a subCU adjacent to the left side of the left subCU among the two subCUs included in the CU block 2002 are set as template regions 2013 and 2022. A portion of a decoded image of a subCU adjacent to the upper side of the right subCU and a portion of a prediction image of a subCU adjacent to the left side of the right subCU among the two subCUs included in the CU block 2002 are set as template regions 2014 and 3122.

This enables the template matching of the right subCU to be performed in parallel with the processing of the left subCU, among the two subCUs included in the CU block 2002.

The two subCUs included in the CU block 2002 are processed in parallel, and decoded images are generated for the subCUs. Subsequently, the process proceeds to the CU block 2003. Specifically, a portion of a decoded image of a subCU adjacent to the upper side of the left subCU and a portion of a decoded image of a subCU adjacent to the left side of the left subCU among the two subCUs included in the CU block 2003 are set as template regions 2015 and 2023. A portion of a decoded image of a subCU adjacent to the upper side of the right subCU and a portion of a prediction image of a subCU adjacent to the left side of the right subCU among the two subCUs included in the CU block 2003 are set as template regions 2016 and 3123.

This enables the template matching of the right subCU to be performed in parallel with the processing of the left subCU, among the two subCUs included in the CU block 2003.

The two subCUs included in the CU block 2003 are processed in parallel, and decoded images are generated for the subCUs. Subsequently, the process proceeds to the CU block 2004. Specifically, a portion of a decoded image of a subCU adjacent to the upper side of the left subCU and a portion of a decoded image of a subCU adjacent to the left side of the left subCU among the two subCUs included in the CU block 2004 are set as template regions 2017 and 2024. A portion of a decoded image of a subCU adjacent to the upper side of the right subCU and a portion of a prediction image of a subCU adjacent to the left side of the right subCU among the two subCUs included in the CU block 2004 are set as template regions 2018 and 3124.

This enables the template matching of the right subCU to be performed in parallel with the processing of the left subCU, among the two subCUs included in the CU block 2004.

<2. Functional Configuration of the Intra/Inter Prediction Unit for Achieving the Inter Prediction Process Using Template Matching in the Inter Prediction Mode of the Decoder According to the Second Embodiment>

Figure 32:
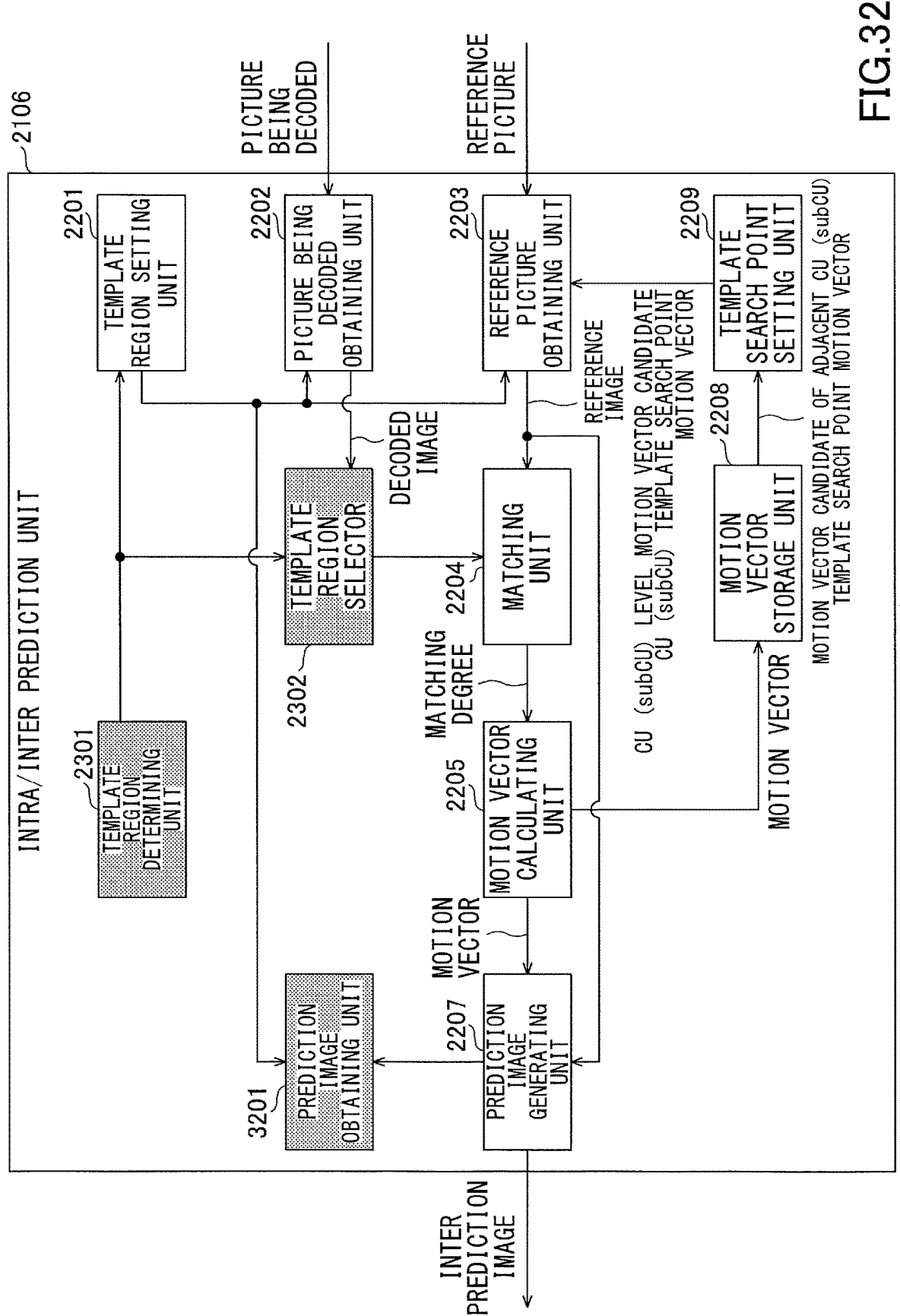
FIG. 32 is a drawing illustrating an example of a function configuration for achieving an inter prediction process using template matching in an inter prediction mode of a decoder according to the second embodiment.

Next, a functional configuration for achieving the inter prediction process using template matching in the inter prediction mode of the decoder according to the second embodiment will be described. FIG. 32 is a drawing illustrating an example of the functional configuration for achieving the inter prediction process using template matching in the inter prediction mode of the decoder according to the second embodiment.

FIG. 32 differs from FIG. 23 in that a prediction image obtaining unit 3201 is included in FIG. 32. In the following, differences from FIG. 23 will be mainly described.

The prediction image obtaining unit 3201 obtains a prediction image of a subCU adjacent to the subCU to be decoded, which is generated by the prediction image generating unit 2207. Specifically, the prediction image obtaining unit 3201 obtains prediction images of template regions set by the template region setting unit 2201 (i.e., template regions set at positions of subCUs adjacent to the subCU to be decoded). The prediction image obtaining unit 3201 notifies the template region selector 2302 of the obtained prediction images of the template regions.

When the template region setting unit 2201 is notified, by the template region determining unit 2301, of a determined result indicating that the predetermined execution condition is satisfied, the template region setting unit 2201 sets the template regions described with reference to FIG. 24 to the prediction image obtaining unit 3201.

Specifically, the template region setting unit 2201 sets a portion of a prediction image of a subCU adjacent to the upper side of the subCU to be decoded and a portion of a prediction image of a subCU adjacent to the left side of the subCU to be decoded as template regions. In this case, the prediction image obtaining unit 3201 notifies the template region selector 2302 of the prediction images of the template regions set by the template region setting unit 2201 (i.e., portions of the prediction images of the adjacent subCUs) among the prediction images generated by the prediction image generating unit 2207.

When the template region selector 2302 is notified of a determined result indicating that the predetermined execution condition is not satisfied, the template region selector 2302 selects the decoded images of the template regions notified by the picture being decoded obtaining unit 2202 (i.e., portions of the decoded images of the adjacent subCUs). The template region selector 2302 notifies the matching unit 2204 of the selected decoded images of the template regions. This enables the matching unit 2204 to perform the template matching on the subCU to be decoded in the reference picture by using the decoded images of the template regions according to the determined result notified by the template region determining unit 2301.

When the template region selector 2302 is notified of a determined result indicating that the predetermined execution condition is satisfied, the template region selector 2302 selects the prediction images of the template regions notified by the prediction image obtaining unit 3201 (i.e., portions of the prediction images of the adjacent CU blocks). The template region selector 2302 notifies the matching unit 2204 of the selected prediction images of the template regions. This enables the matching unit 2204 to perform the template matching on the subCU to be decoded in the reference picture by using the prediction images of the template regions according to the determined result notified by the template region determining unit 2301.

<3. Summary>

As is clear from the above description, when the intra/inter prediction unit of the encoder according to the second embodiment performs the inter prediction process using template matching in the inter prediction mode, the following processing is performed.

- Partition a coding unit (CU) block into multiple rectangular regions (subCUs)
- Determine whether the rectangular region to be decoded satisfies a predetermined execution condition, and set portions of prediction images of rectangular regions adjacent to the rectangular region to be decoded as template regions when it is determined that the rectangular region satisfies the predetermined execution condition
- Perform template matching by parallel processing on portions of rectangular regions included in the coding unit block by using the set template regions, and output a prediction image of each rectangular region.

This enables the encoder according to the second embodiment to improve processing efficiency in the inter prediction using template matching.

When the intra/inter prediction unit of the decoder according to the second embodiment performs the inter prediction process using template matching in the inter prediction mode, the following processing is performed.

- Partition a coding unit (CU) block into multiple rectangular regions (subCUs)
- Determine whether the rectangular region to be decoded satisfies a predetermined execution condition, and set portions of prediction images of rectangular regions adjacent to the rectangular region to be decoded as template regions when it is determined that the rectangular region satisfies the predetermined execution condition
- Perform template matching by parallel processing on portions of rectangular regions included in the coding unit block by using the set template regions, and output a prediction image of each rectangular region.

This enables the decoder according to the second embodiment to improve processing efficiency in the inter prediction using template matching.

Third Embodiment

In the above-described first embodiment, a function of setting portions of decoded images of CU blocks adjacent to a CU block including the subCU to be decoded as template regions when a predetermined execution condition is satisfied in the inter-prediction process using template matching has been described.

In the above-described second embodiment, a function of setting portions of prediction images of subCUs adjacent to the subCU to be decoded as template regions when a predetermined execution condition is satisfied when the inter prediction process using template matching is performed has been described.

With respect to the above, in the third embodiment, a configuration in which the function described in the first embodiment and the function described in the second embodiment are each arranged in an encoder and a decoder, and both functions are switched will be described. In the following, the third embodiment will be described focusing on differences from the second embodiment described above.

<1. Flow of the Inter Prediction Process (Flow of the subCU Level Motion Search Process)>

Figure 33:
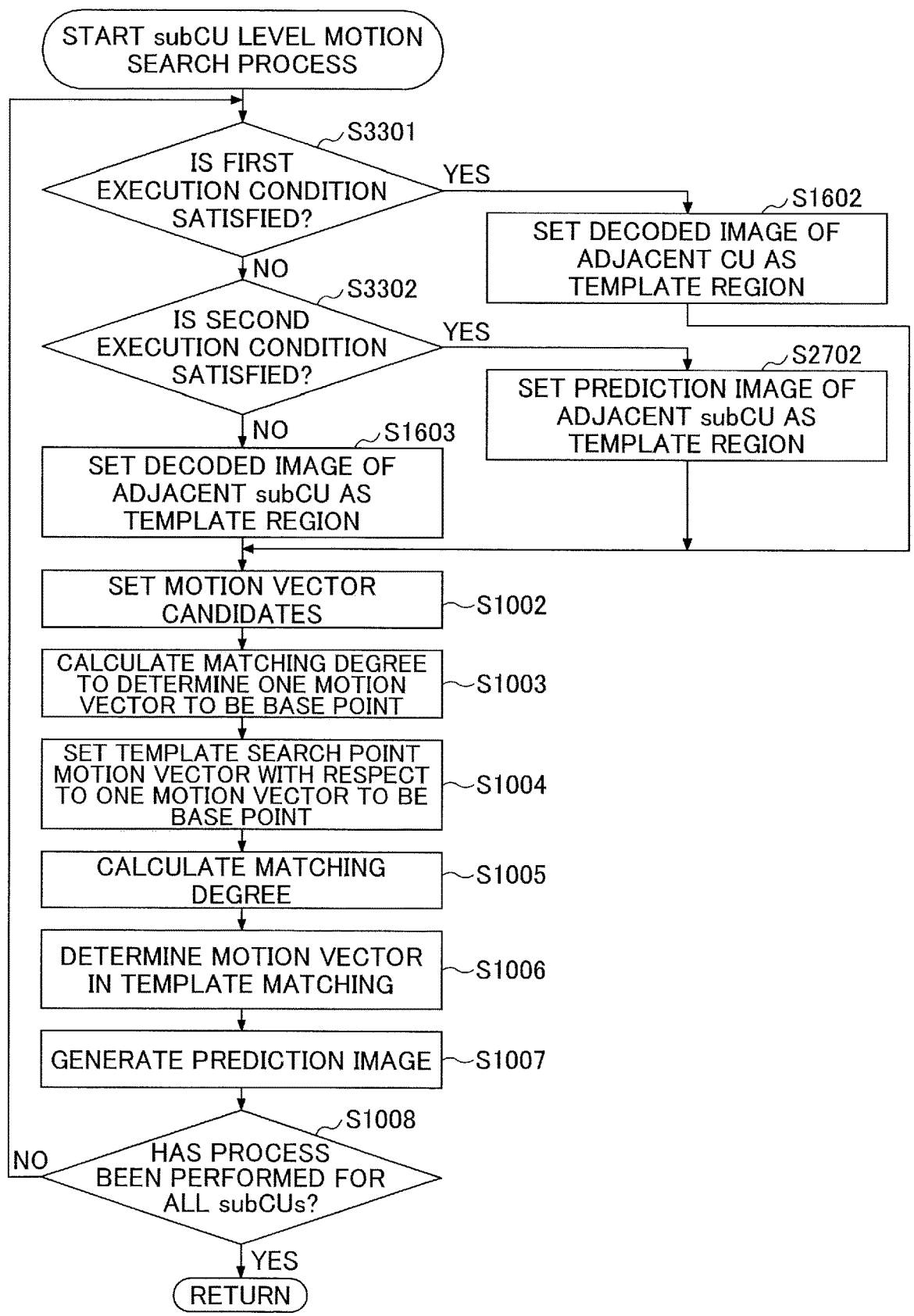
FIG. 33 is a flowchart illustrating a flow of a subCU level motion search process in an inter prediction mode of an encoder according to a third embodiment.

FIG. 33 is a flowchart illustrating a flow of a subCU level motion search process in the inter prediction mode of the encoder according to the third embodiment. Steps S3301, S3302, S1602, S2702, and S1603 are different from the steps in FIG. 27.

In step S3301, the template region determining unit 1401 determines whether the subCU to be decoded satisfies a first execution condition. The first execution condition indicates any one of the execution conditions defined in the execution condition information 1500, for example.

In step S3301, when it is determined that the first execution condition is satisfied (i.e., YES in step S3301), the process proceeds to step S1602.

In step S1602, the template region setting unit 703 sets portions of decoded images of CU blocks adjacent to a CU block including the subCU to be decoded as template regions.

In step S3301, when it is determined that the first execution condition is not satisfied (i.e., NO in step S3301), the process proceeds to step S3302. In step S3302, the template region determining unit 1401 determines whether the subCU to be decoded satisfies a second execution condition. The second execution condition indicates any one of the execution conditions defined in the execution condition information 2700 that is different from the execution conditions defined in the execution condition information 1500.

In step S3302, when it is determined that the second execution condition is satisfied (i.e., YES in step S3302), the process proceeds to step S2702. In step S2702, the prediction image obtaining unit 2501 obtains prediction images or decoded images of an upper subCU and a left subCU adjacent to the subCU to be decoded from the prediction image generating unit 708. The template region selector 1402 sets portions of the prediction images or the decoded images of the subCUs adjacent to the subCU to be decoded as template regions.

In step S3302, when it is determined that the second execution condition is not satisfied (i.e., NO in step S3302), the process proceeds to step S1603. In step S1603, the template region setting unit 703 sets portions of the decoded image of the subCUs adjacent to the subCU to be decoded as template regions.

<2. Summary>

As is clear from the above description, when the intra/inter prediction units of the encoder and the decoder according to the third embodiment perform the inter prediction process using template matching in the inter prediction mode, the following processing is performed.

Determine whether the rectangular region to be decoded satisfies the first execution condition and set portions of decoded images of blocks adjacent to a coding unit block including the rectangular region as template regions when it is determined that the first execution condition is satisfied Determine whether the rectangular region to be decoded satisfies the second execution condition and set portions of prediction images of rectangular regions adjacent to the rectangular region as template regions when it is determined that the second execution condition is satisfied This enables the encoder and the decoder according to the third embodiment to set the template regions in accordance with attributes of the subCU to be decoded and perform the inter prediction process using template matching.

As a result, the encoder and the decoder according to the third embodiment can improve the processing efficiency in the inter prediction using template matching.

OTHER EMBODIMENTS

In the above-described first embodiment, the description assumes that a predetermined block is a coding unit block (CU) including the subCU to be decoded. However, the predetermined block is not limited to the CU block. As long as a block includes the subCU to be decoded, the block may be smaller than the CU or larger than the CU.

However, in order to start the processing of the subCU to be decoded, it is necessary to complete generating decoded images of blocks adjacent to the upper side and the left side of the predetermined block.

Additionally, it is necessary to define the predetermined block in advance in the encoder 110 and configure to include information representing the predetermined block as supplementary information at outputting a data stream. This enables the decoder 120 to recognize the predetermined block based on the supplementary information.

In the first to third embodiments described above, the determination is performed based on the execution conditions defined in the execution condition information 1500 in FIG. 15 or the execution condition information 2600 in FIG. 26. However, the execution conditions used for the determination are not limited to these, and it is needless to say that the determination may be performed based on other execution conditions that are not defined in the execution condition information 1500 or the execution condition information 2600.

In the first to third embodiments described above, the determination is performed based on all execution conditions defined in the execution condition information 1500 in FIG. 15 or the execution condition information 2600 in FIG. 26 in each of the encoder 110 and the decoder 120.

However, the encoder 110 and decoder 120 may be configured to perform the determination based on any of the execution conditions. In this case, since the decoder 120 is required to recognize the execution condition used for the determination in the encoder 110, the encoder 110 may include the execution condition used for the determination as syntax in the supplementary information and transmit the supplementary information to the decoder 120.

For example, when the determination item of the execution condition is the "picture type", the encoder 110 includes fruc_parallel_merge_tid_minus1: 0 to 5 in the supplementary information as a sequence level syntax and transmits the supplementary information to the decoder 120. Here, "0 to 5" indicates a hierarchical level of the picture, and "0" indicates "OFF".

When the determination item of the execution condition is the "sub CU size", the encoder 110 includes log2_fruc_parallel_merge_size_minus2: 0 to 5 in the supplementary information as a picture level syntax, and transmits the supplementary information to the decoder 120. Here, "0" indicates 4×4 pixels or smaller, "1" indicates 8×8 pixels or smaller, "2" indicates 16×16 pixels or smaller, "3" indicates 32×32 pixels or smaller, "4" indicates 64×64 pixels or smaller, and "5" indicates 128×128 pixels or smaller.

When the determination item of the execution condition is the "quantization parameter of the CU", the encoder 110 includes fruc_parallel_merge_qp_minus1: 0 to 64 in the supplementary information as the picture level syntax, and transmits the supplementary information to the decoder 120. Here, "0" indicates "OFF".

Further, when the determination item of the execution condition is the "CU level motion vector", the encoder 110 includes fruc_parallel_merge_cu_mv_minus1:0 to 511 in the supplementary information as the picture level syntax, and transmits the supplementary information to the decoder 120.

In the above-described third embodiment, when the first execution condition is satisfied, portions of decoded images of adjacent CUs are set as template regions, and when the second execution condition is satisfied, portions of prediction images of adjacent subCUs are set as template regions. That is, either the portions of the decoded images of the adjacent CUs or portions of the prediction images of the adjacent subCUs are set as the template regions.

However, a method of setting the template regions is not limited to this, but may be configured, for example, to set portions of the prediction images of adjacent CUs.

It should be noted that the present invention is not limited to the above-described configurations, such as the configurations described in the above-described embodiments and combinations of other elements. According to these points, changes can be made without departing from the spirit and scope of the present invention, and can be appropriately determined in accordance with an application form.

What is claimed is:

1. A decoding method for decoding an image by using an inter-picture prediction, the decoding method comprising:
   obtaining a rectangular region to be decoded in a picture being decoded;
   setting a first template region in accordance with a position of the rectangular region to be decoded in the picture being decoded;
   setting a second template region corresponding to the first template region in a reference picture different in time from the picture being decoded;
   setting third template regions each of which is obtained by moving the second template region by using a corresponding one of a plurality of predetermined vectors in the reference picture;
   calculating image correlation values each of which is obtained between a corresponding one of the third template regions and the first template region;
   determining a motion vector of the rectangular region to be decoded by selecting one vector among the plurality of predetermined vectors based on the image correlation values each corresponding to a respective one of the plurality of predetermined vectors; and
   generating a prediction image of the rectangular region to be decoded based on the motion vector to perform motion compensation,
   wherein the setting of the first template region includes determining whether to set, as the first template region, a region adjacent to a predetermined block including the rectangular region to be decoded or a region adjacent to the rectangular region to be decoded based on whether a condition is satisfied, the condition being that a size of the rectangular region to be decoded is smaller than or equal to a predetermined threshold size or the picture being decoded including the rectangular region to be decoded corresponds to a non-reference picture that is not referenced when another picture different in time is decoded, and the predetermined block being determined by an encoder.

2. The decoding method as claimed in claim 1, wherein the setting a second template region includes setting in parallel the second template region corresponding to the first template region of each of a plurality of rectangular regions included in the predetermined block.

3. The decoding method as claimed in claim 2, wherein the predetermined block is a coding unit block including the rectangular region to be decoded.

4. A decoding method for decoding an image by using an inter-picture prediction, the decoding method comprising:
   obtaining a rectangular region to be decoded in a picture being decoded;
   setting a first template region in accordance with a position of the rectangular region to be decoded in the picture being decoded;
   setting a second template region corresponding to the first template region in a reference picture different in time from the picture being decoded;
   setting third template regions each of which is obtained by moving the second template region by using a corresponding one of a plurality of predetermined vectors in the reference picture;
   calculating image correlation values each of which is obtained between a corresponding one of the third template regions and the first template region;
   determining a motion vector of the rectangular region to be decoded by selecting one vector among the plurality of predetermined vectors based on the image correlation values each corresponding to a respective one of the plurality of predetermined vectors; and
   generating a prediction image of the rectangular region to be decoded based on the motion vector to perform motion compensation,
   wherein the calculating image correlation values includes calculating the image correlation values by using a prediction image of the first template region.

5. The decoding method as claimed in claim 4, wherein the calculating image correlation values includes calculating the image correlation values by using the prediction image of the first template region when a size of the rectangular region to be decoded is smaller than or equal to a predetermined threshold size, when the picture being decoded including the rectangular region to be decoded corresponds to a non-reference picture that is not referenced when another picture different in time is decoded, when a quantization parameter of a coding unit block including the rectangular region to be decoded is smaller than or equal to a predetermined threshold value, or when an absolute value of a motion vector of the coding unit block including the rectangular region to be decoded is smaller than or equal to a predetermined pixel value.

6. The decoding method as claimed in claim 5, wherein the setting a second template region includes setting in parallel the second template region corresponding to the first template region of each of a plurality of rectangular regions included in the coding unit block.

7. A decoding method for decoding an image by using an inter-picture prediction, the decoding method comprising:
   obtaining a rectangular region to be decoded in a picture being decoded;
   setting a first template region in accordance with a position of the rectangular region to be decoded in the picture being decoded;
   setting a second template region corresponding to the first template region in a reference picture different in time from the picture being decoded;

setting third template regions each of which is obtained by moving the second template region by using a corresponding one of a plurality of predetermined vectors in the reference picture;

calculating image correlation values each of which is obtained between a corresponding one of the third template regions and the first template region;

determining a motion vector of the rectangular region to be decoded by selecting one vector among the plurality of predetermined vectors based on the image correlation values each corresponding to a respective one of the plurality of predetermined vectors; and generating a prediction image of the rectangular region to be decoded based on the motion vector to perform motion compensation, wherein the setting a first template region includes setting a region adjacent to a predetermined block including the rectangular region to be decoded as the first template region when the rectangular region to be decoded satisfies a first execution condition, the predetermined block being determined by an encoder, and wherein the calculating image correlation values includes calculating the image correlation values by using a prediction image of the first template region when the rectangular region to be decoded satisfies a second execution condition.

* * * * *